United States Patent
Resch

(10) Patent No.: US 9,665,429 B2
(45) Date of Patent: May 30, 2017

(54) STORAGE OF DATA WITH VERIFICATION IN A DISPERSED STORAGE NETWORK

(71) Applicant: CLEVERSAFE, INC., Chicago, IL (US)

(72) Inventor: Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3 days.

(21) Appl. No.: 14/589,639

(22) Filed: Jan. 5, 2015

(65) Prior Publication Data

US 2015/0242273 A1    Aug. 27, 2015

Related U.S. Application Data

(60) Provisional application No. 61/944,722, filed on Feb. 26, 2014.

(51) Int. Cl.

| | | |
|---|---|---|
| *G11C 29/00* | (2006.01) | |
| *G06F 11/10* | (2006.01) | |
| *G06F 21/62* | (2013.01) | |
| *G06F 21/64* | (2013.01) | |
| *H04L 29/06* | (2006.01) | |
| *H04L 29/08* | (2006.01) | |

(52) U.S. Cl.
CPC .......... *G06F 11/1092* (2013.01); *G06F 21/62* (2013.01); *G06F 21/64* (2013.01); *H04L 63/10* (2013.01); *H04L 67/1097* (2013.01); *H04L 67/2823* (2013.01); *G06F 2211/1028* (2013.01); *G06F 2212/254* (2013.01)

(58) Field of Classification Search
CPC .. G06F 11/10; G06F 11/1076; G06F 11/1092; G06F 21/64; G06F 11/1016; G06F 21/62; H04L 67/1097; H04L 67/2823
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Shelly A Chase
(74) *Attorney, Agent, or Firm* — Garlick & Markison; Timothy W. Markison

(57) ABSTRACT

A method begins by a computing device sending a set of redundant dispersed storage error encoding write requests regarding a data object to a set of dispersed storage (DS) processing modules. The method continues with the set of DS processing modules dispersed storage error encoding the data object to produce a group of pluralities of sets of encoded data slices. The method continues with a set of storage units temporarily storing the group of pluralities of sets of encoded data slices. The method continues with the set of storage units permanently storing encoded data slices of the group of pluralities of sets of encoded data slices based on successful execution of a storage verification process to produce a plurality of sets of encoded data slices.

14 Claims, 55 Drawing Sheets

(56) References Cited

U.S. PATENT DOCUMENTS

| | | | |
|---|---|---|---|
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0072321 A1* | 3/2011 | Dhuse | G06F 11/1076 714/55 |
| 2011/0214011 A1* | 9/2011 | Grube | G06F 11/1076 714/6.22 |
| 2011/0225362 A1* | 9/2011 | Leggette | G06F 12/1425 711/114 |
| 2012/0102316 A1* | 4/2012 | Resch | H04L 67/1097 713/150 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

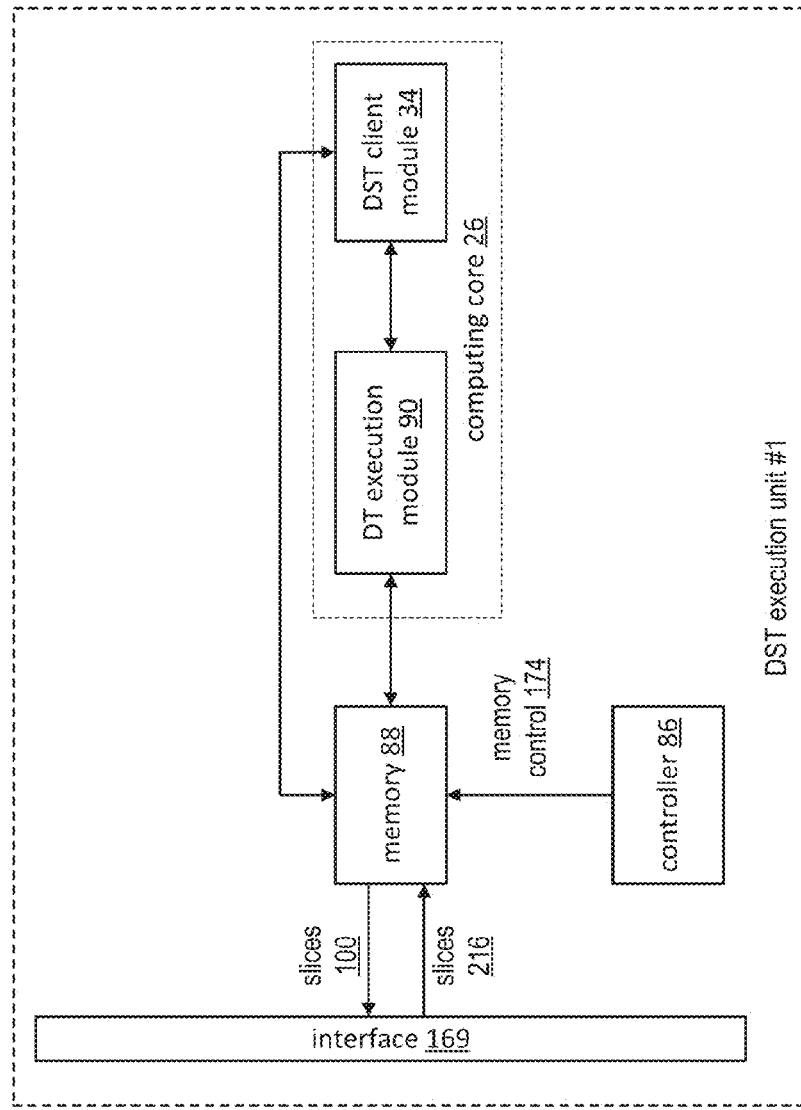
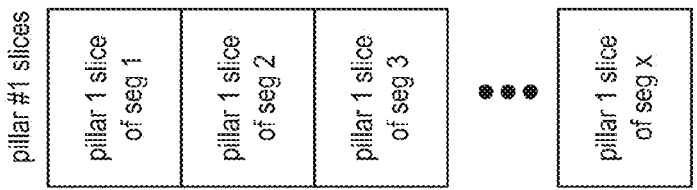
FIG. 24

DST allocation info 242

| data partition info 320: data ID; No. of partitions; Addr. info for each partition; format conversion indication |
|---| task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

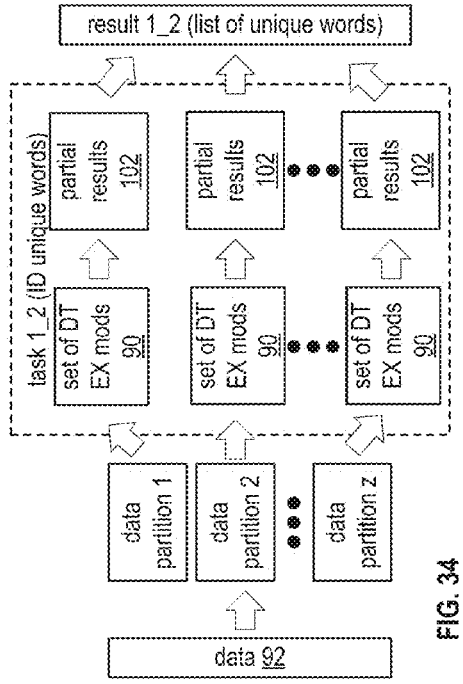
FIG. 34
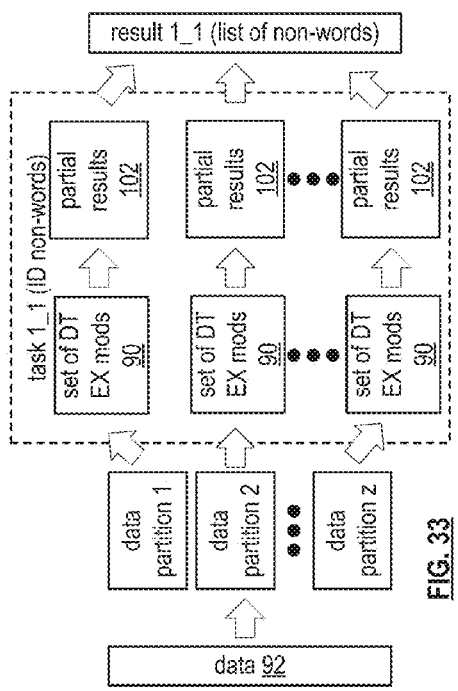
FIG. 33
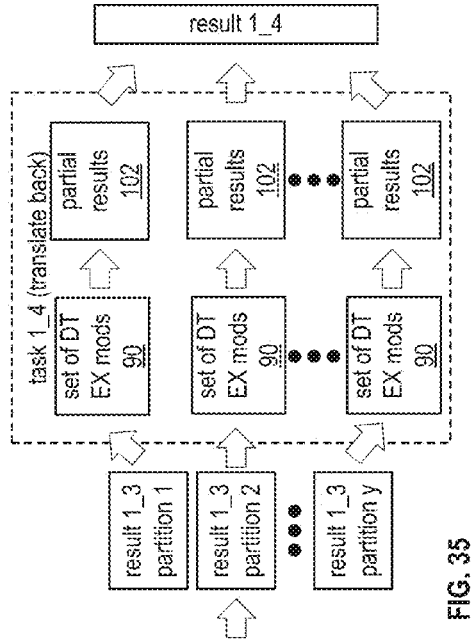
FIG. 35
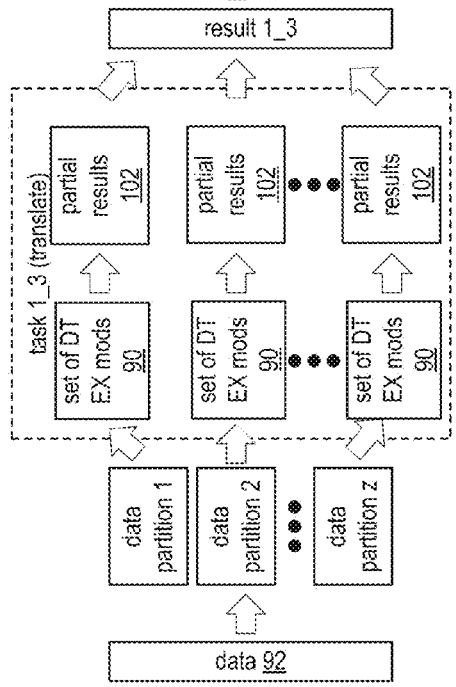

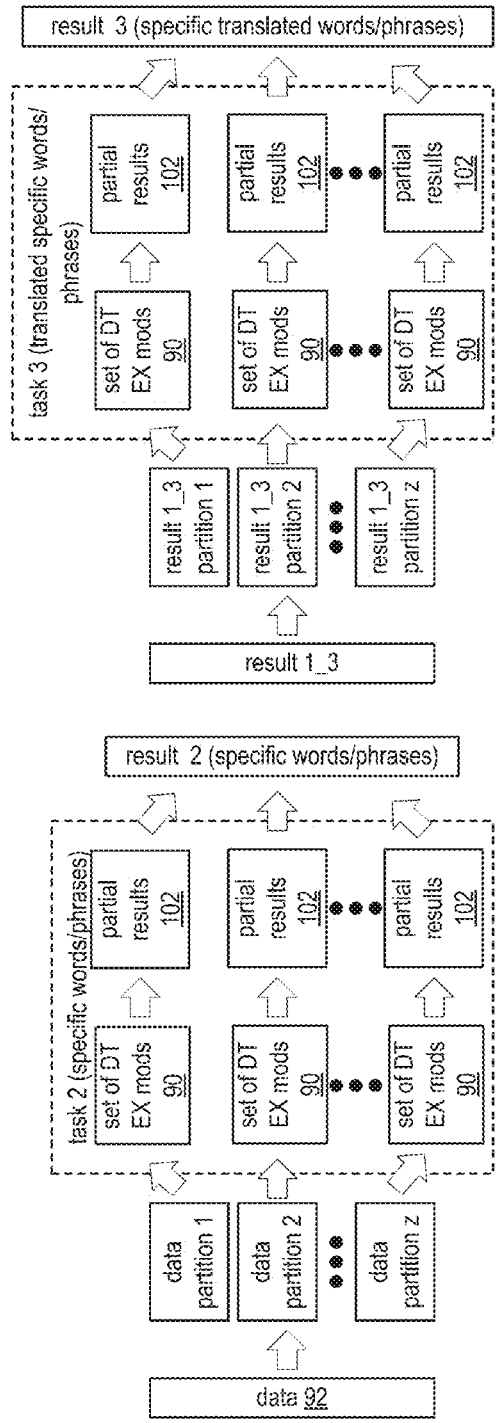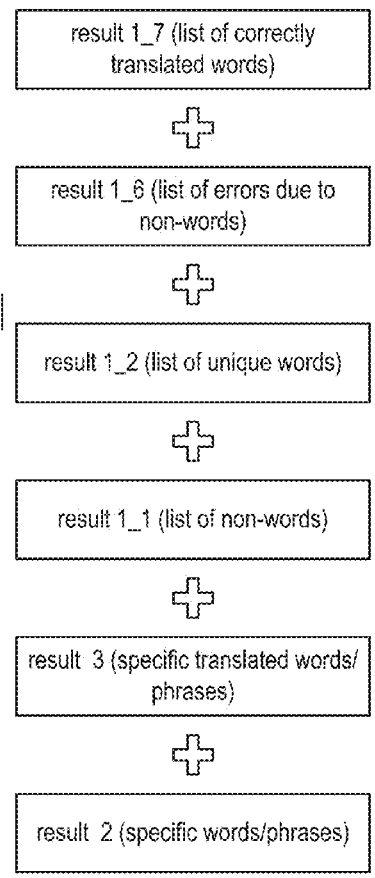

STORAGE OF DATA WITH VERIFICATION IN A DISPERSED STORAGE NETWORK

CROSS REFERENCE TO RELATED PATENTS

The present U.S. Utility patent application claims priority pursuant to 35 U.S.C. §119(e) to U.S. Provisional Application No. 61/944,722, entitled "SELECTING RESOURCES OF A DISPERSED STORAGE NETWORK", filed Feb. 26, 2014, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 42A:
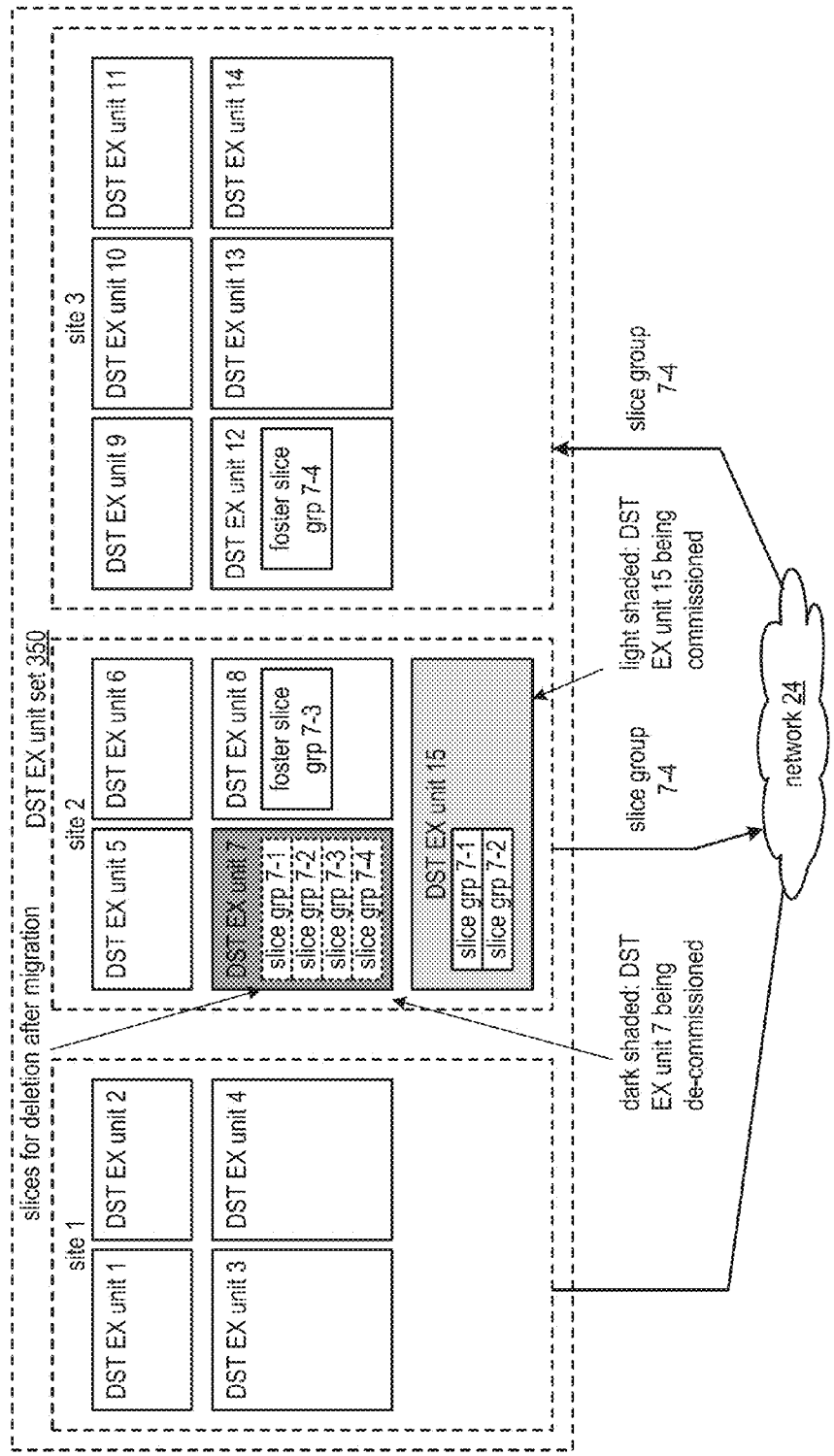
Figure 42B:
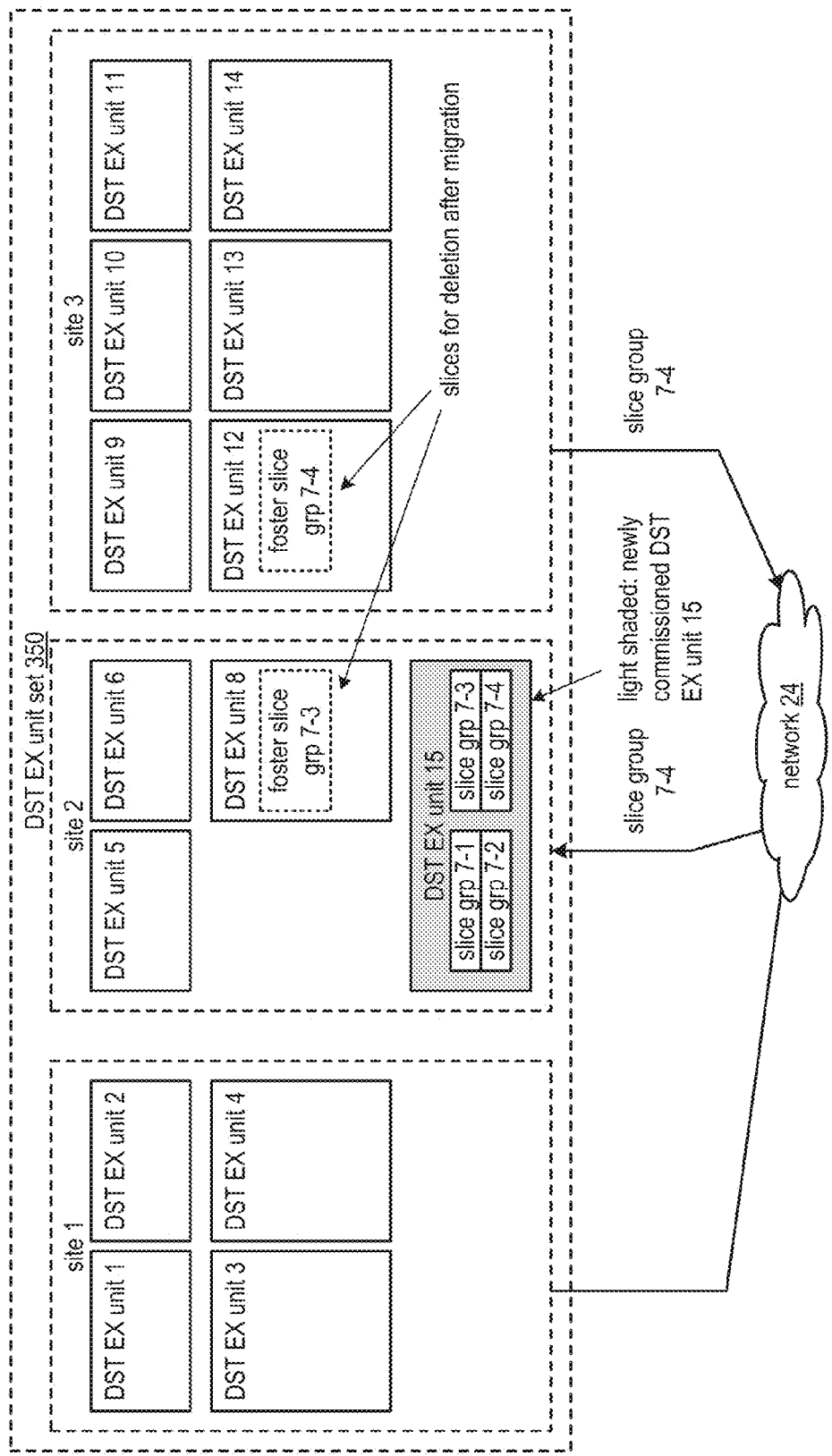
Figure 42C:
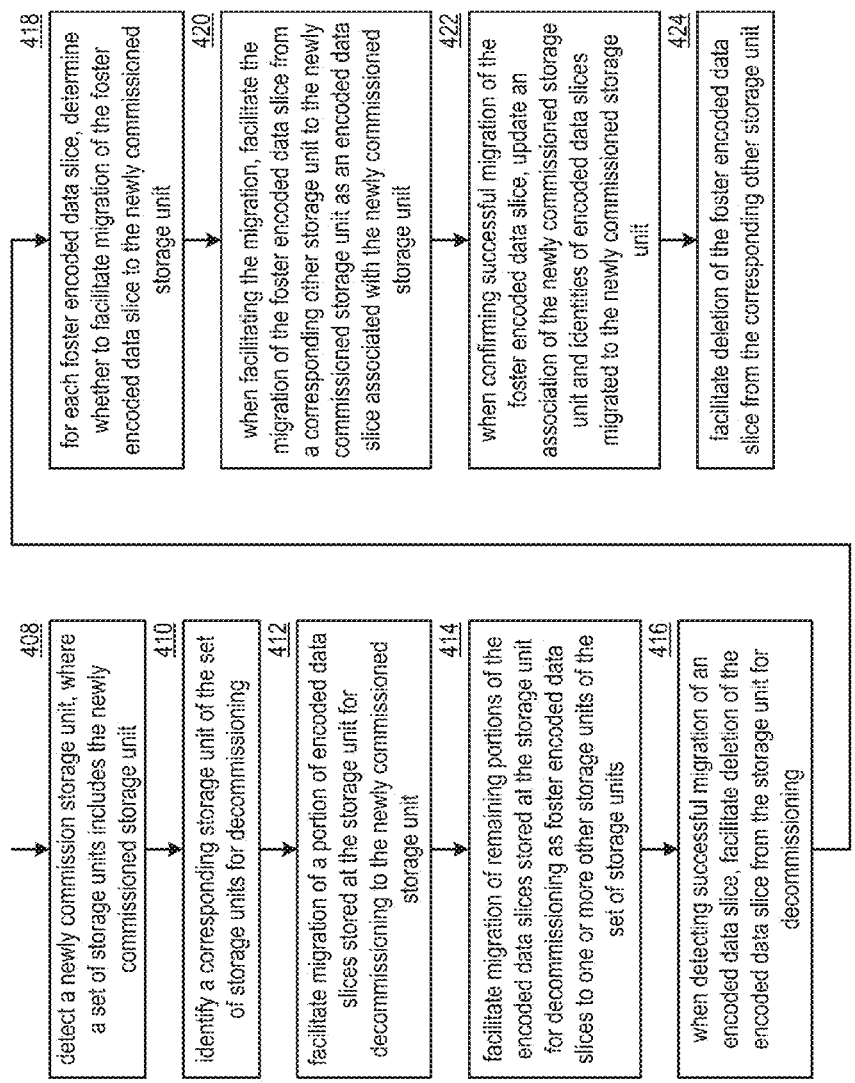
Figure 43A:
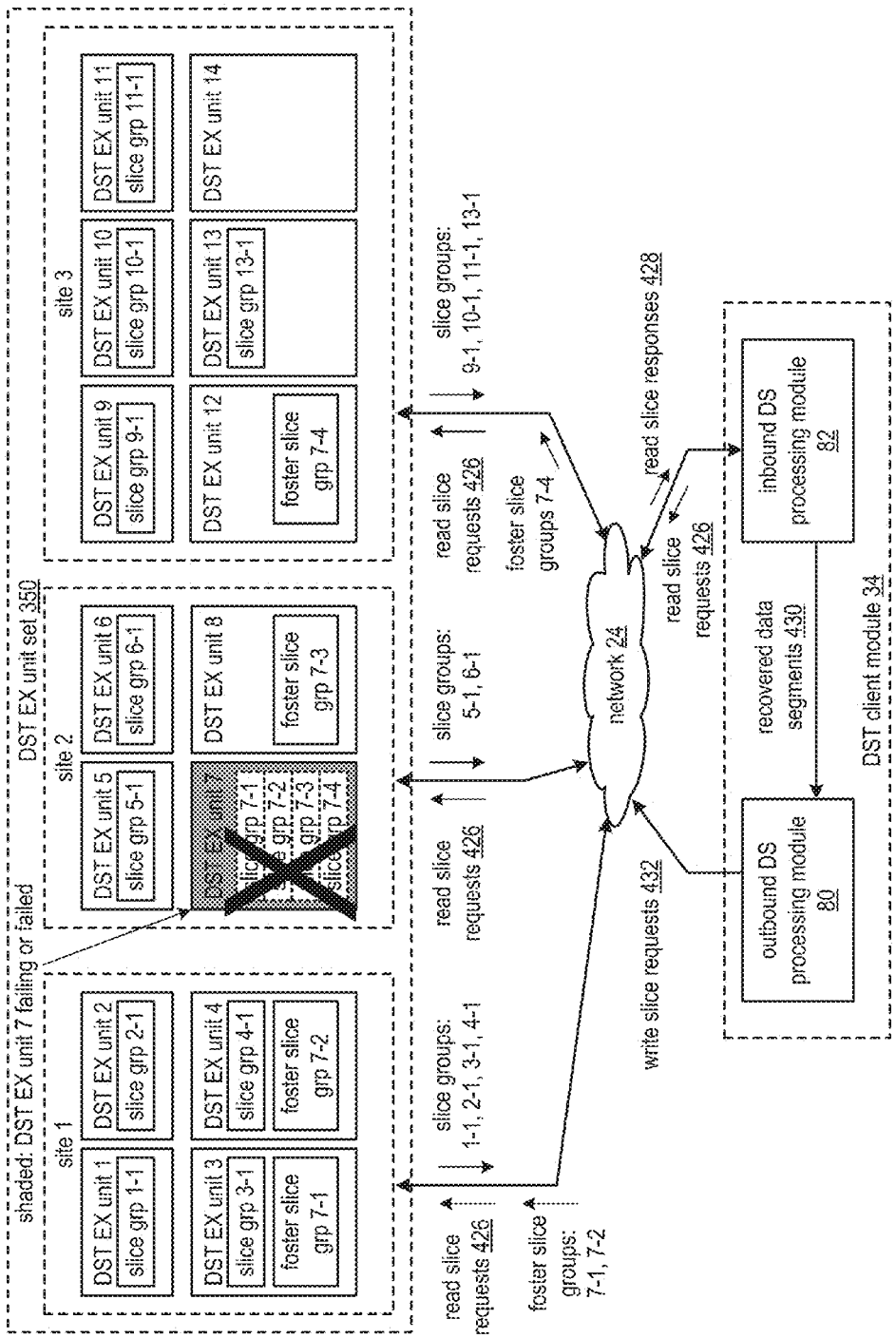
Figure 43B:
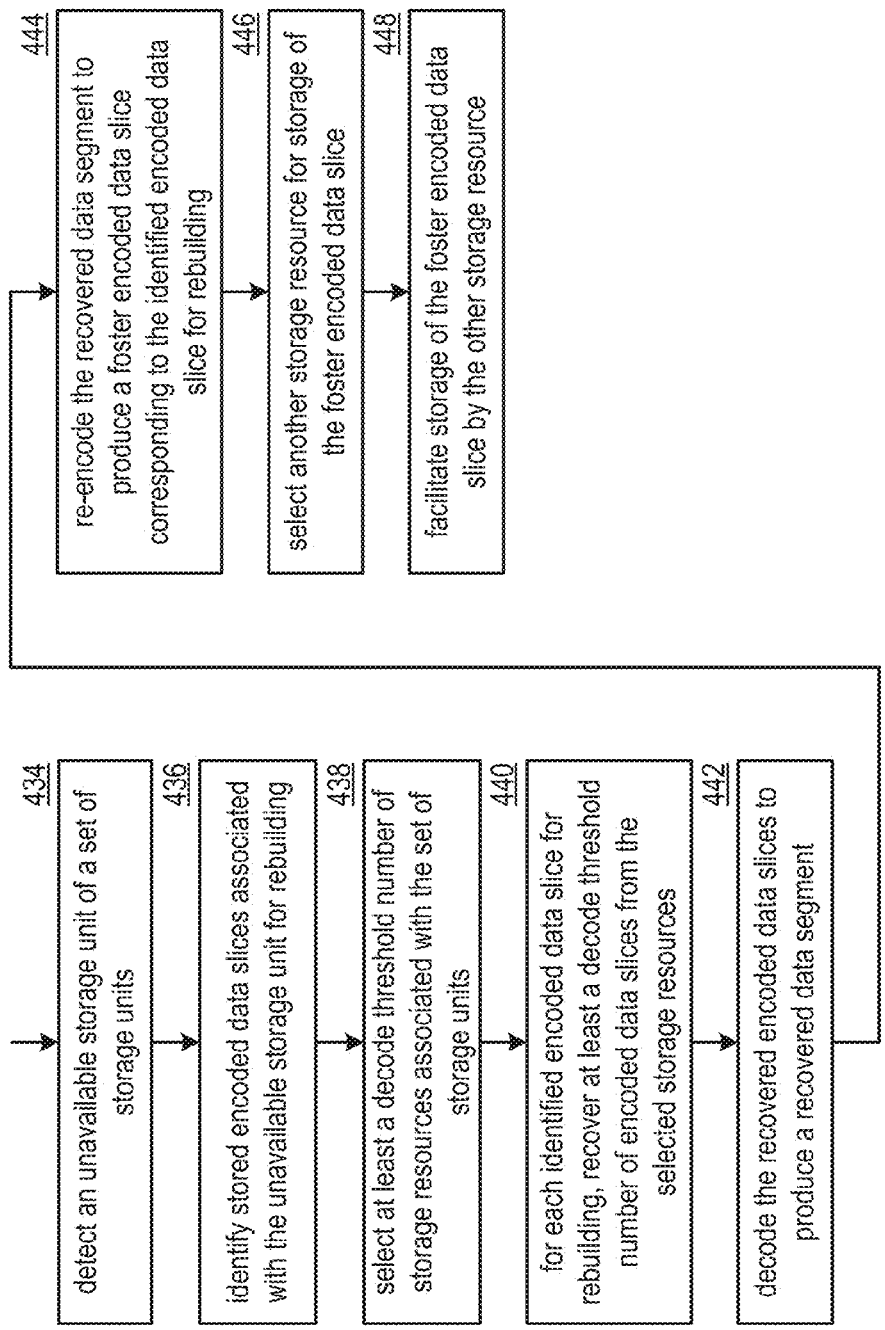
Figure 44A:
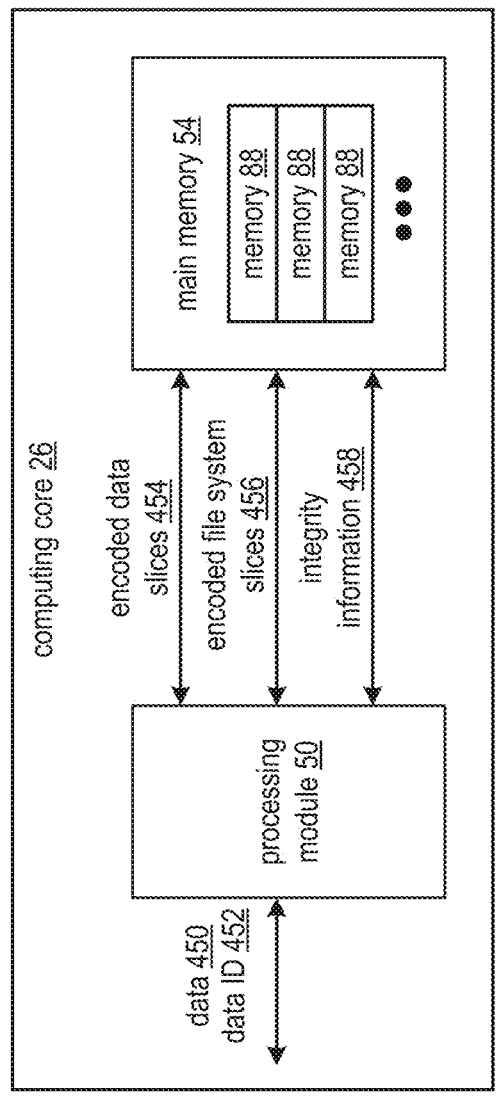
Figure 44B:
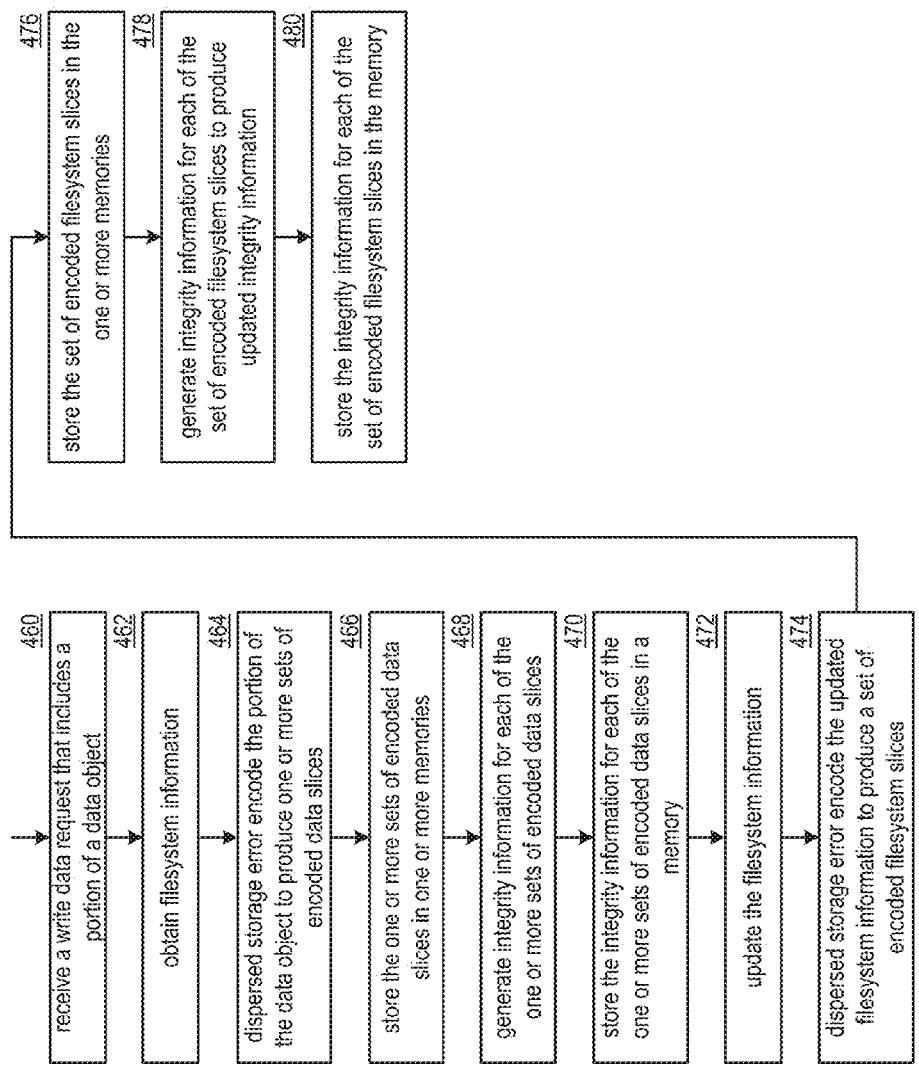
Figure 44C:
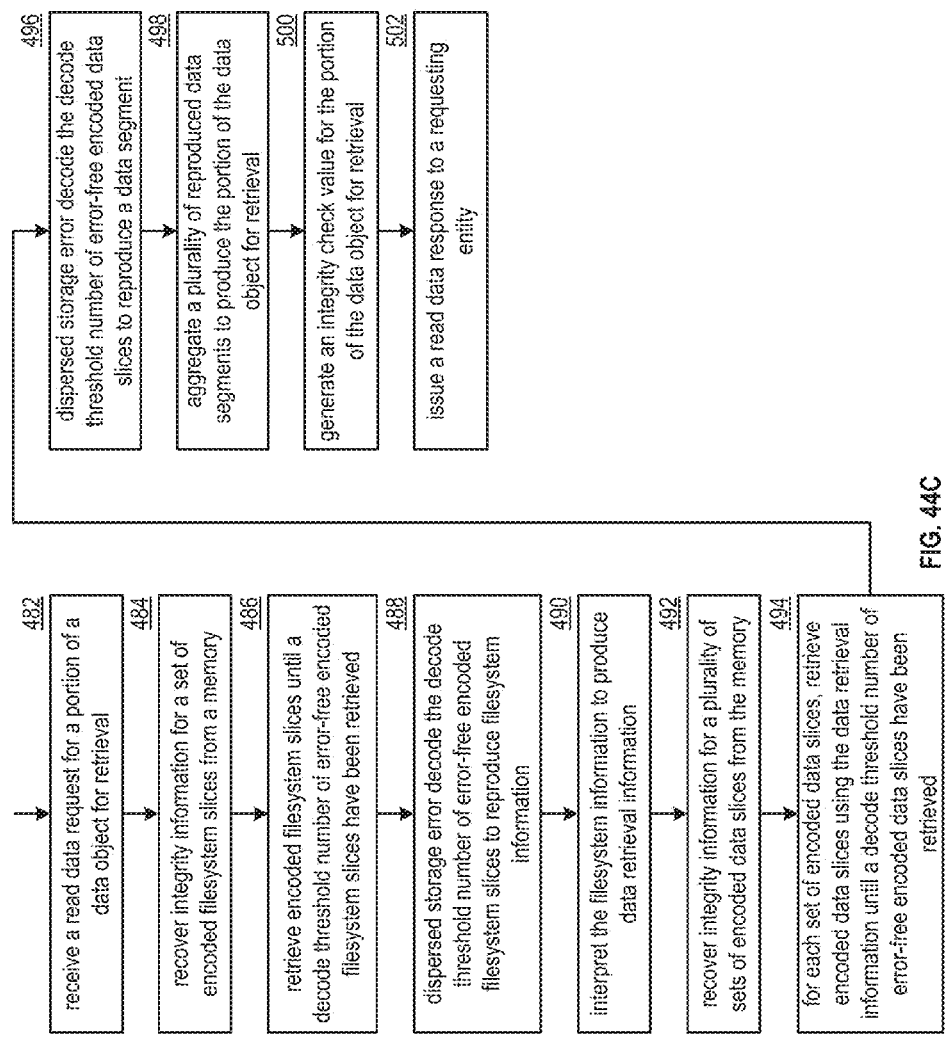
Figure 45A:
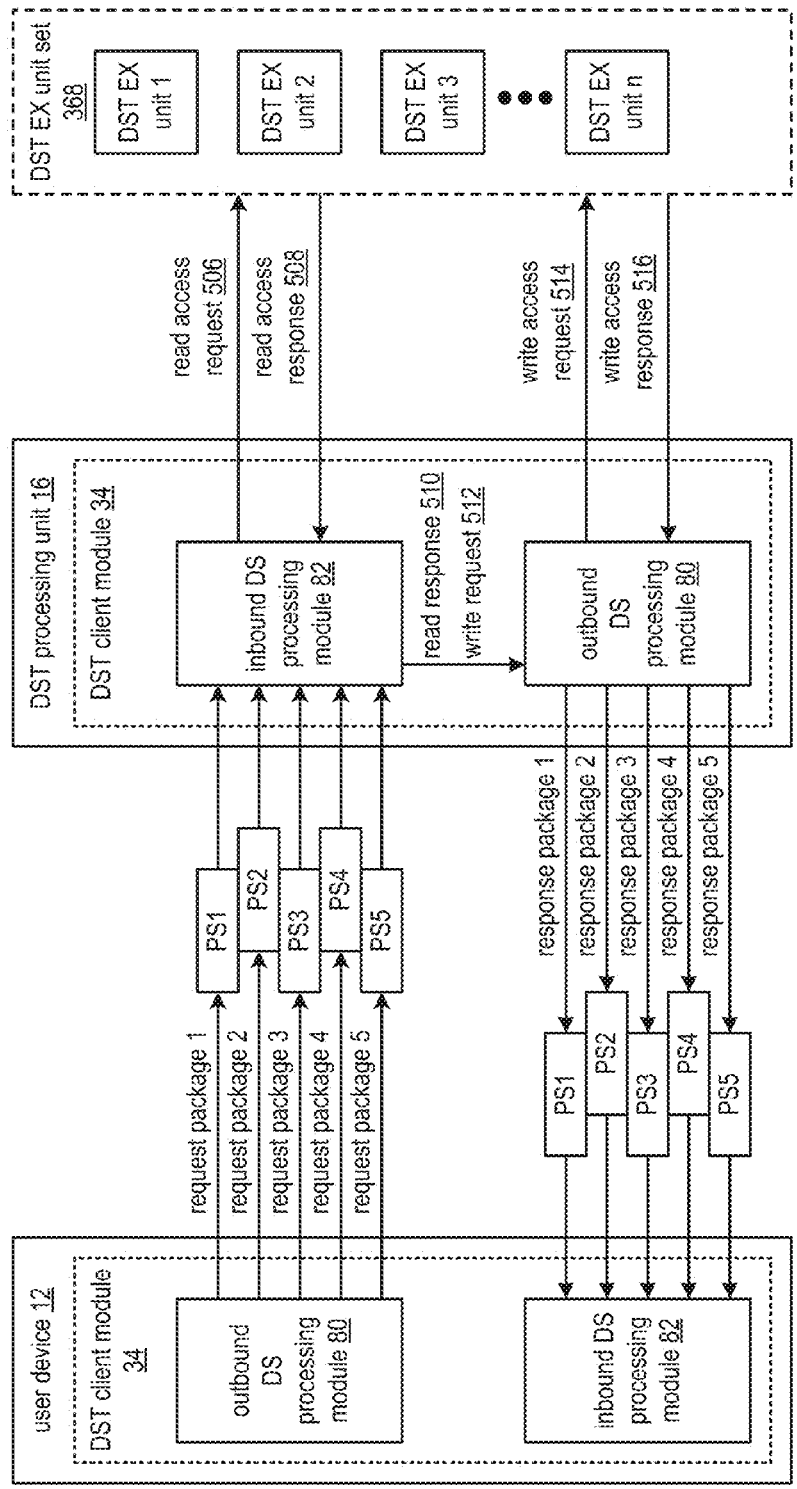
Figure 45B:
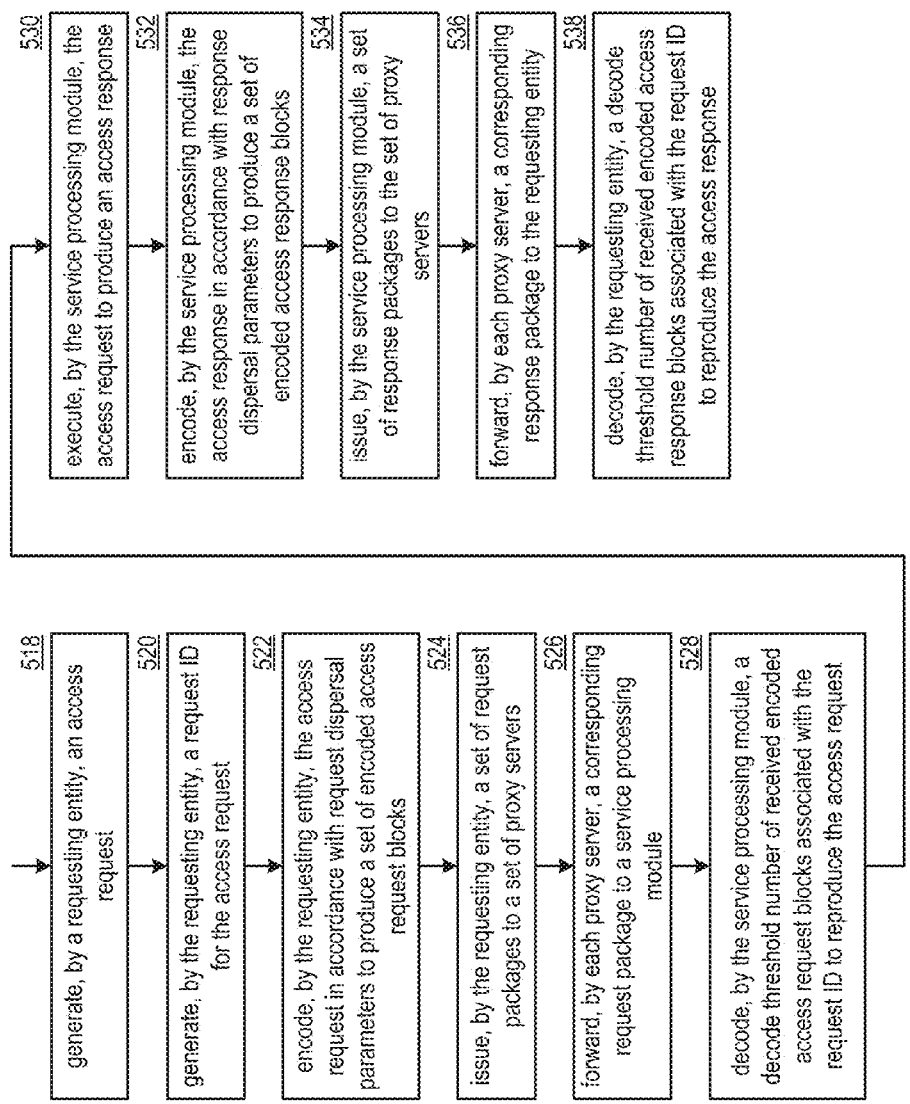
Figure 46A:
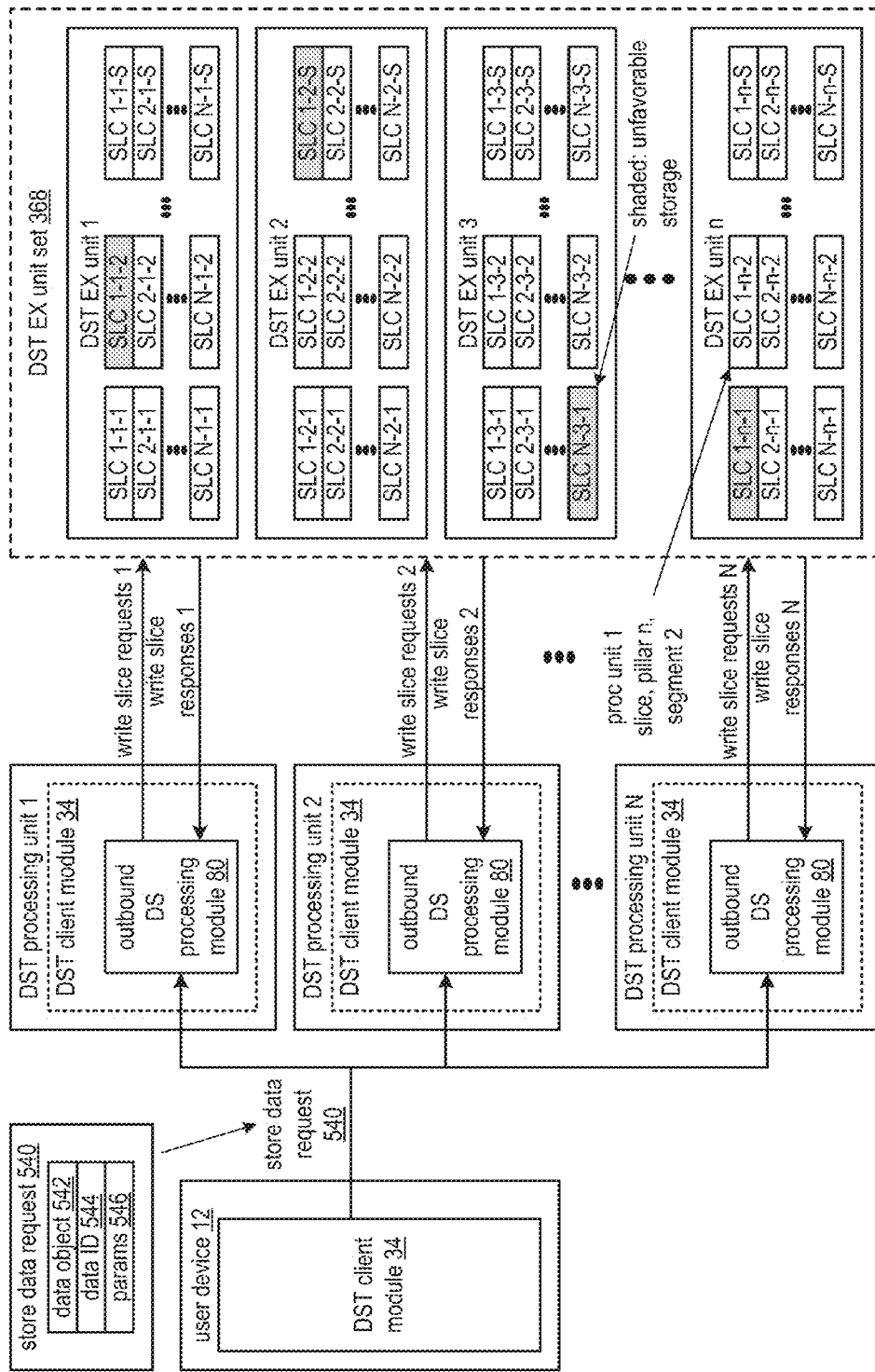
Figure 46B:
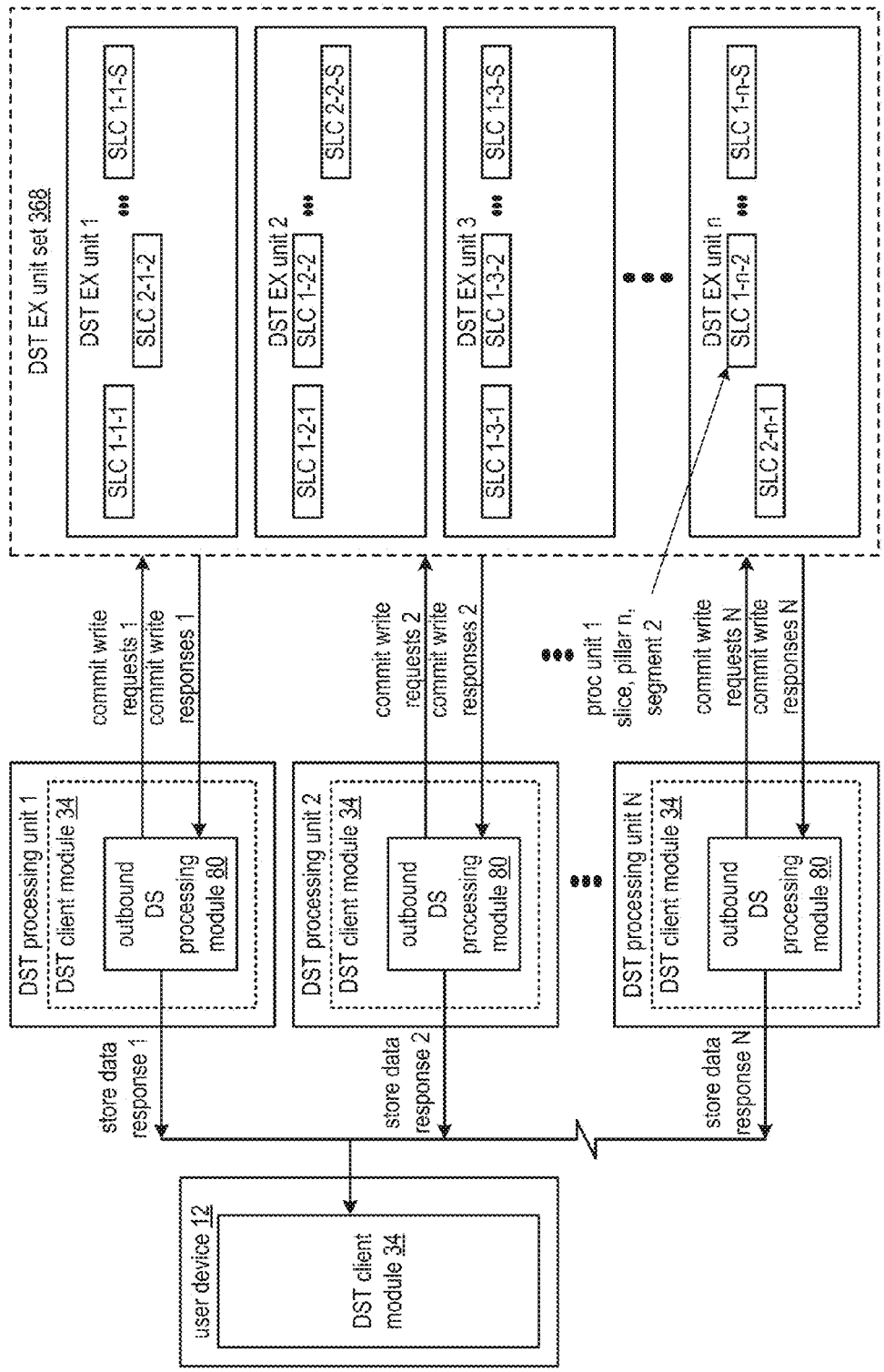
Figure 46C:
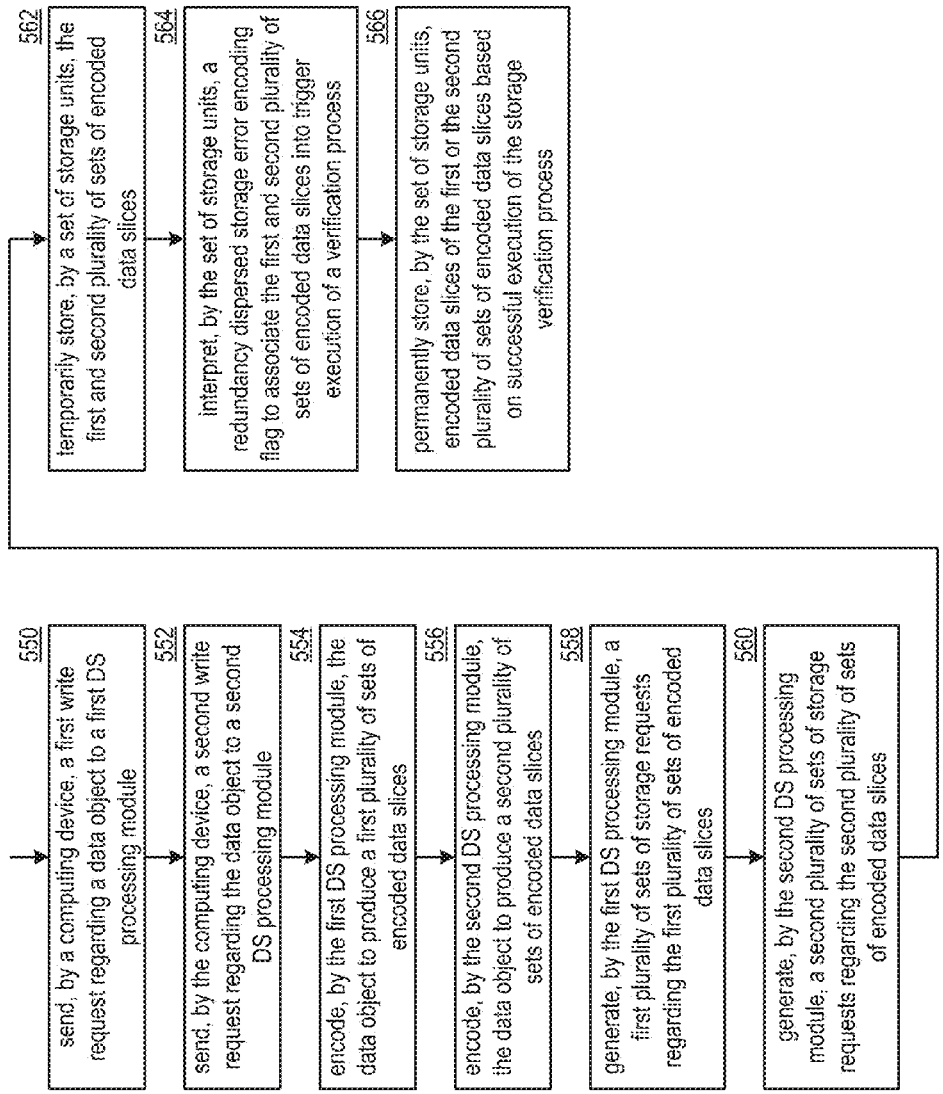
Figure 47A:
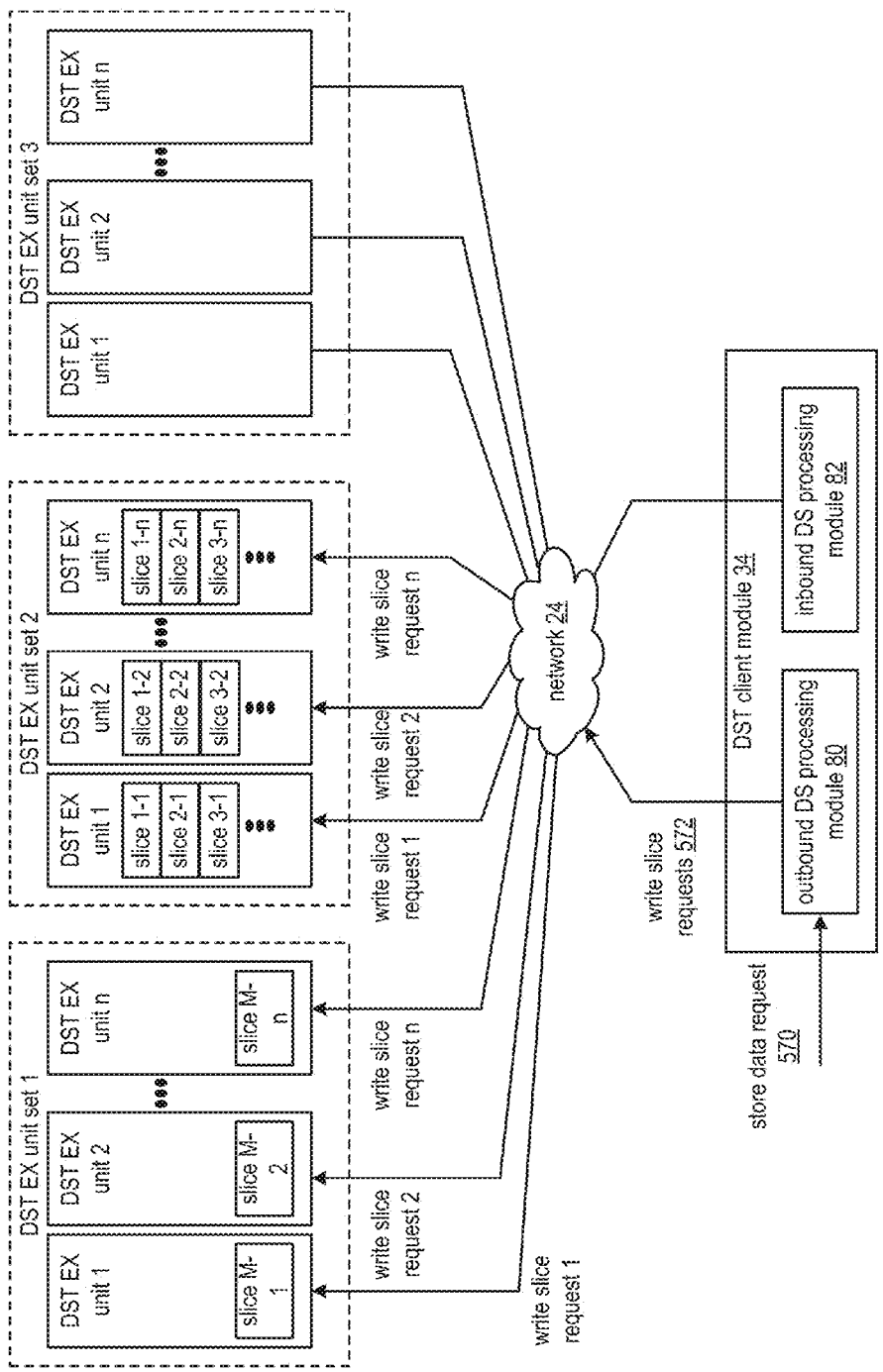
Figure 47B:
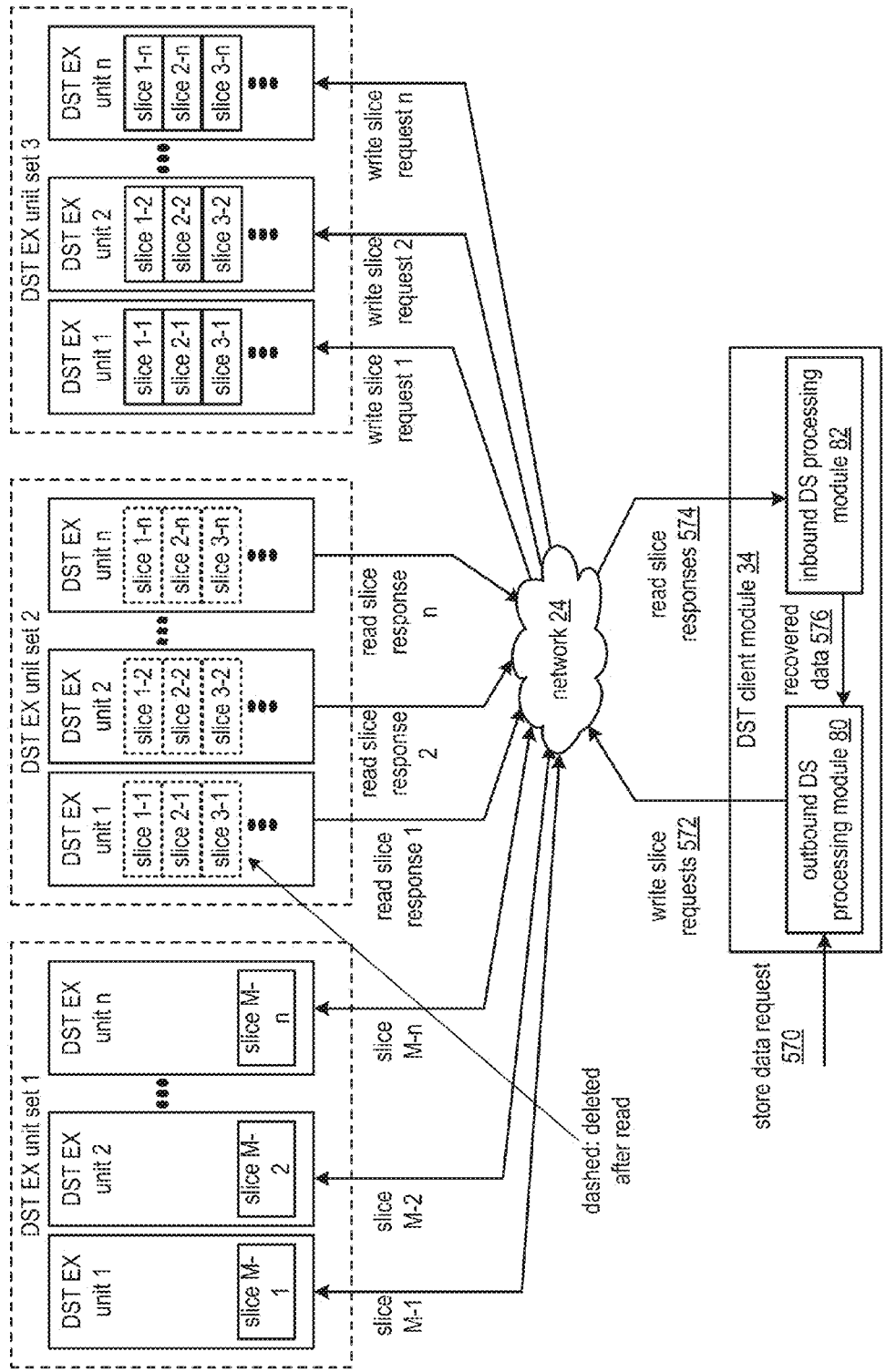
Figure 47C:
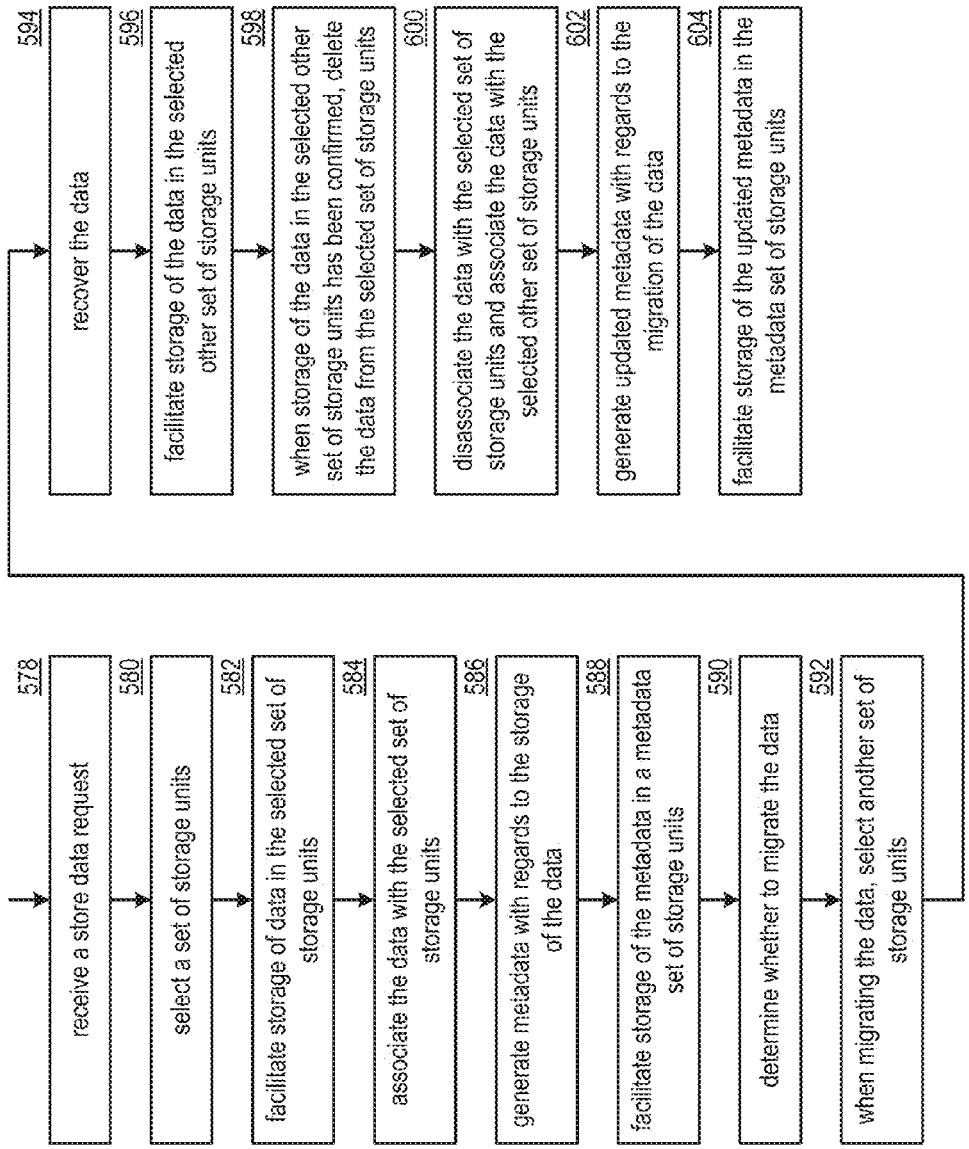

FIGS. 42A-B are schematic block diagrams of another embodiment of a dispersed storage network (DSN) illustrating an example of modifying allocation of storage resources in accordance with the present invention;

FIG. 42C is a flowchart illustrating an example of modifying allocation of storage resources in accordance with the present invention;

FIG. 43A is a schematic block diagram of another embodiment of a dispersed storage network (DSN) in accordance with the present invention;

FIG. 43B is a flowchart illustrating an example of rebuilding stored data in accordance with the present invention;

FIG. 44A is a schematic block diagram of another embodiment of a computing core in accordance with the present invention;

FIG. 44B is a flowchart illustrating an example of storing data in accordance with the present invention;

FIG. 44C is a flowchart illustrating an example of retrieving data in accordance with the present invention;

FIG. 45A is a schematic block diagram of another embodiment of a dispersed storage network (DSN) in accordance with the present invention;

FIG. 45B is a flowchart illustrating an example of accessing a dispersed storage network (DSN) in accordance with the present invention;

FIGS. 46A-B are schematic block diagrams of another embodiment of a dispersed storage network (DSN) in accordance with the present invention;

FIG. 46C is a flowchart illustrating another example of storing data in accordance with the present invention;

FIGS. 47A-B are schematic block diagrams of an embodiment of a dispersed storage network (DSN) illustrating an example of migrating data in accordance with the present invention; and FIG. 47C is a flowchart illustrating an example of migrating data in accordance with the present invention.

DETAILED DESCRIPTION OF THE INVENTION

Figure 1:
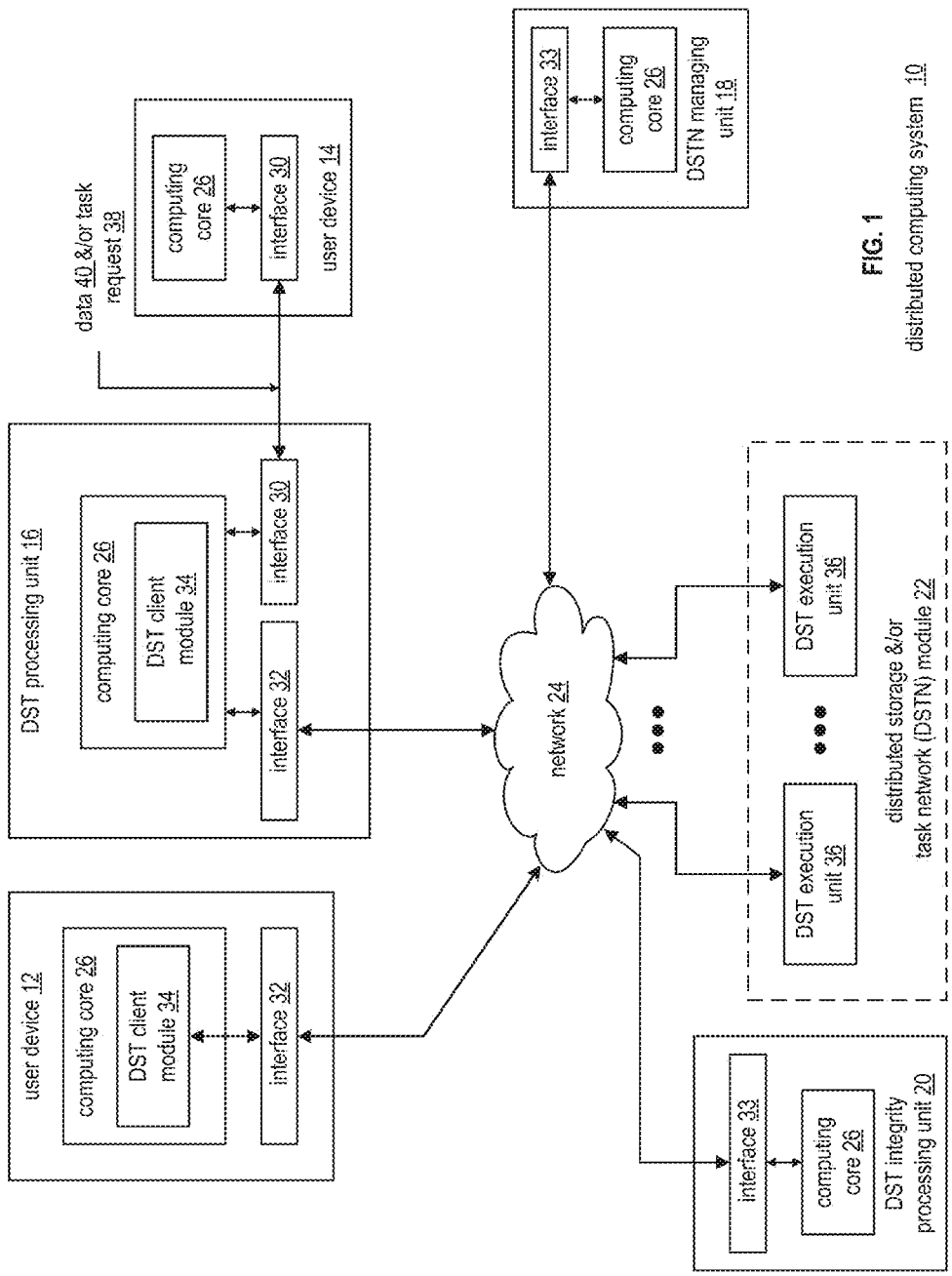
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
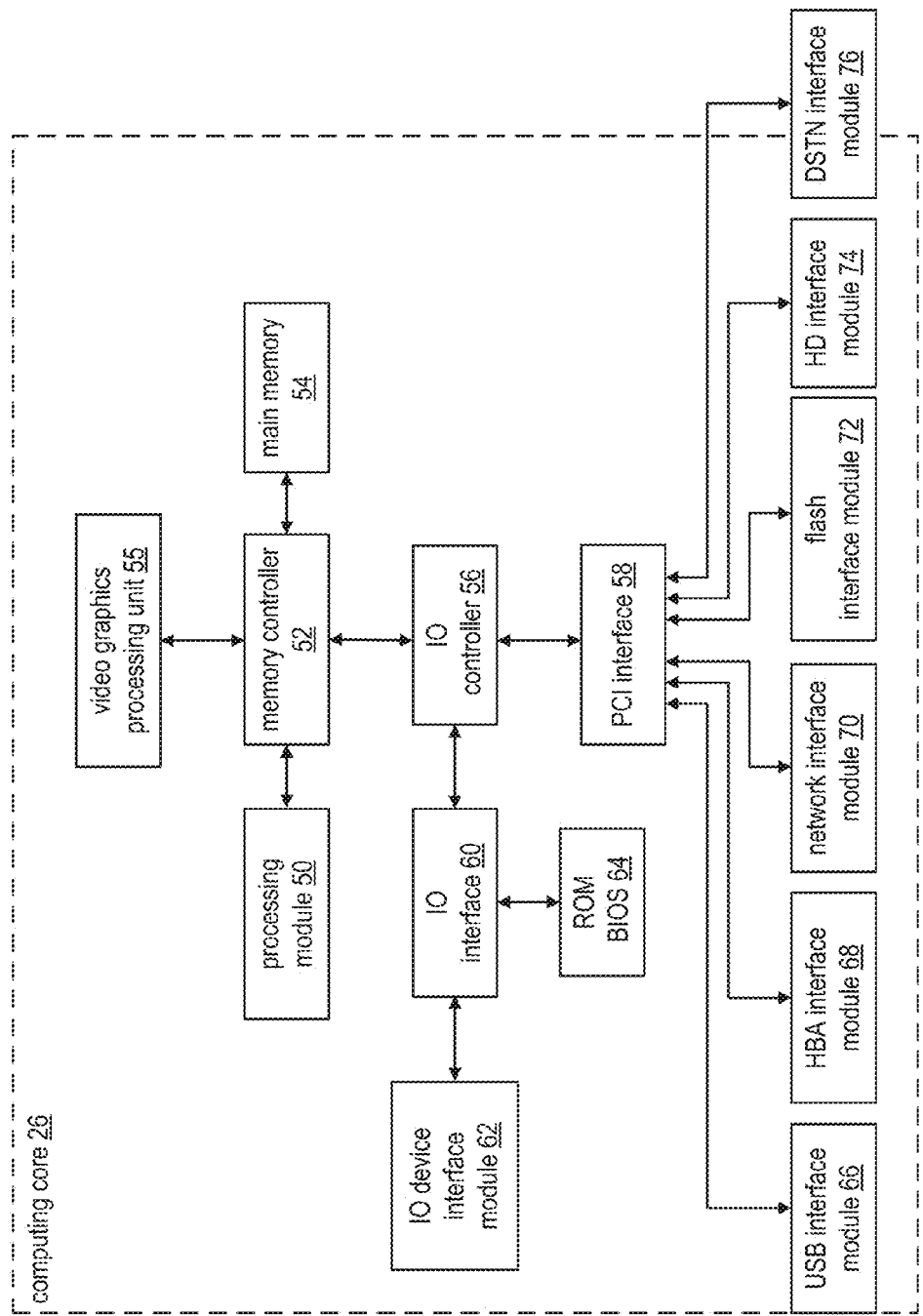
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
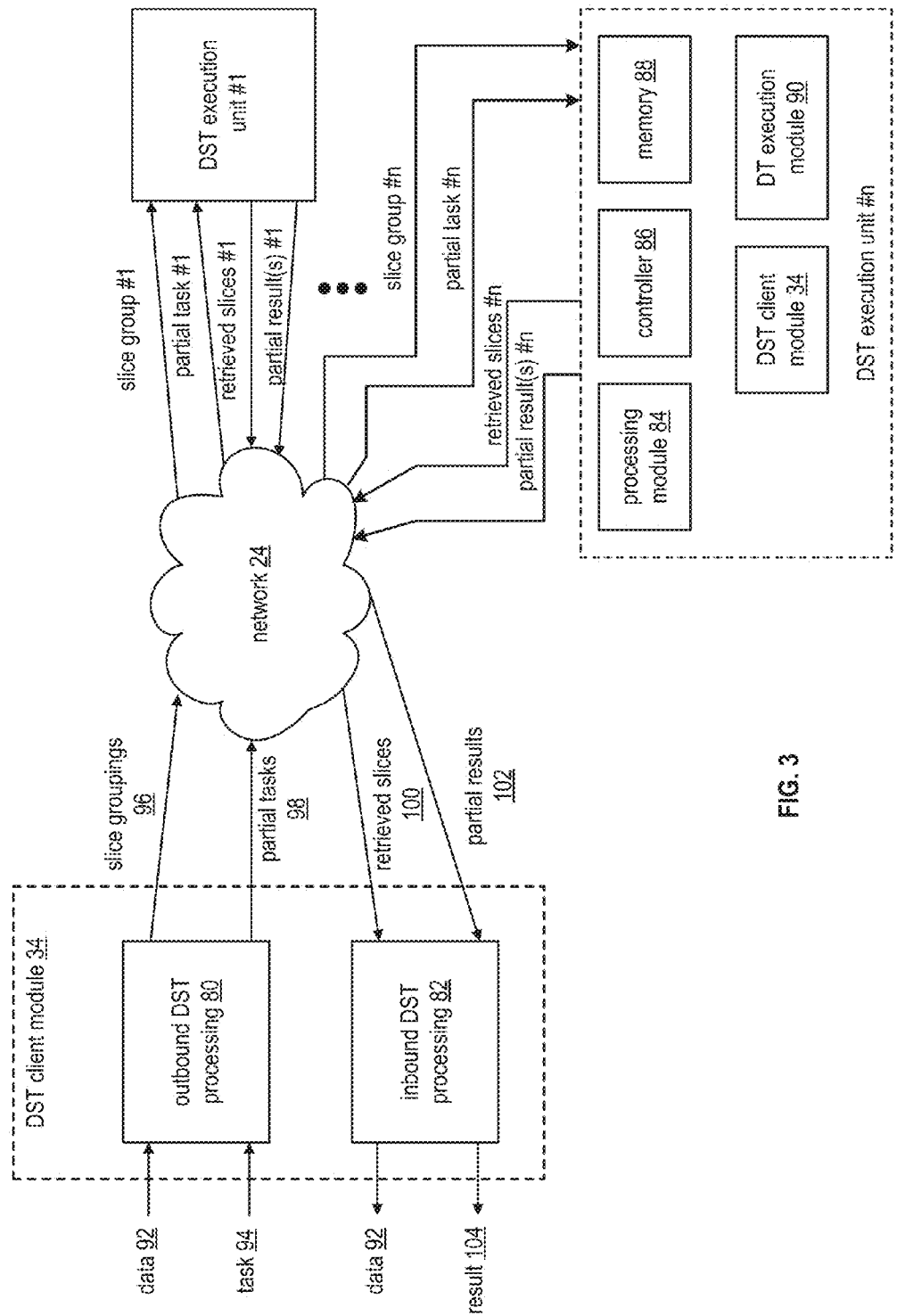
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
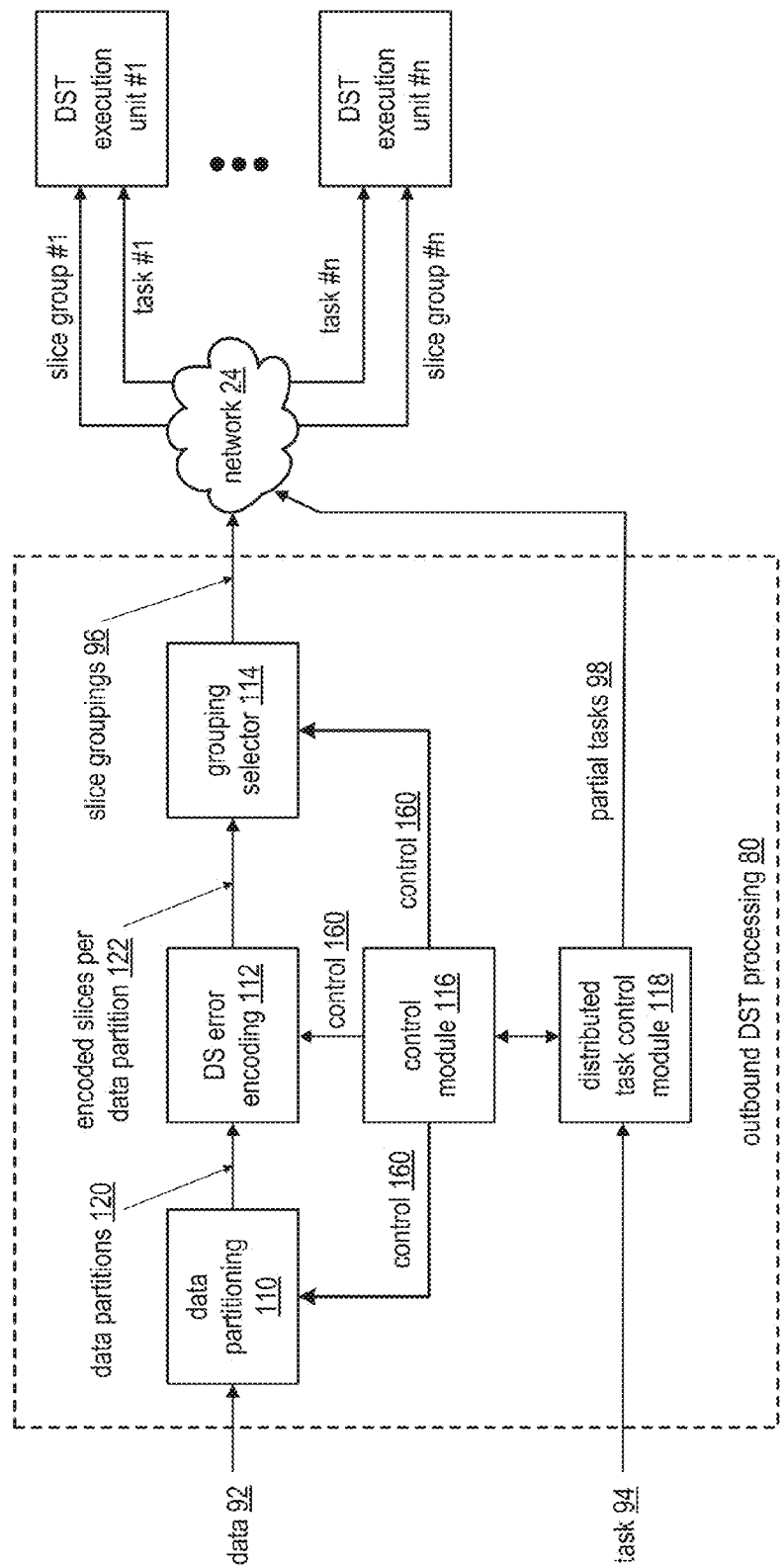
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
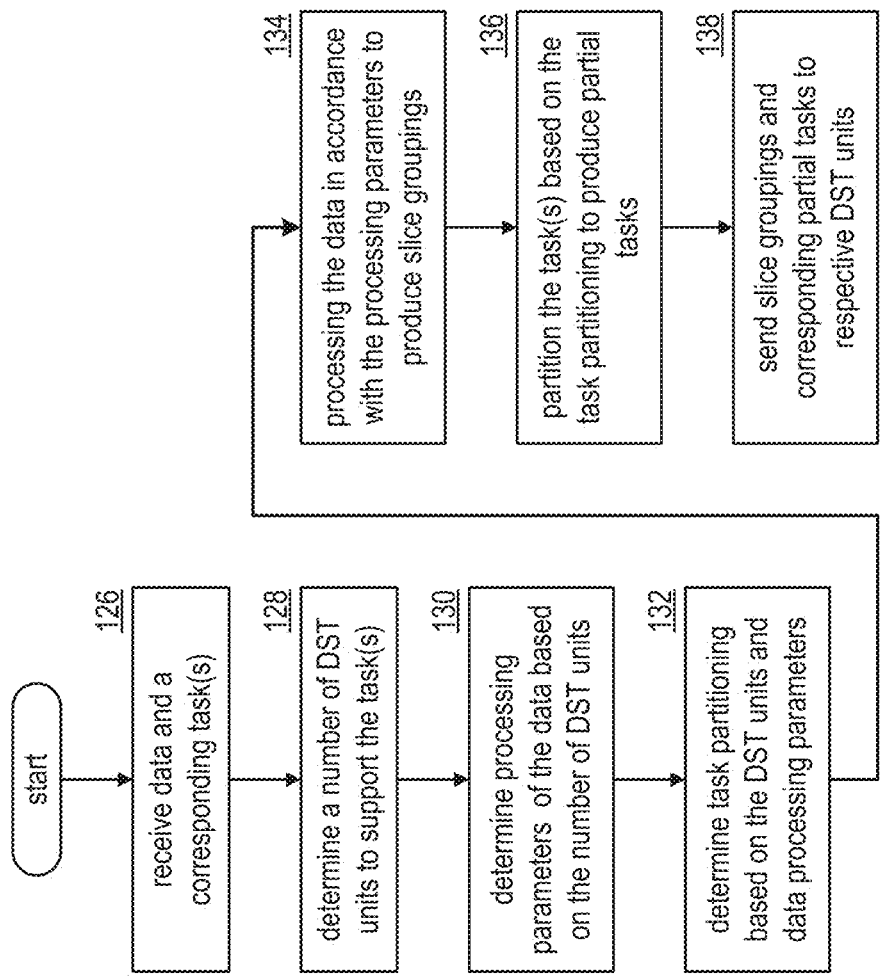
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
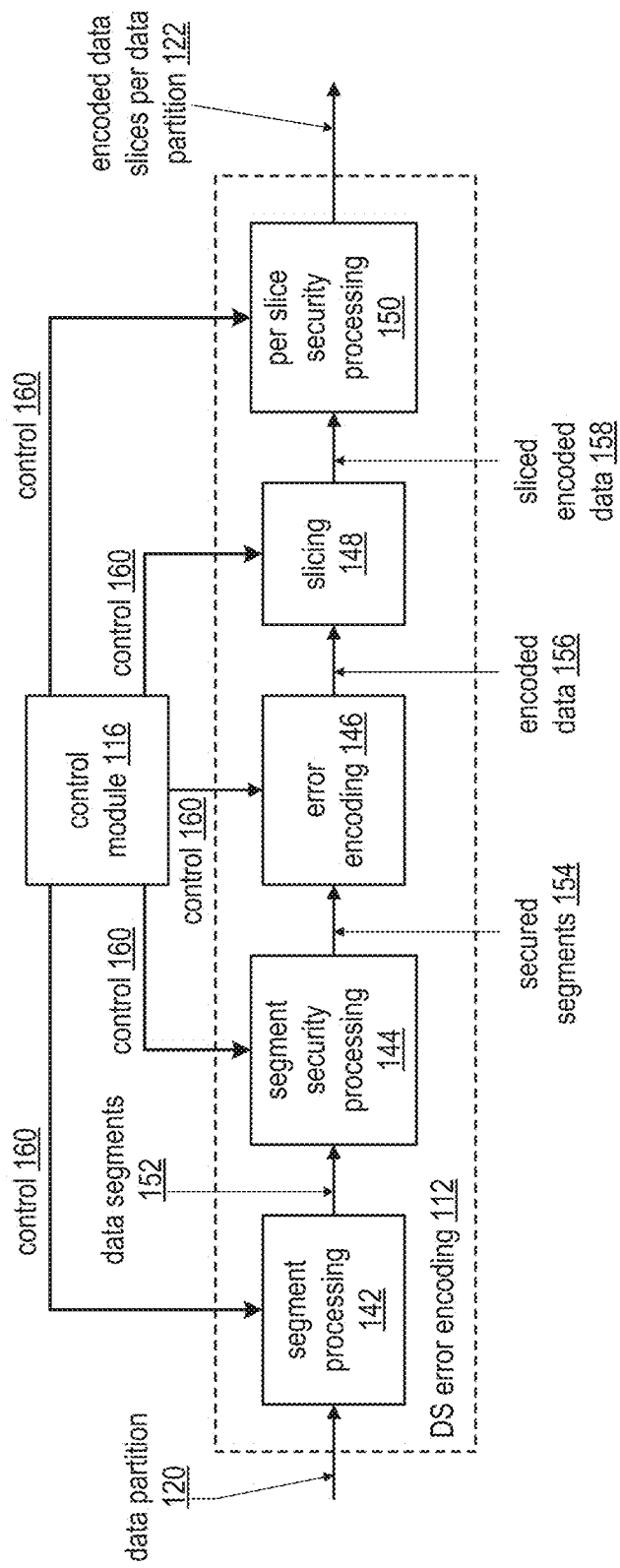
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
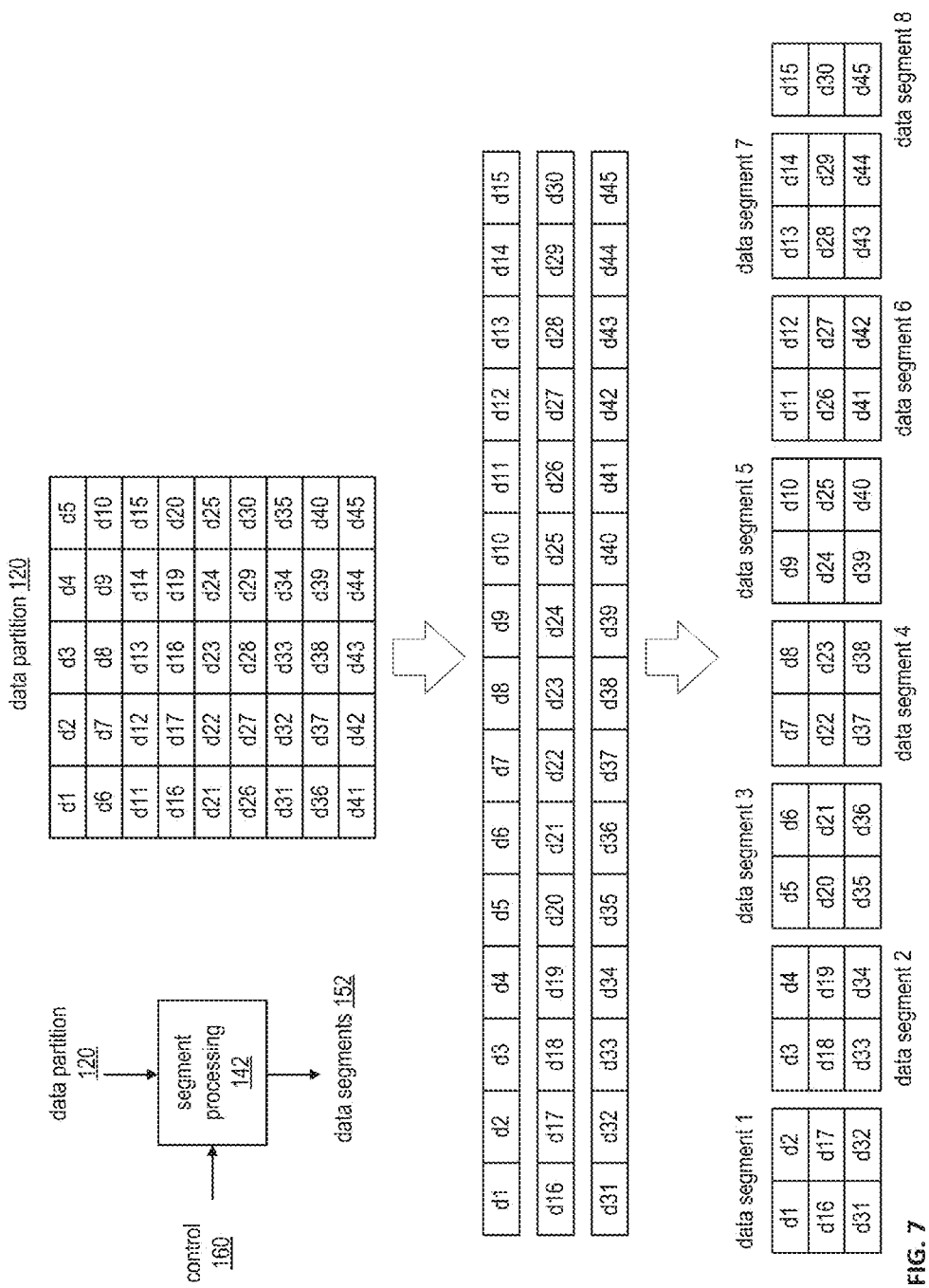
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
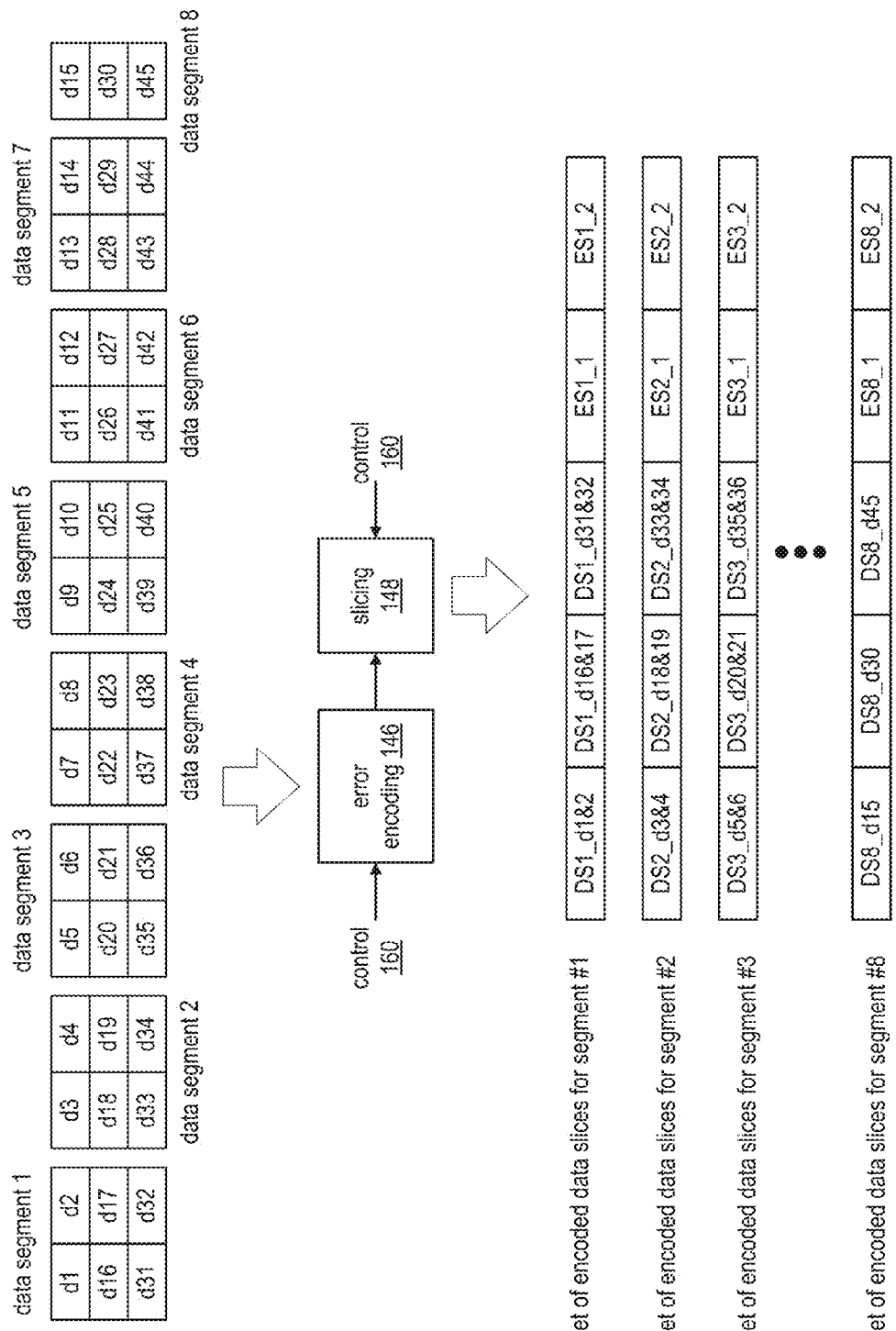
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
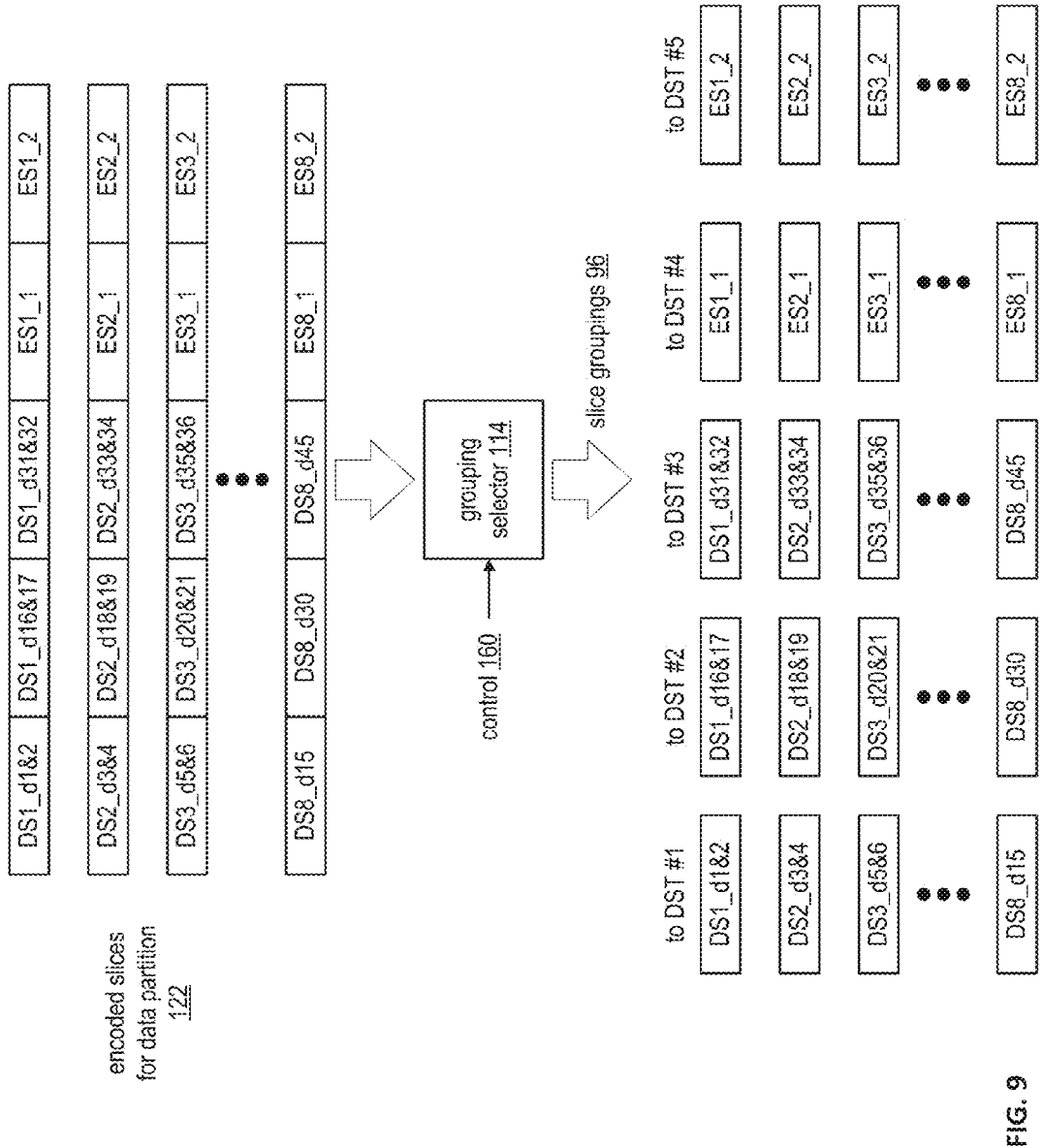
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
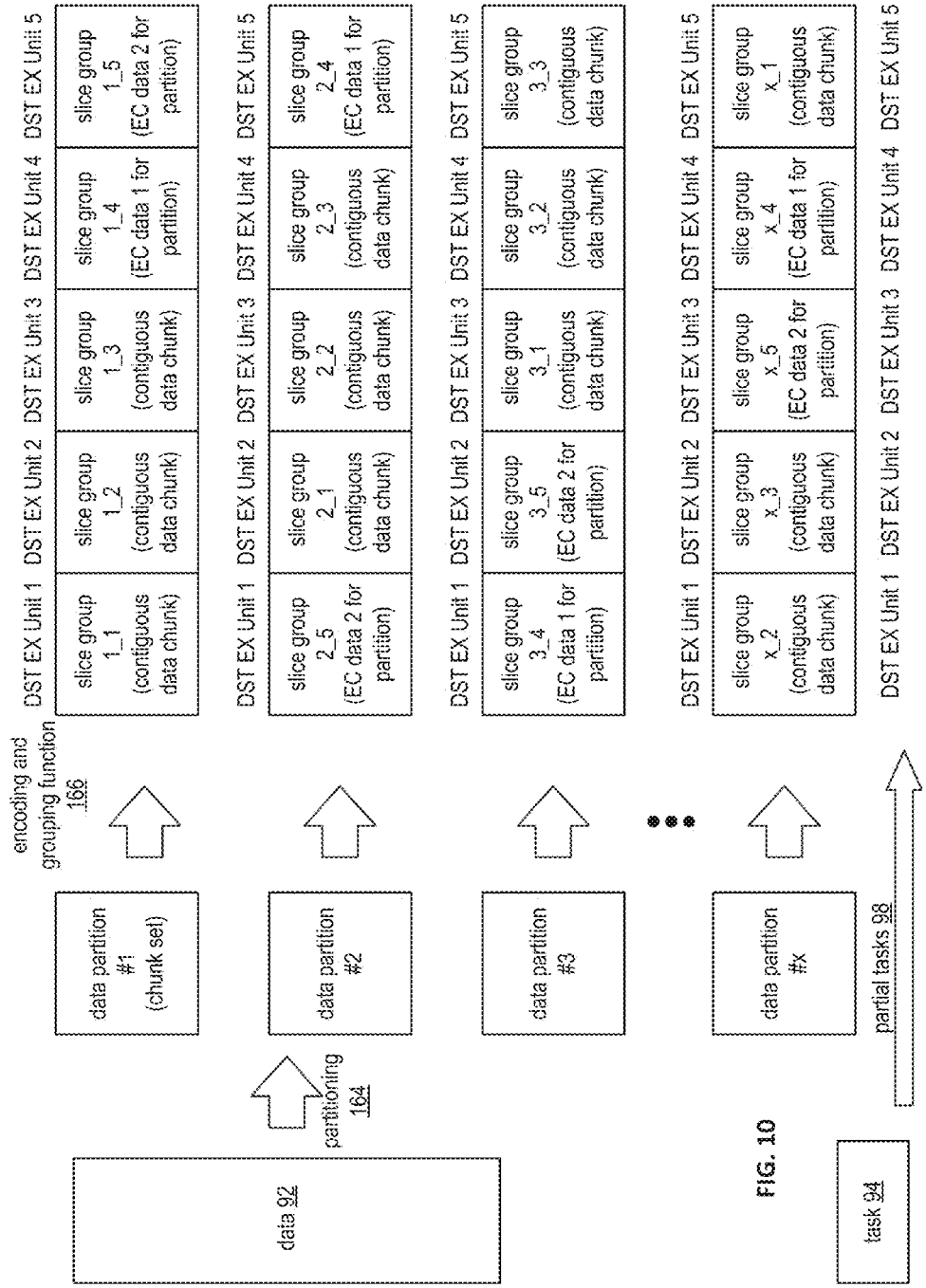
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
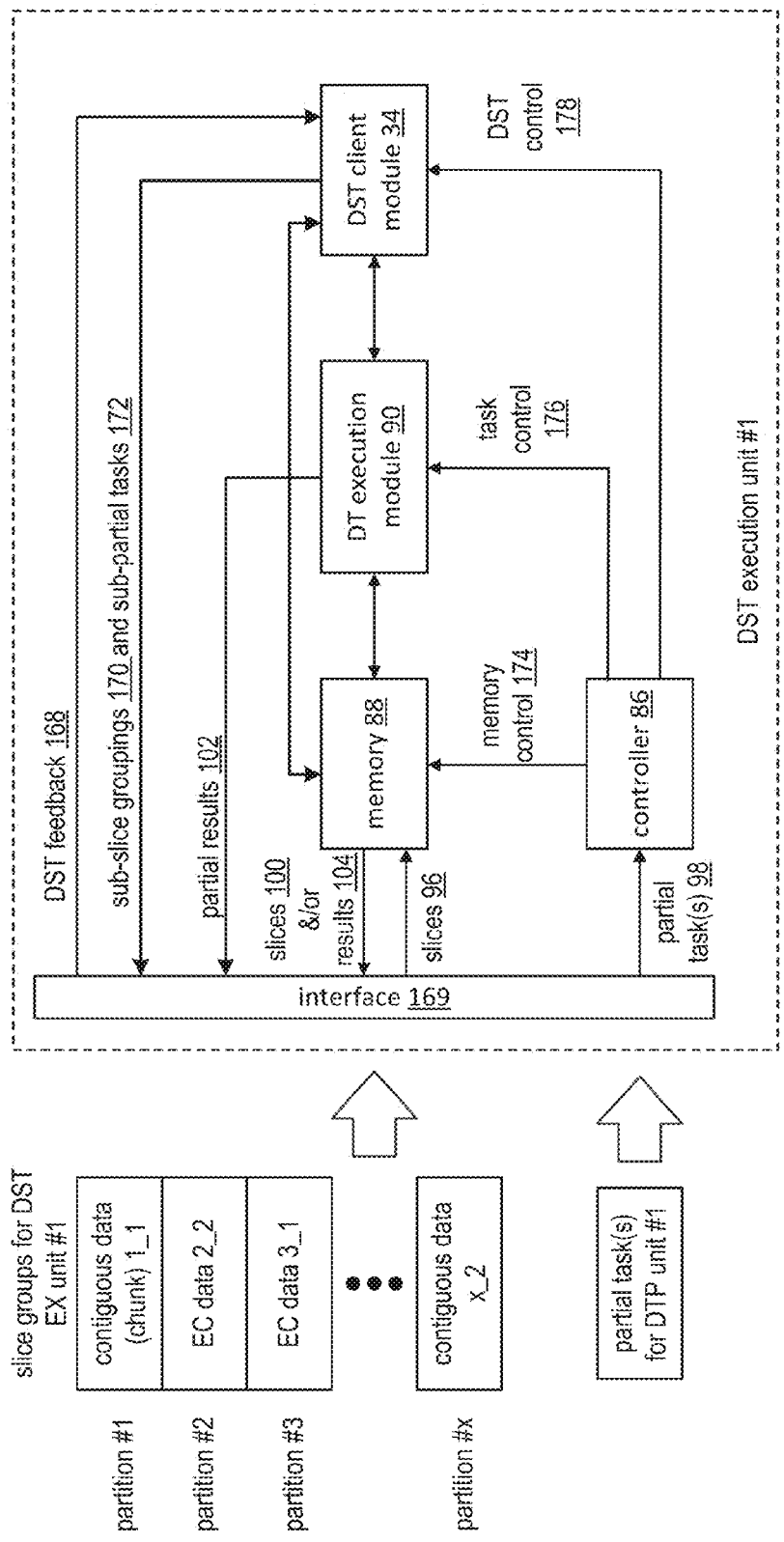
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
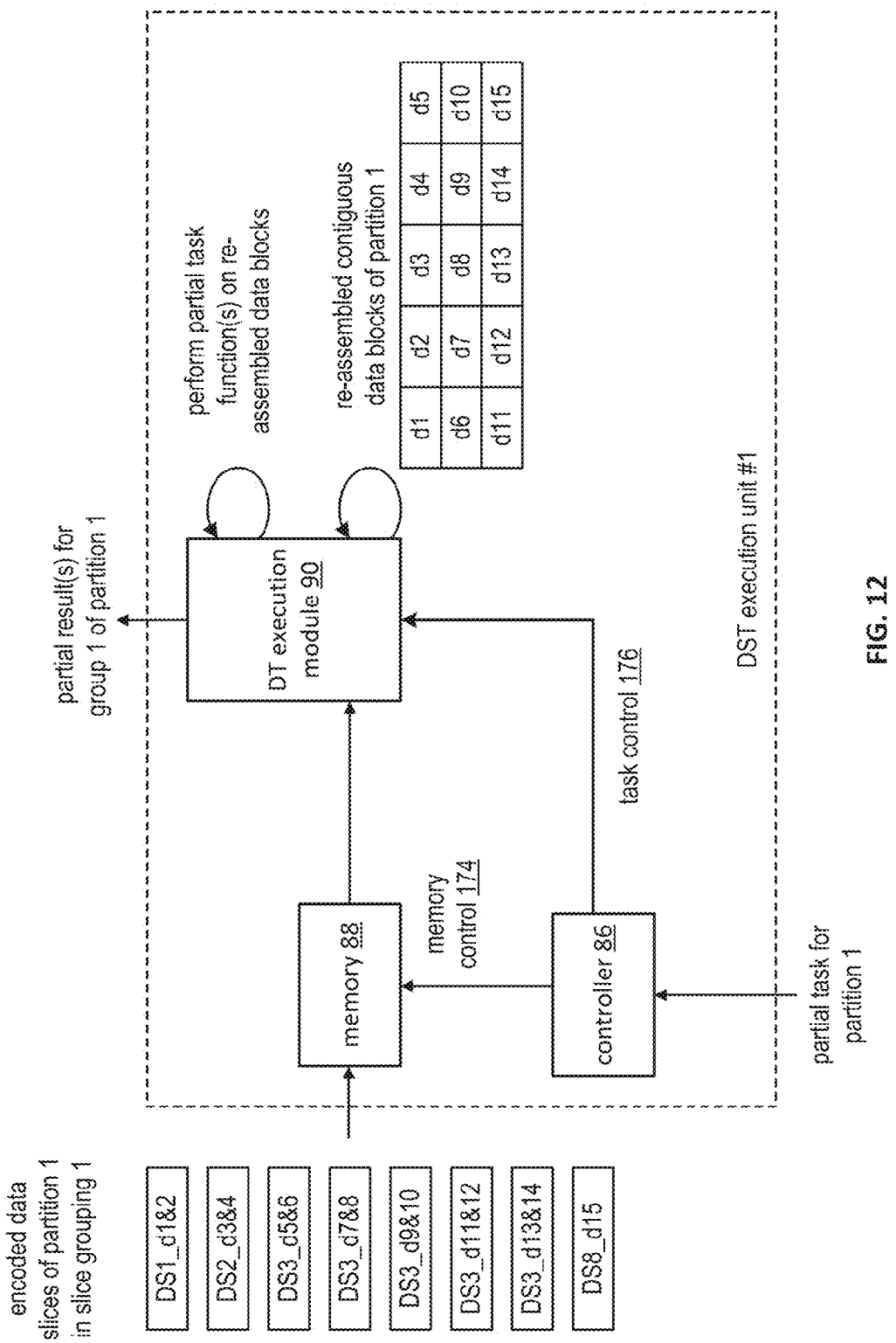
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
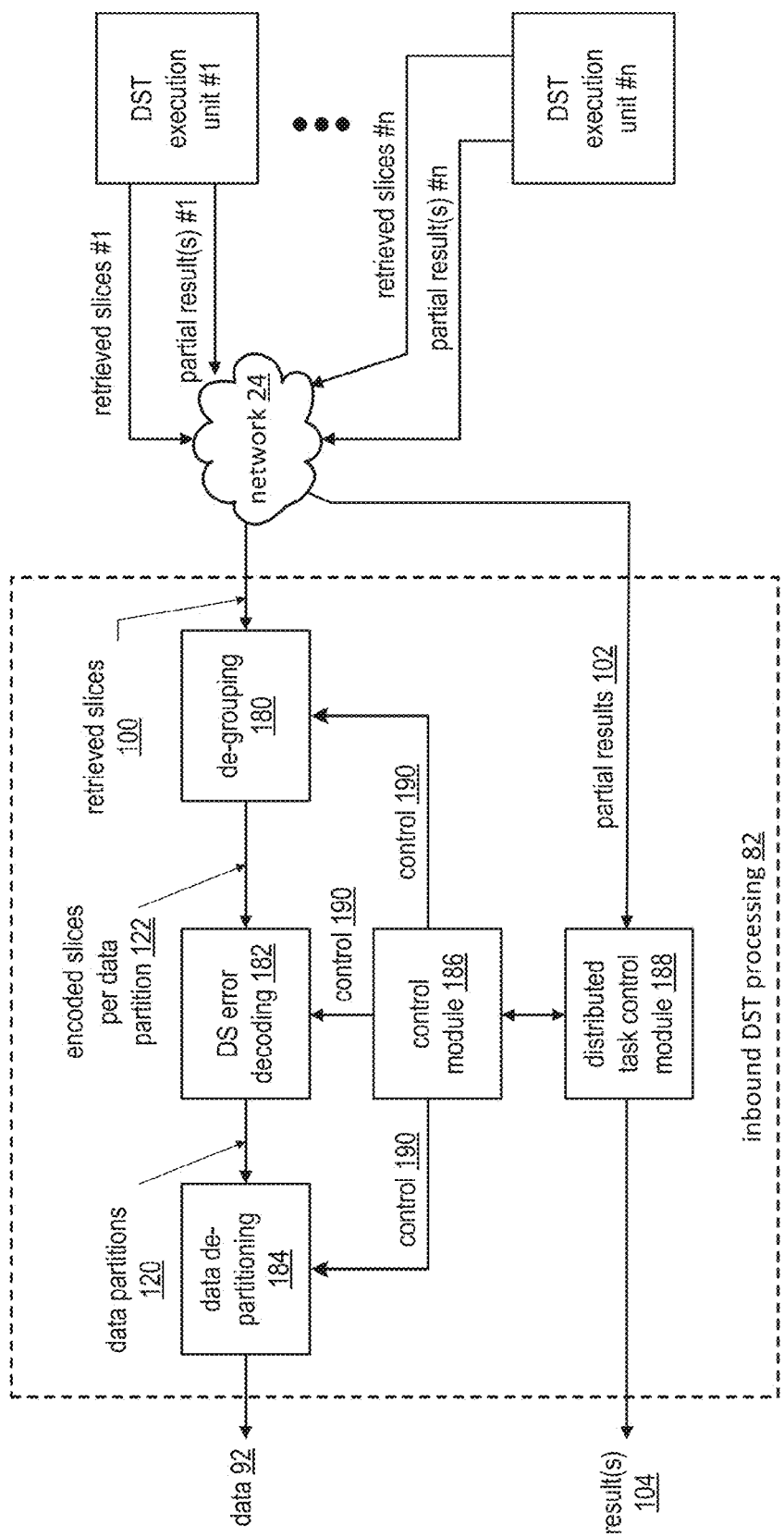
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
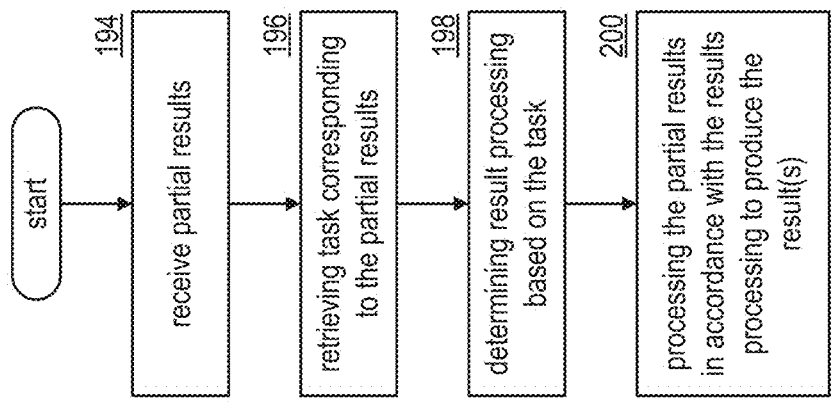
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
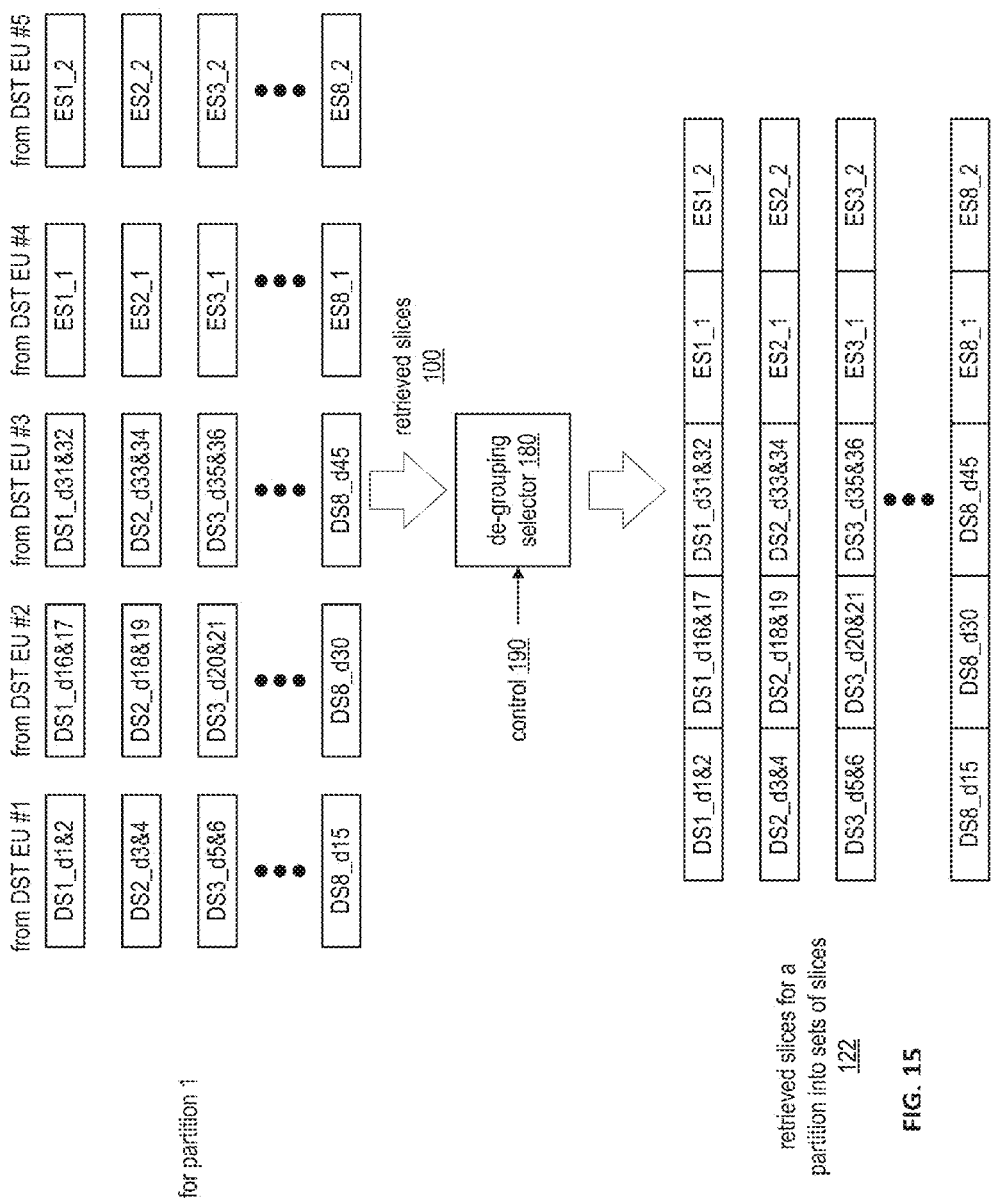
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
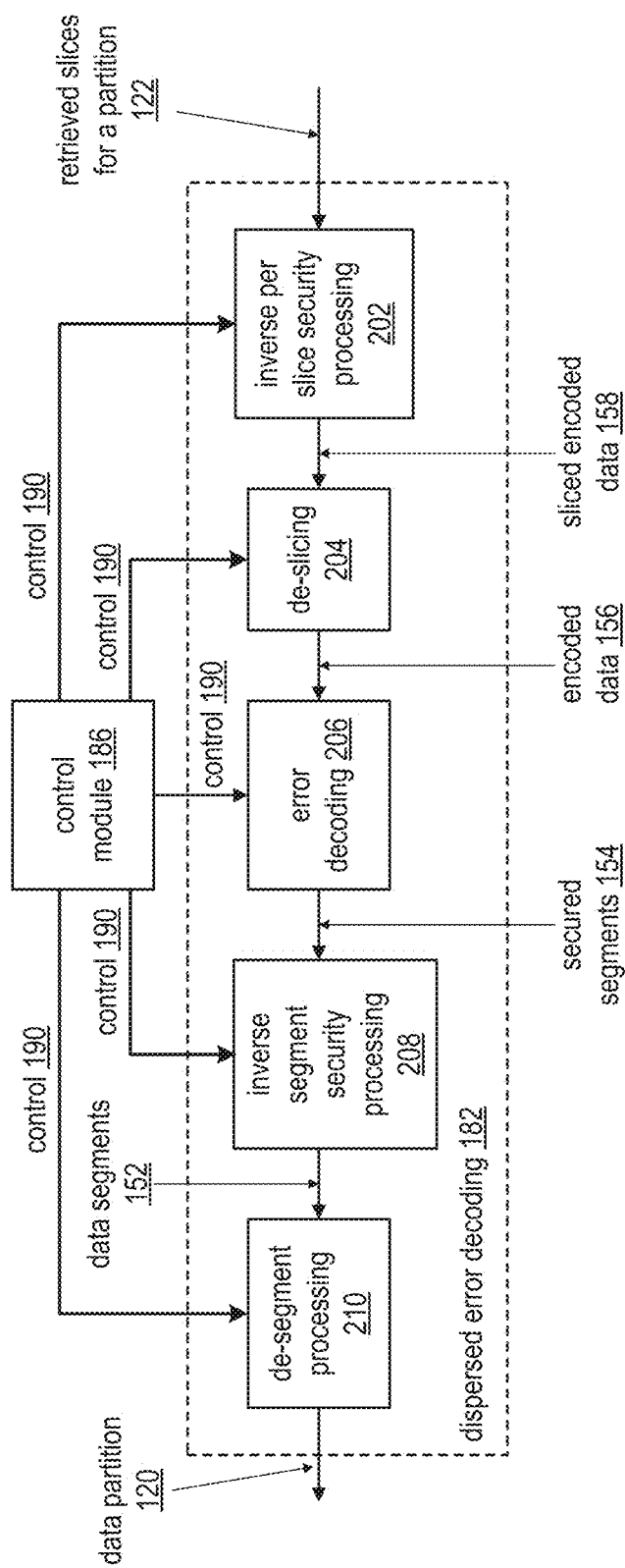
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
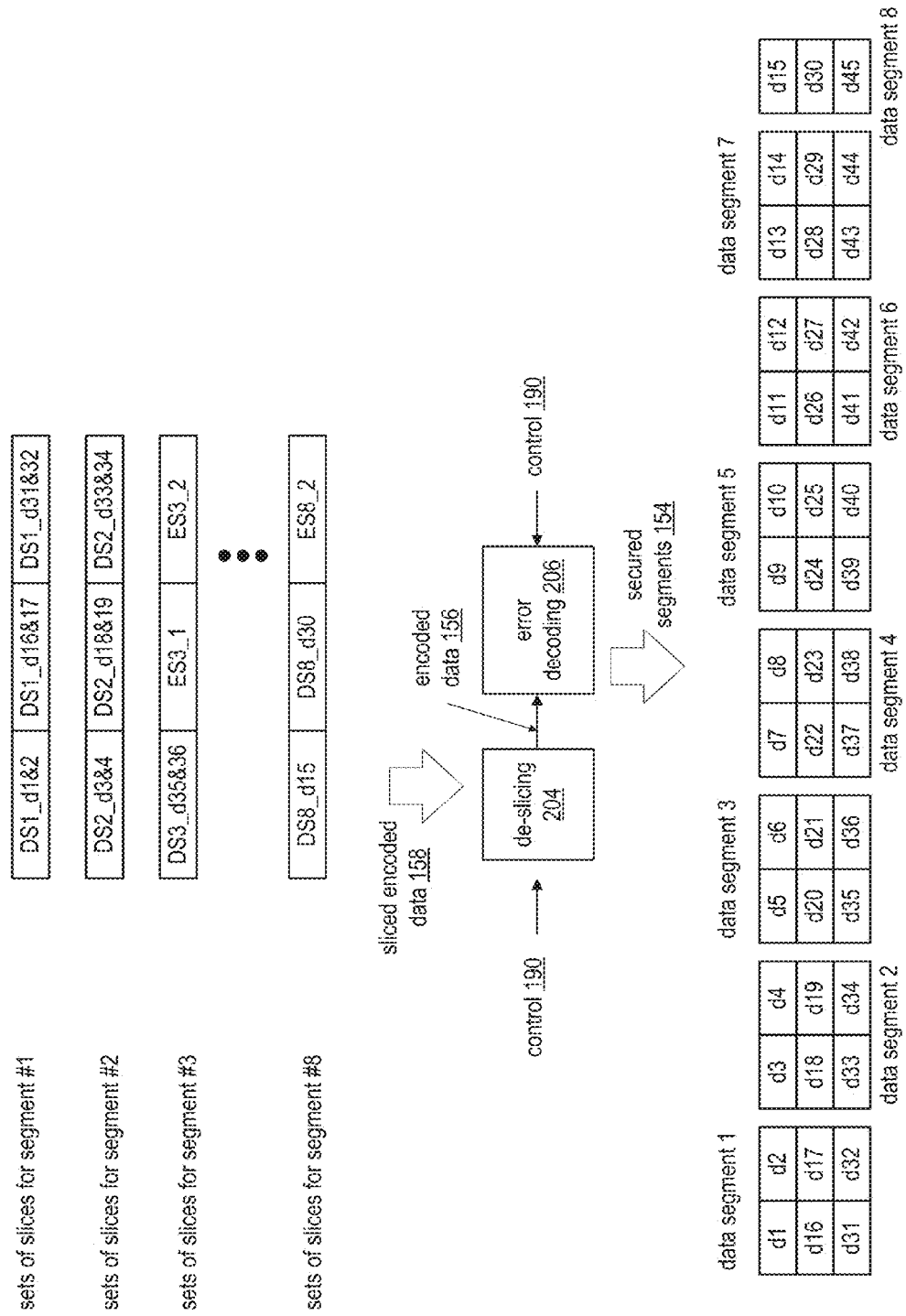
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
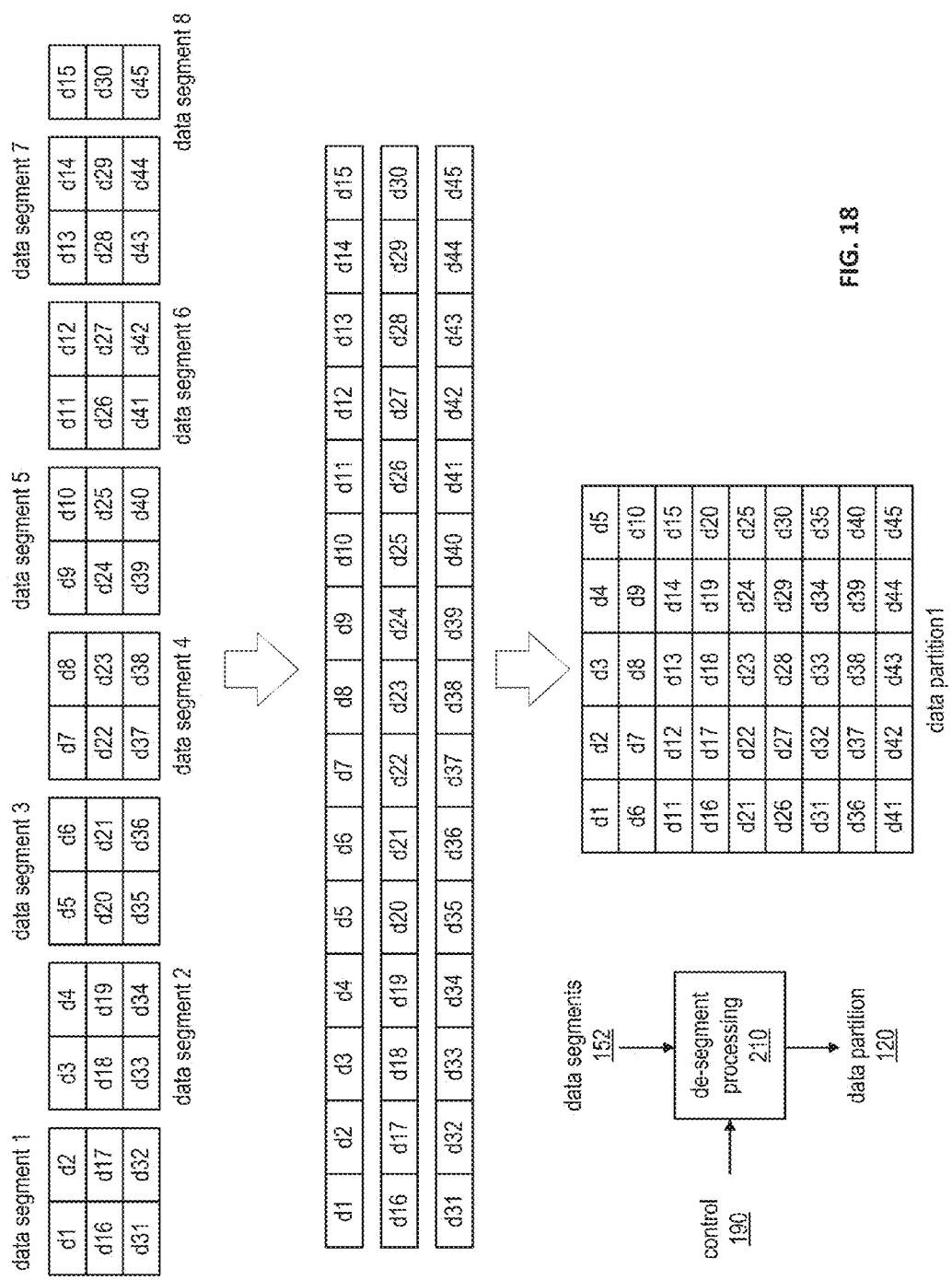
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
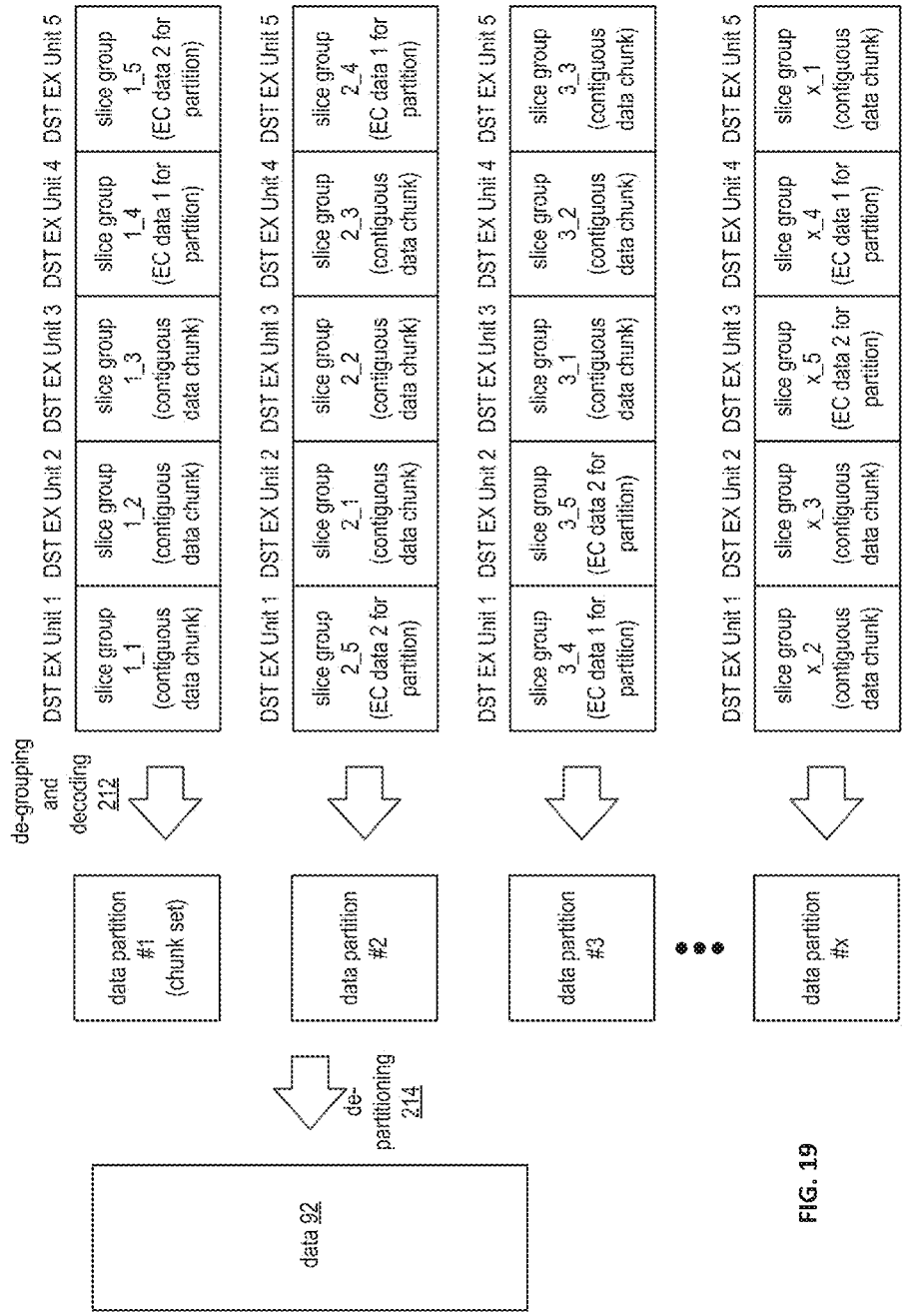
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
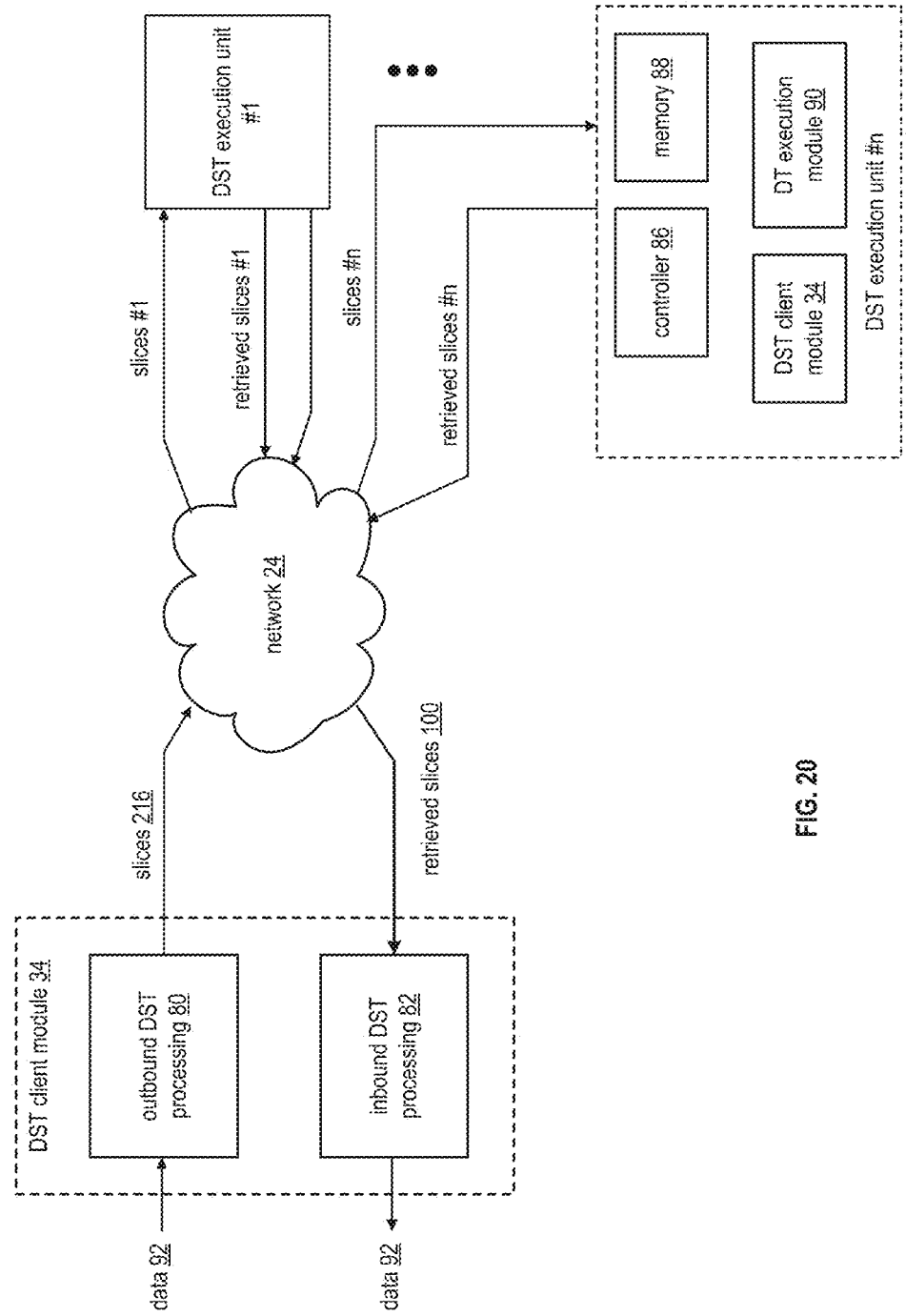
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
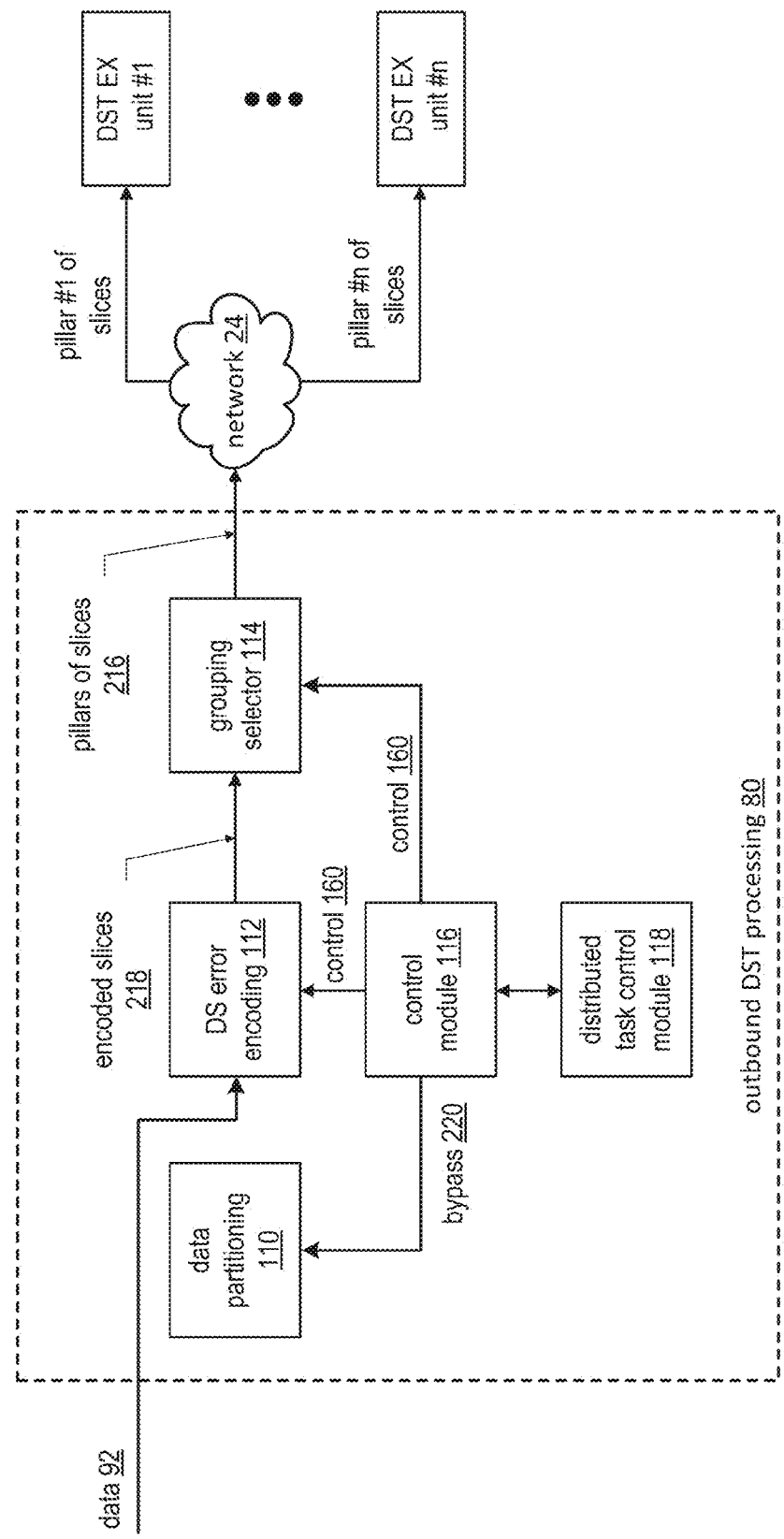
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
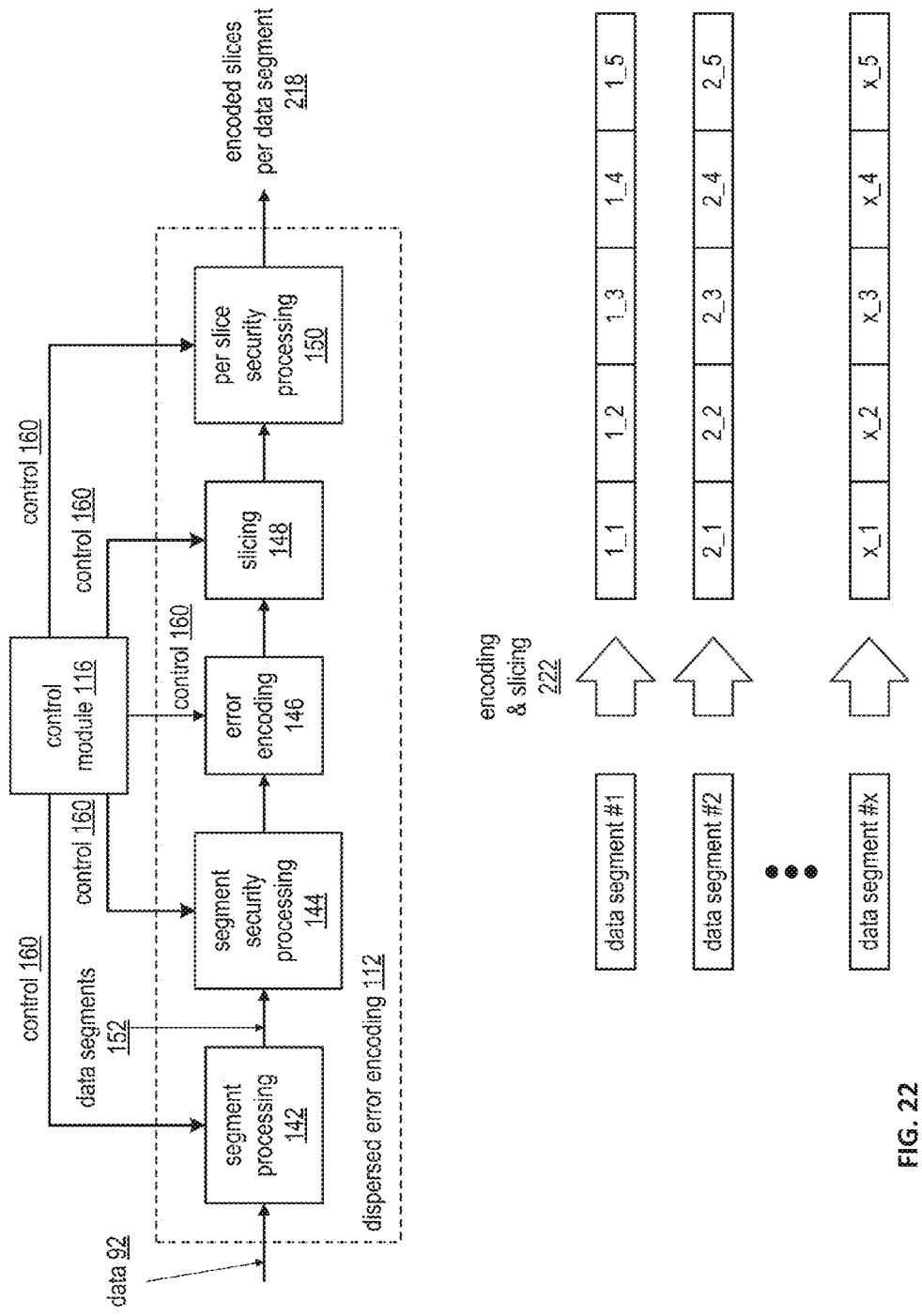
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
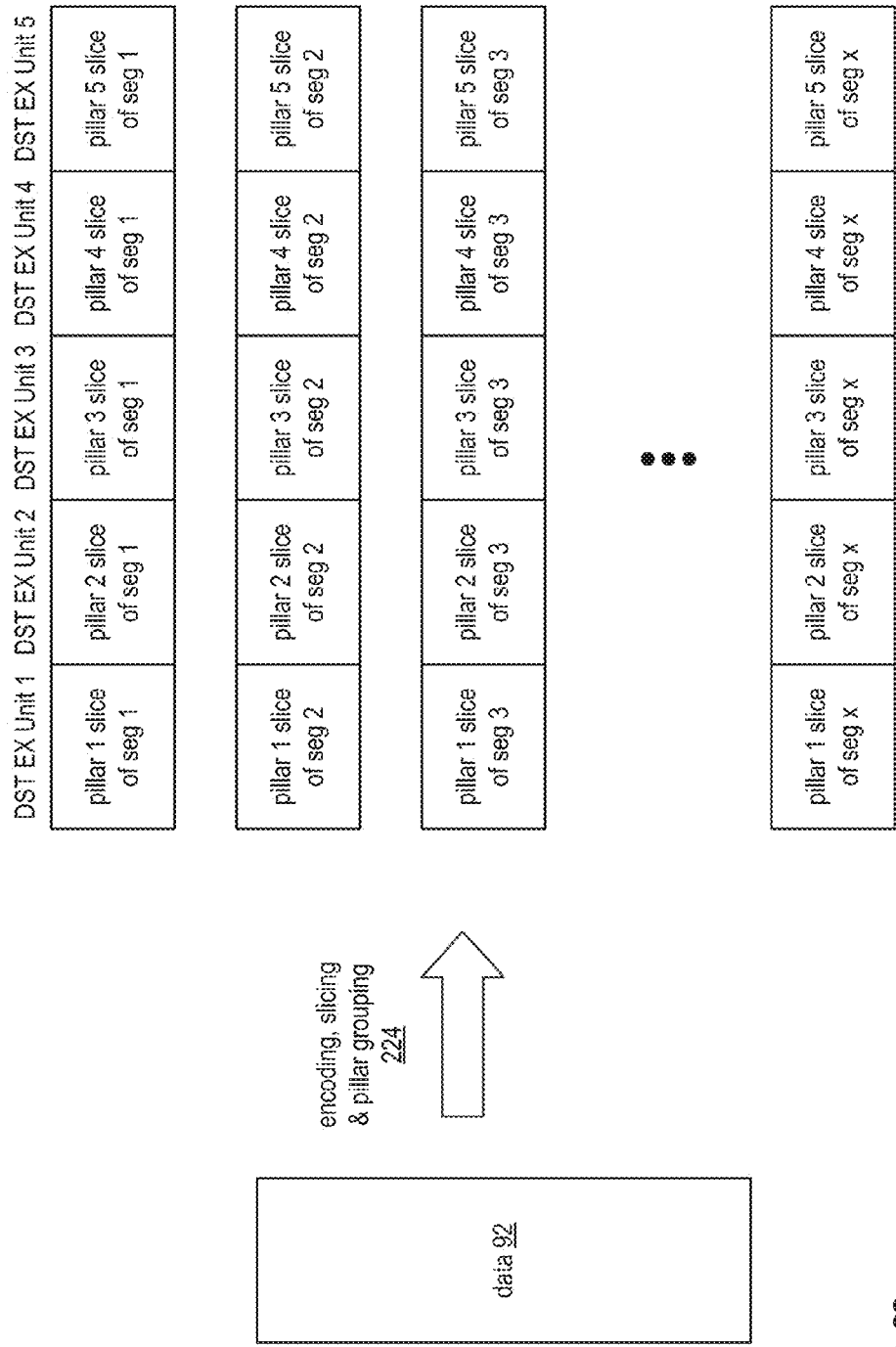
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
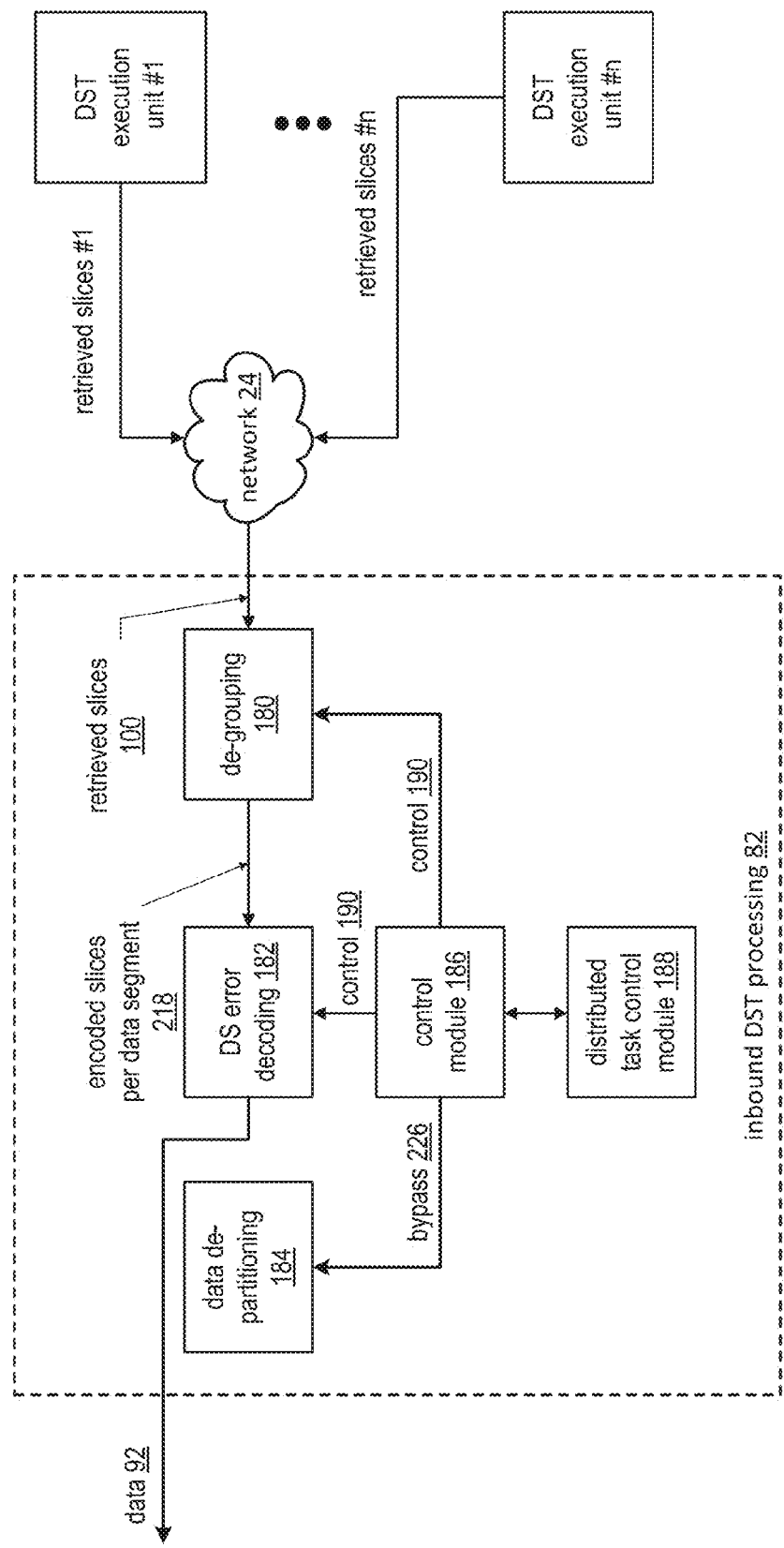
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
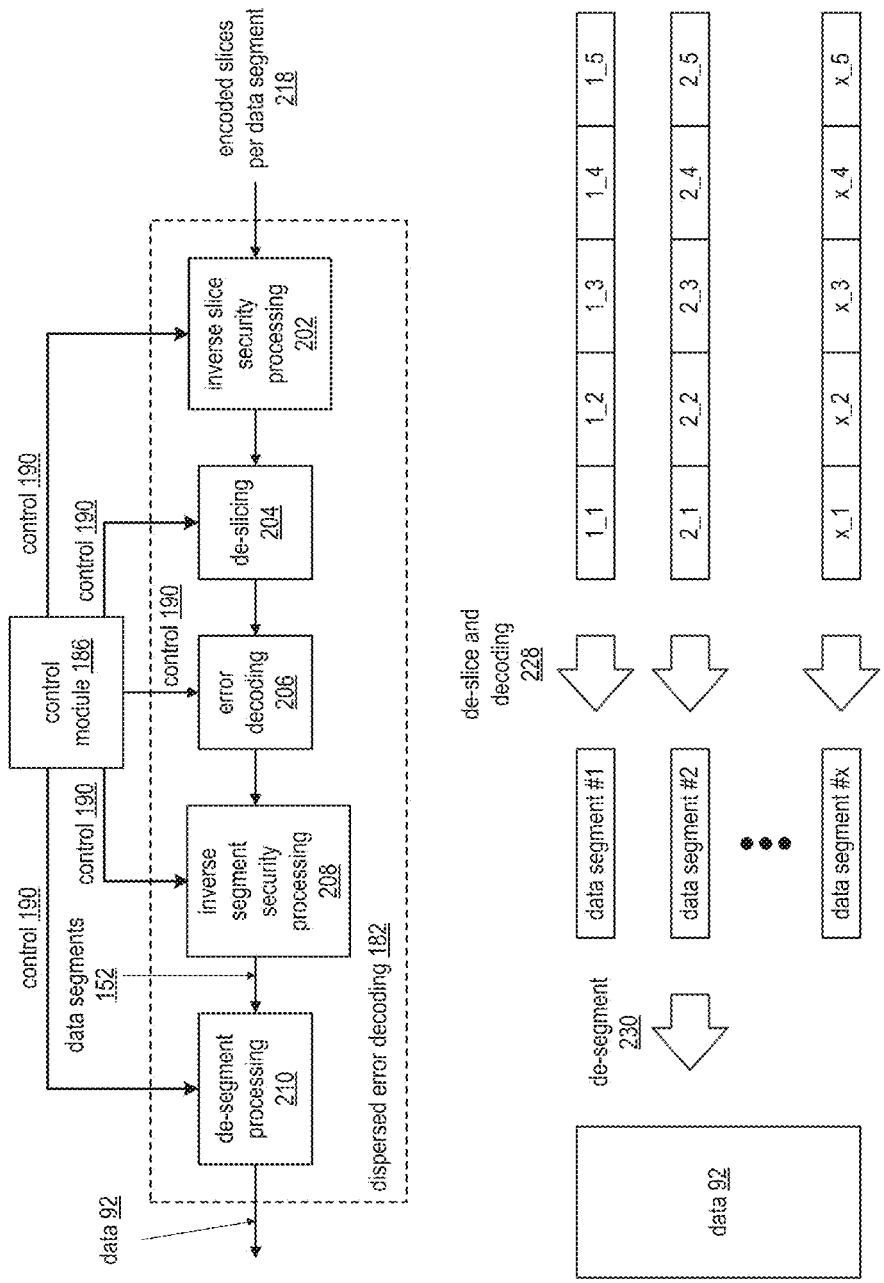
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
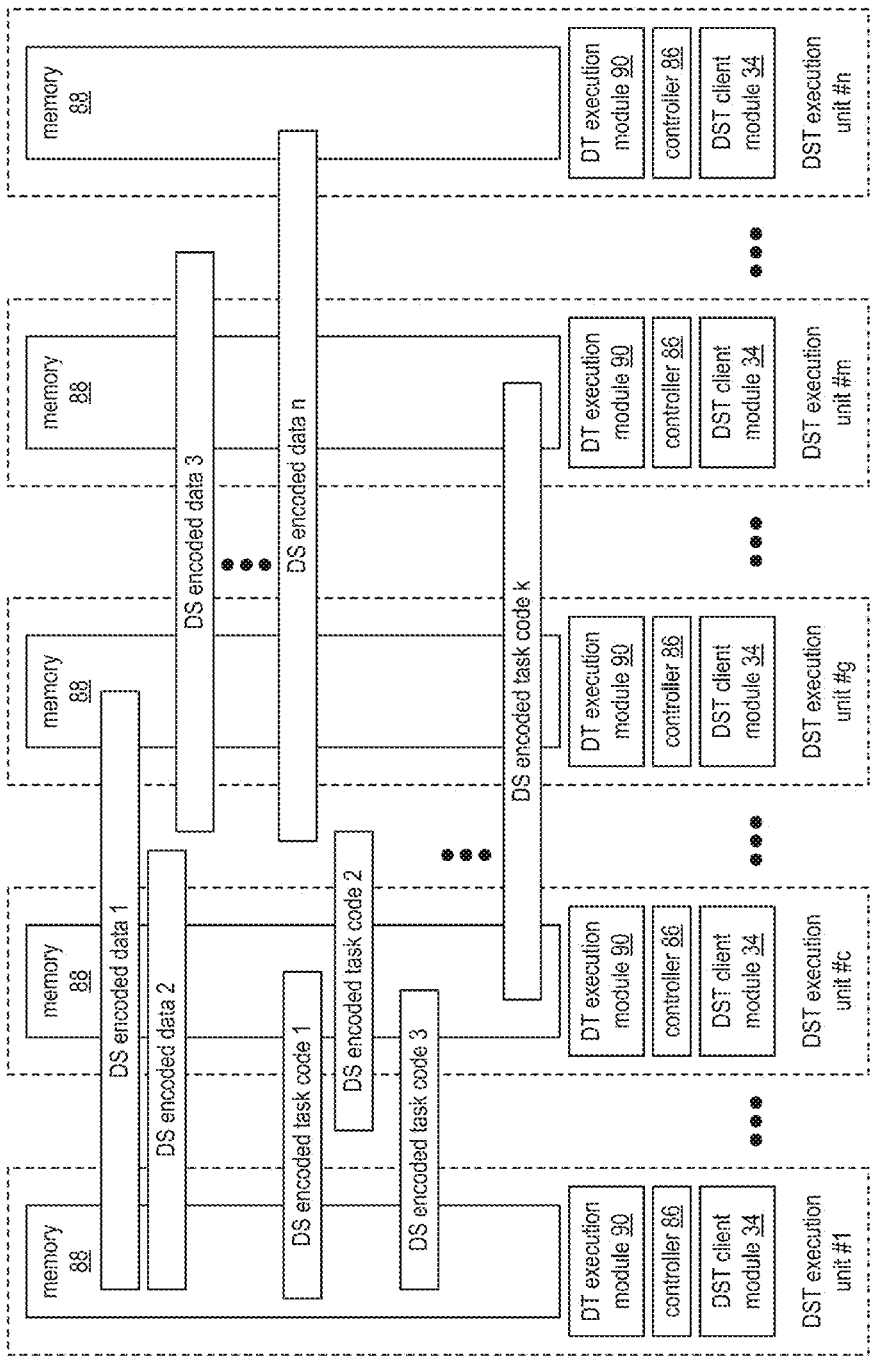
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
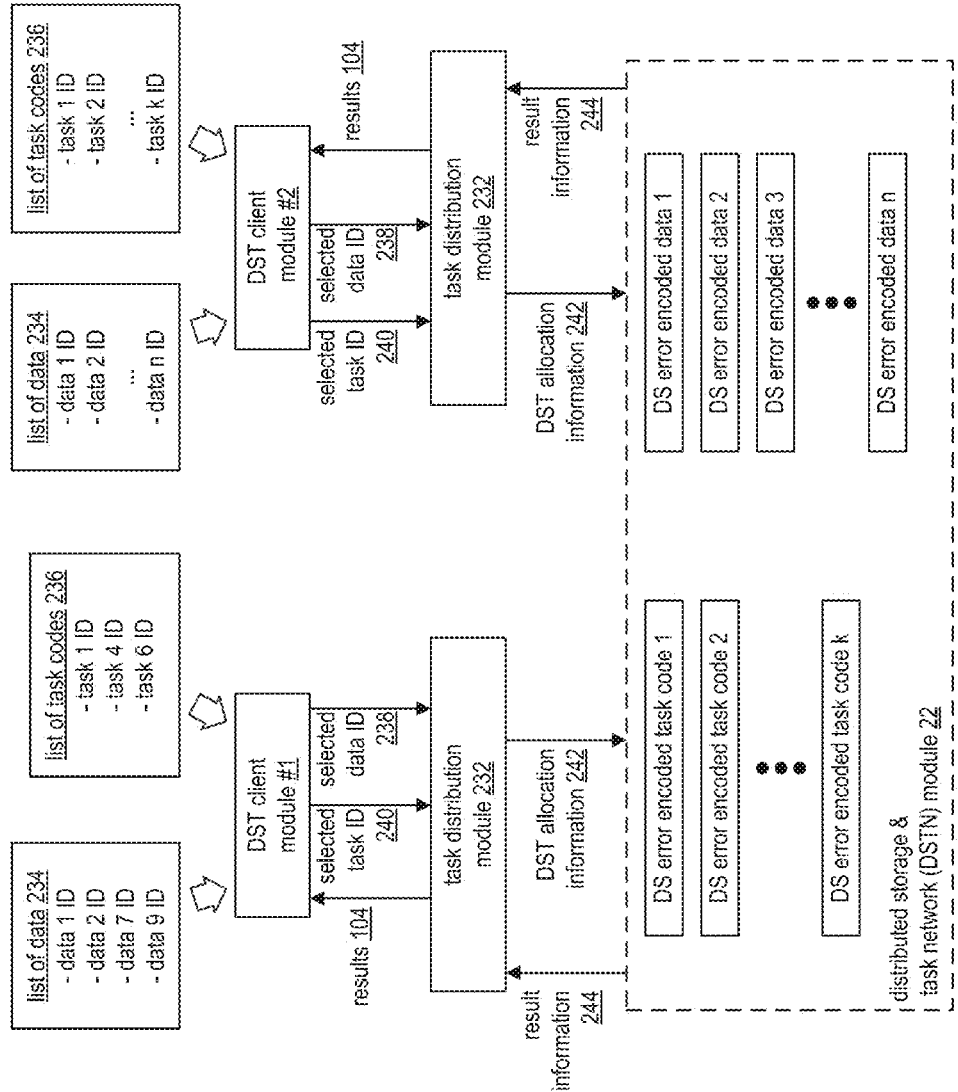
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
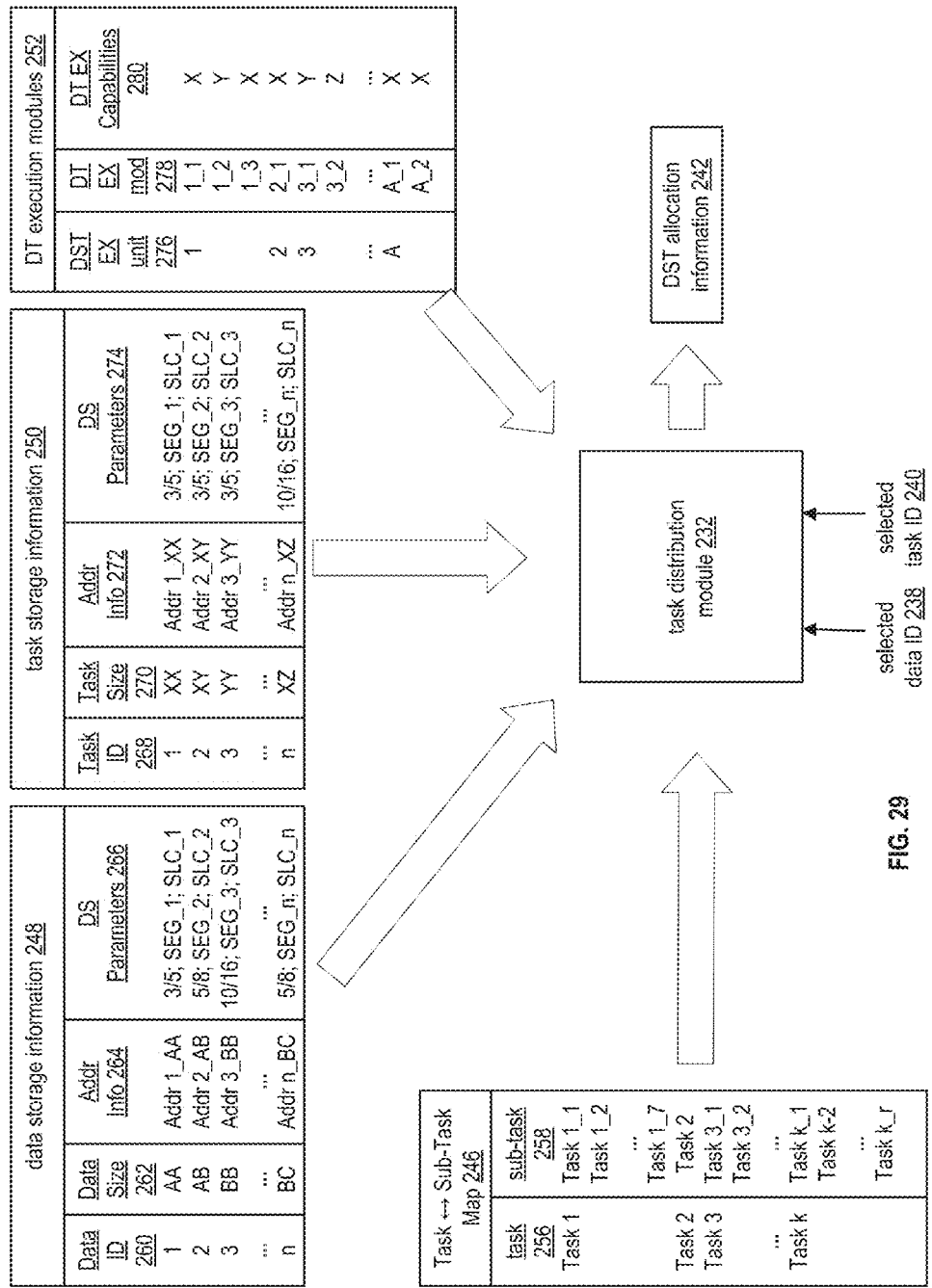
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
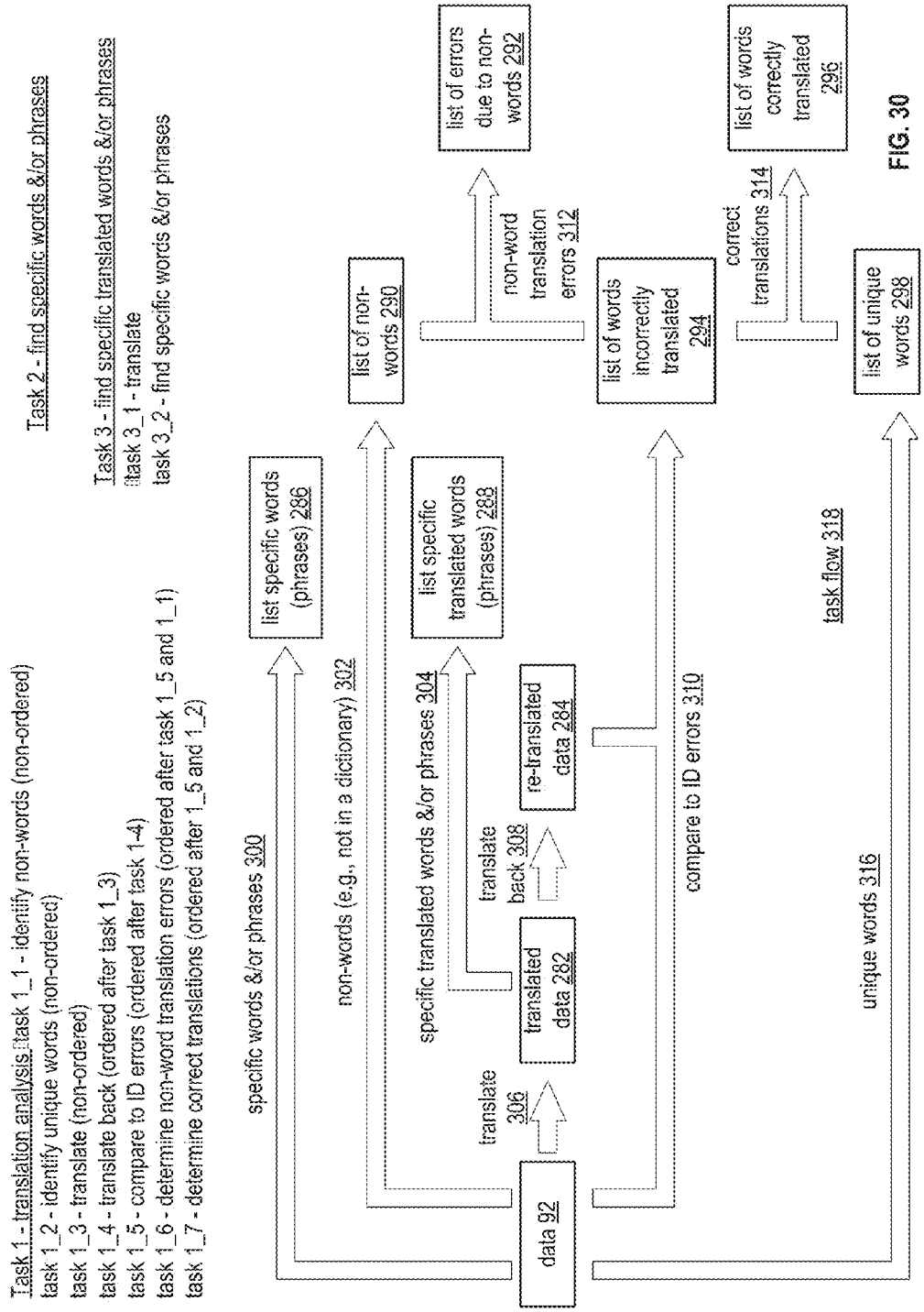
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
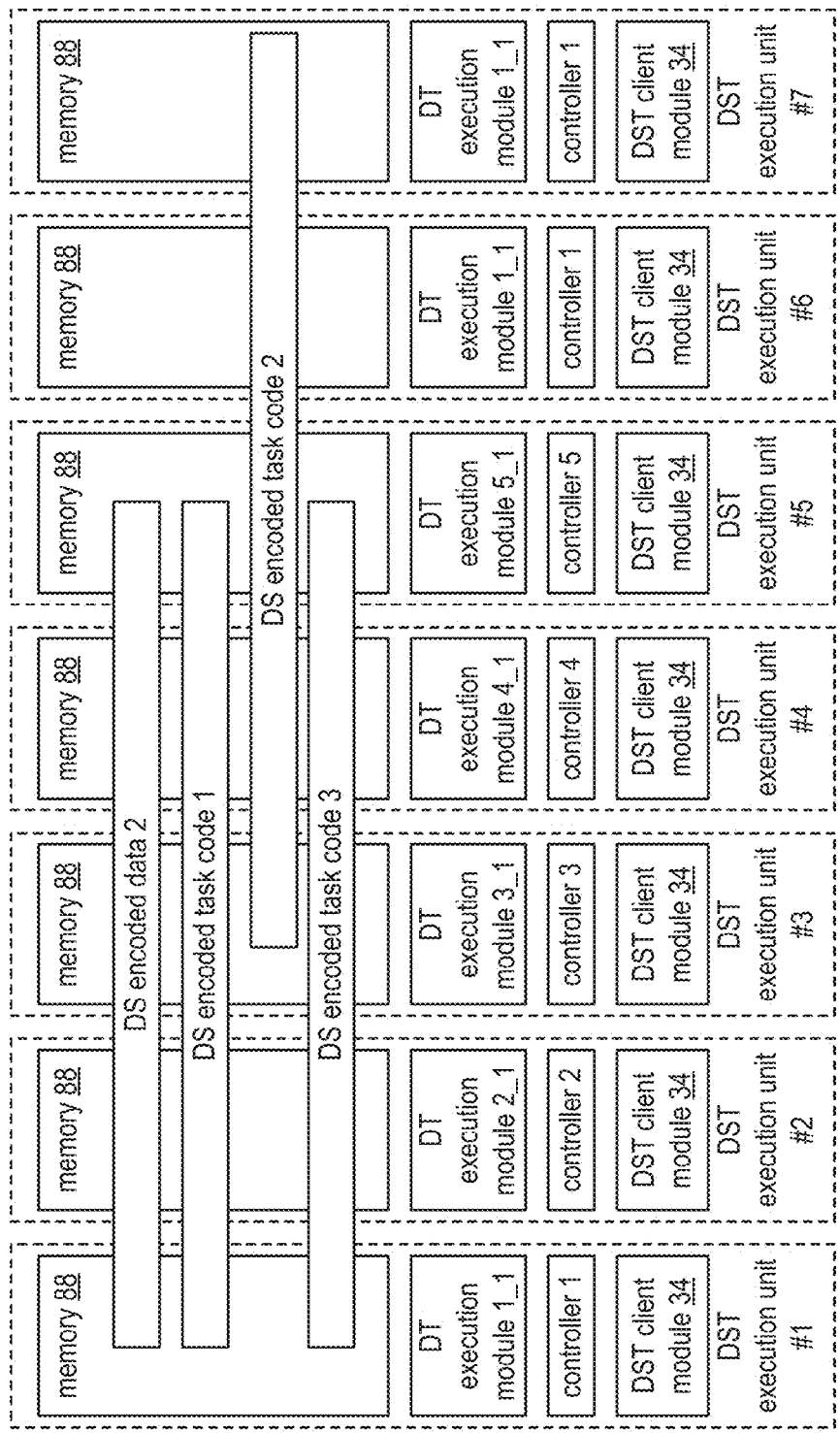
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_$_m$). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_$_m$). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_$_y$). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
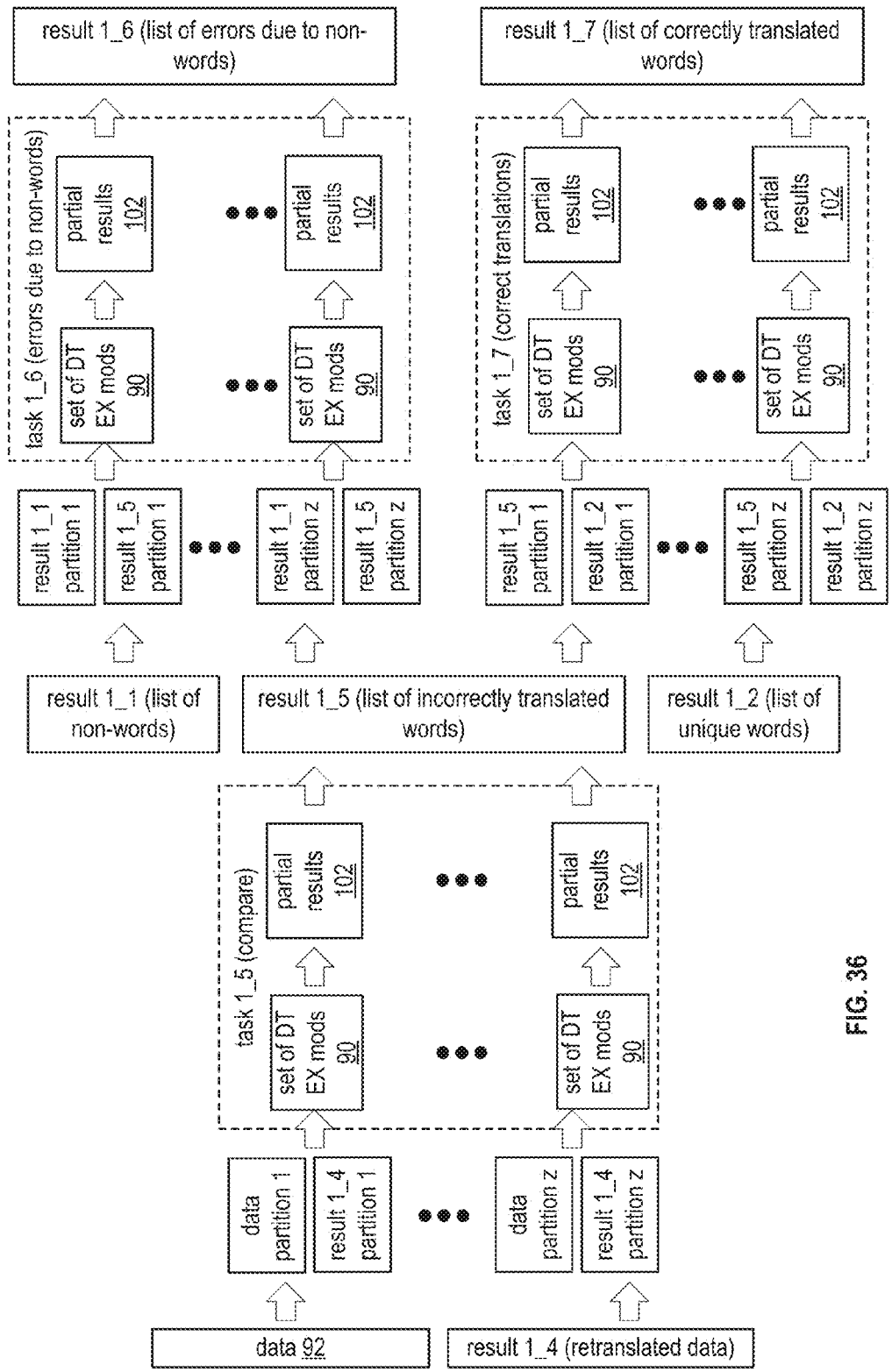

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_$_z$). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_$_m$). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_$_m$). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
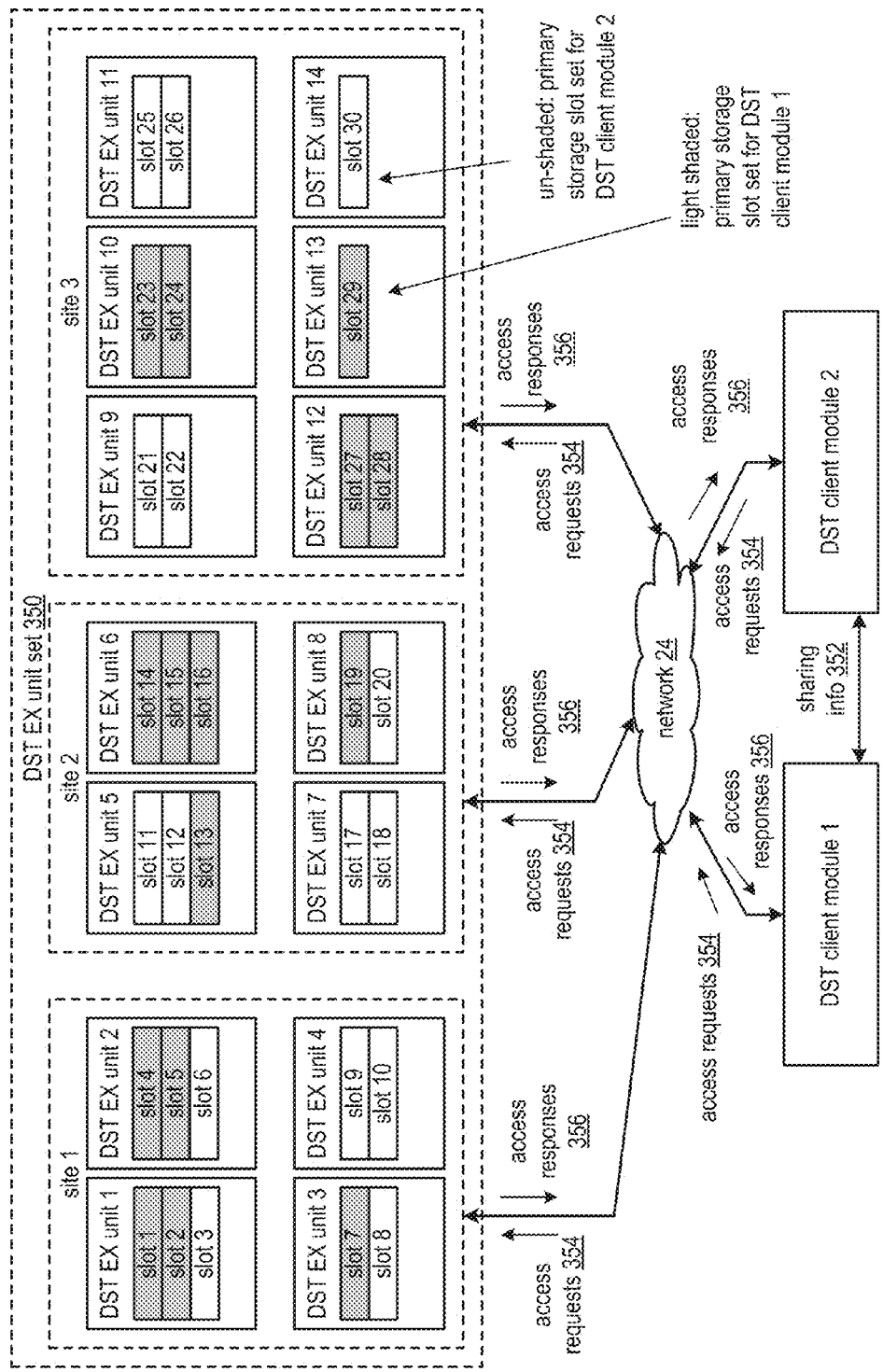
FIG. 40A is a schematic block diagram of an embodiment of a dispersed storage network (DSN) in accordance with the present invention.

FIG. 40A is a schematic block diagram of an embodiment of a dispersed storage network (DSN) that includes at least two distributed storage and task (DST) client modules 1-2, the network 24 of FIG. 1, and a DST execution (EX) unit set 350. The DST client modules 1-2 may be implemented using the DST client module 34 of FIG. 1. The DST execution unit set 350 includes a set of DST execution units 36 of FIG. 1, where one or more DST execution units are deployed at one or more sites. Each DST execution unit provides at least one storage slot of N storage slots. A storage slot includes a virtual storage location associated with physical memory of the DST execution unit. For example, the DST execution unit set includes DST execution units 1-14 when 30 storage slots are provided and a varying number of storage slots are associated with each DST execution unit. The DSN functions to select storage resources and to access the storage resources to facilitate storing and retrieving of data. Storage resources include one or more of the storage slot and a DST execution unit.

In an example of operation of the selecting of the storage resources, the DST client module 1 obtains dispersal parameters. The dispersal parameters includes one or more of a number of storage slots N, an information dispersal algorithm (IDA) width number, a write threshold number, a read threshold number, and a decode threshold number. The obtaining includes at least one of retrieving a portion of system registry information, utilizing a predetermination, determining based on the desired performance level indicator, and accessing a list based on the requesting entity ID.

Having obtained the dispersal parameters, the DST client module 1 determines a DST execution unit performance level for each DST execution unit of the DST execution unit set 350. The determining includes at least one of interpreting an error message, performing a lookup, initiating a performance test, and interpreting a performance test result. The performance level includes indicators for one or more performance metrics. The one or more performance metrics may include at least one of an input/output bandwidth level, a storage latency level, a retrieval latency level, a transfer rate level, a data retrieval reliability level, and a data storage availability level.

Having determined the DST execution unit performance levels for the DST execution unit set, the DST client module 1 temporarily selects a set of primary storage slots of N storage slots associated with the DST execution unit set to produce a set of identities of candidate primary storage slots, where the set of storage slots includes at least a decode threshold number of storage slots and at most an IDA width number of storage slots. The selecting may be based on one or more of the DST execution unit performance levels, a storage slot to DST execution unit mapping, site availability information, system topology information, a system loading level, a system loading goal level, a data storage availability goal, a data retrieval reliability goal, and a site selection scheme. As a specific example, the DST client module 1 temporarily selects the IDA width number of storage slots out of the N storage slots. As such, the DST client module 1 selects one permutation out of a number of permutations expressed by a formula: number of permutations of the selecting of the IDA width number of storage slots=N choose IDA width. For instance, the number of permutations of selecting the IDA width number of storage slots=30 choose 15=155 million permutations, when N=30 and the IDA width=15.

Storage of data within the DST execution unit set can tolerate a number of storage slot failures and/or unavailability without affecting data storage availability and data retrieval reliability in accordance with a formula: number of storage slot failures tolerated=N−IDA width=30−15=15. As such, the storage of data within the DST execution unit set can tolerate 15 storage slot failures.

The DST client module 1 may temporarily select the IDA width number of storage slots in accordance with the site selection scheme to improve the data retrieval reliability. For example, the DST client module 1 selects storage slots at each site of the one or more sites such that at least a decode threshold number of encoded data slices are available from available storage slots at a minimum desired number of sites. As a specific example, DST client module 1 selects storage slots associated with available and better-than-average performing DST execution units such that the decode threshold number of encoded data slices are available from any two operational sites when one of three total sites is unavailable. For instance, the DST client module 1 selects 5 storage slots at each of the 3 sites when the IDA width is 15 and the decode threshold is 10.

Having temporarily selected the set of primary storage slots, the DST client module 1 issues sharing information 352 to the other DST client module of the at least two DST client modules 1-2. The sharing information 352 includes the identities of the temporarily selected candidate set of primary storage slots by one or more of the DST client modules. For example, the DST client module 1 generates the sharing information 352 to include the identities selected by the DST client module 1 of the temporarily selected candidate set of primary storage slots and sends the sharing information 352 to the DST client module 2. The sending may be direct or via the network 24.

Having sent the sharing information 352, the DST client module 1 may receive sharing information from the DST client module 2, where the sharing information received from the DST client module 2 includes other identity selected by the DST client module 2 of temporarily selected candidate set of primary storage slots. Having shared the sharing information 352 generated by each of the at least two DST client modules 1-2, the at least two client modules 1-2 coordinate selection of at least some of the candidate primary storage slots to produce selected primary storage slots. For example, the DST client modules 1-2 exchange further sharing information messages and perform a narrowing function to coordinate the selection. The narrowing function includes at least one of randomly selecting storage resources when the storage resources produce similar performance results, selecting other storage resources associated with one of the DST client modules when estimated associated performance of the one of the DST client modules is greater than a performance threshold level, allowing overlapping selections, and not allowing overlapping selections. For example, the DST client modules 1-2 select storage slot 29 of DST execution unit 13 as a primary storage slot for the DST client module 1 and select storage slot 30 of DST execution unit 14 as a primary storage slot for the DST client module 2 when the performance level of the DST execution unit 13 is better for the DST client module 1 than the DST client module 2 and the performance level of the DST execution unit 14 is better for the DST client module 2 than the DST client module 1.

Having coordinated the selection of the primary storage slots for each DST client module, each DST client module may access the DST execution unit set in accordance with a selected associated set of primary storage slots. For example, DST client module 1 issues, via the network 24, access requests 354 (e.g., write slice request, read slice request, list slice request, delete slice request, etc.) to DST execution units associated with storage slots 1, 2, 4, 5, 7, 13, 14, 15, 16, 19, 23, 24, 27, 28, and 29 when selecting an IDA width number of primary storage slots and DST client module 2 issues, via the network 24, access requests to DST execution units associated with storage slots 3, 6, 8, 9, 10, 11, 12, 17, 18, 20, 21, 22, 25, 26, and 30 when selecting a non-overlapping IDA width number of primary storage slots. At least some of the DST execution units issues, via the network 24, access responses 356 (e.g., a write slice request, a read slice request, a list slice request, a delete slice request, etc.) to the DST client modules 1-2 in response to receiving associated access requests.

Figure 40B:
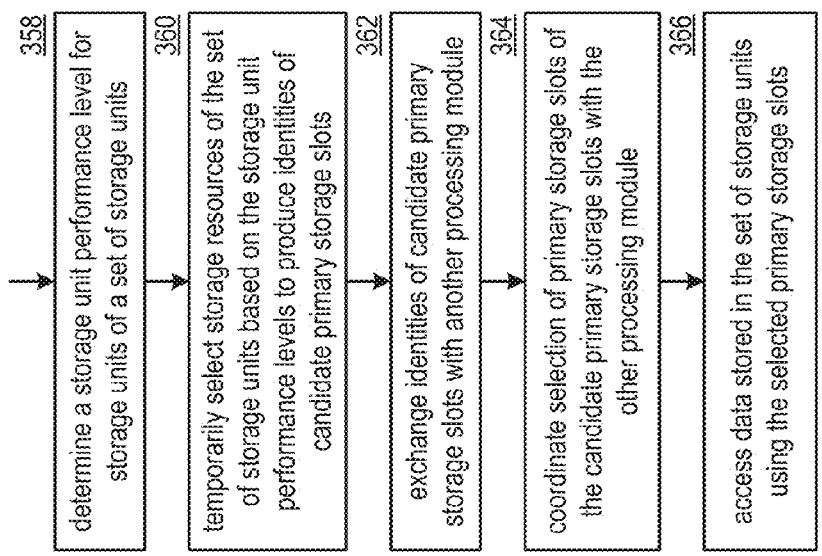
FIG. 40B is a flowchart illustrating an example of selecting storage resources in accordance with the present invention.

FIG. 40B is a flowchart illustrating an example of selecting storage resources. The method begins or continues at step 358 where a processing module (e.g., of a distributed storage and task (DST) client module) determines a storage unit performance level for storage units of a set of storage units. The determining includes at least one of interpreting an error message, performing a lookup, initiating a performance test, and interpreting a performance test result. The method continues at step 360 where the processing module temporarily selects storage resources of the set of storage units based on the storage unit performance levels to produce identities of candidate primary storage slots. For example, the processing module selects an information dispersal algorithm (IDA) width number of storage resources associated with favorable (e.g., most favorable, greater than a performance threshold level) storage unit performance levels.

The method continues at step 362 where the processing module exchanges identities of candidate primary storage slots with another processing module. For example, the processing module sends the identities of the candidate primary storage slots and associated storage unit performance levels to the other processing module and receives identities of candidate primary storage slots selected by the other processing module. The method continues at step 364 where the processing module coordinates selection of primary storage slots of the candidate primary storage slots with the other processing module. The selecting may be in accordance with a selection scheme, where the selection scheme includes one or more of selecting best performing storage units associated with a given processing module, splitting a number of co-selections, allowing selection of common storage units, and not allowing any selection of common storage units. The method continues at step 366 where the processing module accesses data in the set of storage units using the selected primary storage slots. For example, the processing module sends requests (e.g., write, read, list, delete, etc.) to storage units associated with the selected primary storage slots and receives responses from at least some of the storage units associated with the selected primary storage slots.

Figure 41A:
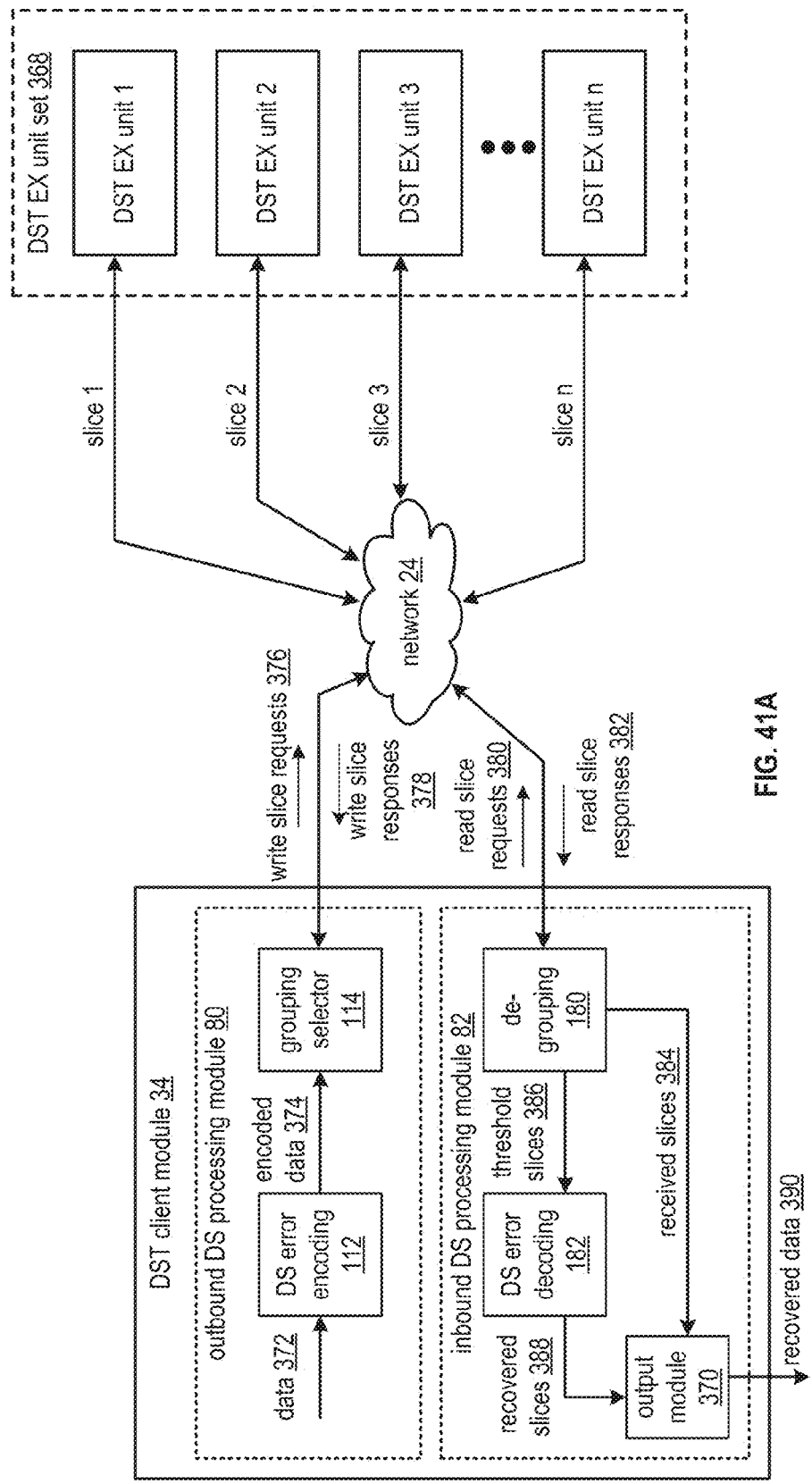
FIG. 41A is a schematic block diagram of another embodiment of a dispersed storage network (DSN) in accordance with the present invention.

FIG. 41A is a schematic block diagram of another embodiment of a dispersed storage network (DSN) that includes the distribute storage and task (DST) client module 34 of FIG. 1, the network 24 of FIG. 1, and a DST execution unit set 368. The DST execution unit set 368 includes a set of DST execution units 1-n. Each DST execution unit may be implemented using the DST execution unit 36 of FIG. 1. The DST client module 34 includes the outbound dispersed storage (DS) processing module 80 of FIG. 3, and the inbound DS processing module 82 of FIG. 3. Hereafter, the outbound DS processing module 80 may be referred interchangeably as the outbound DS processing 80 and the inbound DS processing module 82 may be referred to interchangeably as the inbound DS processing 82. The outbound DS processing module 80 includes the DS error encoding 112 of FIG. 4 and includes the group selector 114 of FIG. 4. The inbound DS processing module 82 includes the de-grouping 180 of FIG. 13, the DS error decoding 182 of FIG. 13, and an output module 370. The DSN functions to store data 372 and to recover stored data to produce recovered data 390.

In an example of operation of the storing of the data 372, the outbound DS processing module 80 partitions the data 372 to produce a plurality of data segments, and for each data segment, the DS error encoding 112 dispersed storage error encodes the data segment to produce a set of an information dispersal algorithm (IDA) width number of encoded data slices as encoded data 374, where a decode threshold number of encoded data slices of the set of encoded data slices are substantially the same as the data segment. For instance, the DS error encoding 112 matrix multiplies the data segment by an encoding matrix that includes a unity matrix in a first decode threshold number of rows to produce an output matrix that is sliced to produce the set of encoded data slices. Having produced a plurality of sets of encoded data slices, the group selector 114 issues, via the network 24, one or more sets of write slice requests 376 to the set of DST execution units 1-n, where the one or more sets of write slice requests 376 includes the plurality of sets of encoded data slices and an associated plurality of sets of slice names. The outbound DS processing module 80 receives write slice responses 378 from at least some of the DST execution units indicating status (e.g., success, failure) of storing encoded data slices.

In an example of operation of the recovering of the stored data to produce the recovered data 390, the inbound DS processing module 82 selects a read threshold number of encoded data slices for retrieval of each set of encoded data slices, where the read threshold number is greater than or equal to the decode threshold number and less than or equal to the IDA width number. For example, the inbound DS processing module 82 selects encoded data slices corresponding to a first decode threshold number of encoded data slices for each set of encoded data slices such that the decode threshold number of encoded data slices substantially includes a corresponding data segment and may select other encoded data slices of each set of encoded data slices. For instance, the inbound DS processing module 82 randomly selects the other encoded data slices. As a specific example, the inbound DS processing module 82 selects encoded data slices 1-12 when encoded data slices 1-10 includes the first decode threshold number of encoded data slices, when the read threshold is 12, and the IDA width is 16.

Having selected the read threshold number of encoded data slices of each set of encoded data slices, the inbound DS processing module 82 issues, via the network 24, a read threshold number of read slice requests 380 to the DST execution unit set 368, where the read threshold number of read slice requests 380 includes identities of the selected read threshold number of encoded data slices. The issuing includes generating the read threshold number of read slice requests 380 and sending, via the network 24, the read threshold number of read slice requests 380 to a corresponding read threshold number of DST execution units in accordance with a desired receive order priority. The desired receive order priority indicates an ordering of subsequent receiving of read slice responses 382 that includes received slices 384. For example, the receive order priority indicates to receive encoded data slice 2 after encoded data slice 1, to receive encoded data slice 3 after encoded data slice 2, to receive encoded data slice 4 after encoded data slice 3, etc., for the first decode threshold number of encoded data slices such that a corresponding data segment is received in order. As a specific example, inbound DS processing module 82 sends a first read slice request to DST execution unit 1 to recover encoded data slice 1, followed by sending a second read slice requests to DST execution unit 2 to recover encoded data slice 2 subsequent to receiving of encoded data slice 1, etc.

Having issued the read threshold number of read slice requests 380, for each data segment, the inbound DS processing module 82 receives one or more encoded data slices of the selected read threshold number of encoded data slices. The de-grouping 182 initiates outputting of a next encoded data slice when a previous encoded data slice, if any, has already been outputted. For example, as the read slice responses 382 are received that includes the one or more encoded data slices, the de-grouping 180 outputs received slices 384 to the output module 370 in accordance with the desired receive order priority. For instance, the de-grouping 180 receives the encoded data slice 1 and outputs the received encoded data slice 1 to the output module 370, receives, within a response timeframe, the encoded data slice 2 and outputs the received encoded data slice 2 to the output module 370, etc., while receiving encoded data slices substantially in order and within a response timeframe of each other.

When not receiving the next encoded data slice within the response time frame (e.g., a DST execution unit is unavailable, a read slice response 382 has been significantly delayed), the de-grouping 180 facilitates receiving of another decode threshold number of encoded data slices 386 of the set of encoded data slices for the corresponding data segment. For example, the de-grouping 180 continues to receive encoded data slices. As another example, the de-grouping 180 facilitates issuing further read slice requests 380 and receives further read slice responses 382 that includes other encoded data slices of the other decode threshold number of encoded data slices. Having received the other decode threshold number of encoded data slices, the de-grouping 180 outputs the other decode threshold number of encoded data slices as threshold slices 386 to the DS error decoding 182. The DS error decoding 182 dispersed storage error decodes the other decode threshold number of encoded data slices 386 to produce recovered slices 388, where the recovered slices 388 includes at least a recovered next encoded data slice and at most a set of encoded data slices corresponding to the data segment. The output module 370 outputs one or more of the received slices 384 and the recovered slices 388 in accordance with the desired receive order priority as the recovered data 390.

Figure 41B:
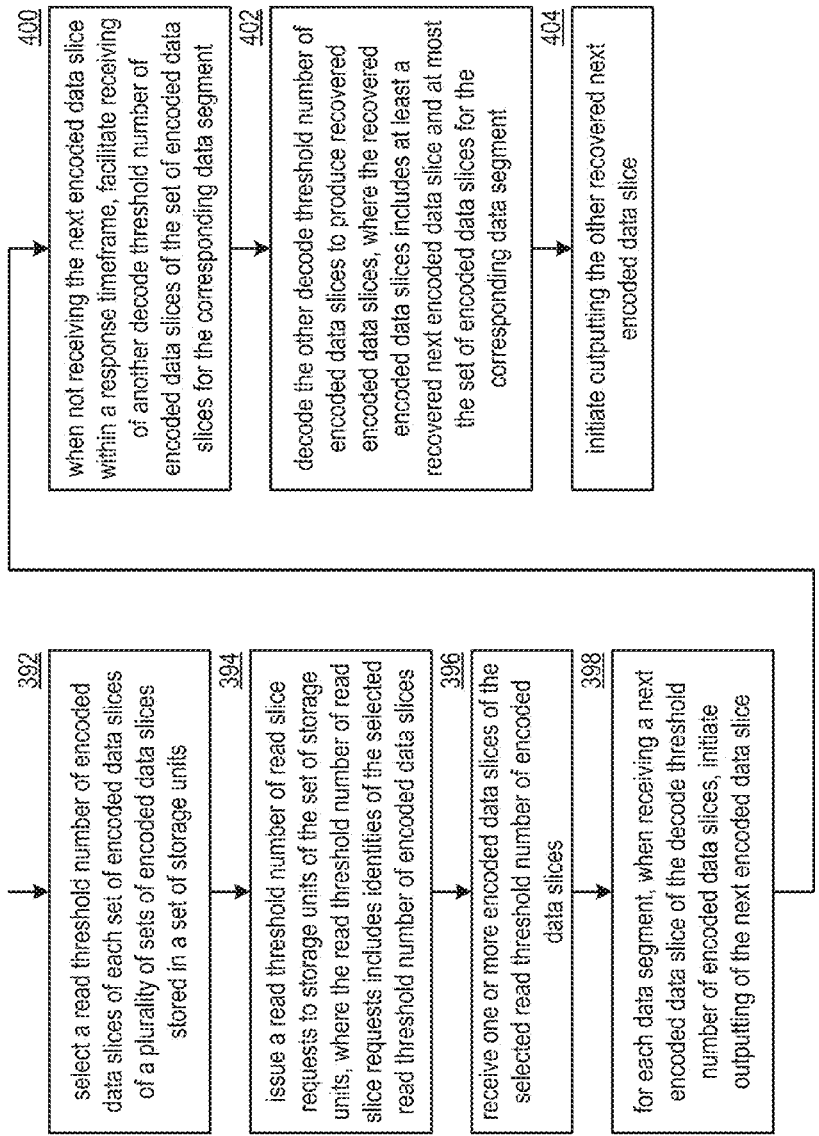
FIG. 41B is a flowchart illustrating an example of selecting recovering data in accordance with the present invention.

FIG. 41B is a flowchart illustrating an example of selecting recovering data. The method begins or continues at step 392 where a processing module (e.g., of a distributed storage and task (DST) client module) selects a read threshold number of encoded data slices, of each set of encoded data slices, of a plurality of sets of encoded data slices stored in a set of storage units. For example, the processing module determines slice names corresponding to a decode threshold number of encoded data slices that corresponds to a data segment that was encoded to produce a set of encoded data slices.

The method continues at step 394 where the processing module issues a read threshold number of read slice requests to storage units of the set of storage units, where the read threshold number of read slice requests includes identities of the selected read threshold number of encoded data slices. The issuing may include sending the read threshold number of read slice requests in accordance with a desired order of receiving. The method continues at step 396 where the processing module receives one or more encoded data slices of the selected read threshold number of encoded data slices.

For each data segment, when receiving a next encoded data slice of the decode threshold number of encoded data slices (e.g., in the desired order of receiving), the method continues at step 398 where the processing module initiates outputting of the next encoded data slice. The outputting includes sending the next encoded data slice to a requesting entity, wherein the sending is in accordance with a desired outputting order. The desired outputting order includes at least one of the desired order of receiving and an ordering of a decode threshold number of encoded data slices that corresponds to an order of a responding encoded data slice.

When not receiving the next encoded data slice within a response timeframe, the method continues at step 400 where the processing module facilitates receiving of another decode threshold number of encoded data slices of the set of encoded data slices for the corresponding data segment. The other decode threshold number of encoded data slices may include one or more encoded data slices of the selected read threshold number of encoded data slices. The facilitating includes receive more encoded data slices of the selected read threshold number of encoded data slices and issuing one or more additional read slice requests for other encoded data slices of the set of encoded data slices.

The method continues at step 402 where the processing module decodes the other decode threshold number of encoded data slices to produce recovered encoded data slices, where the recovered encoded data slices includes at least a recovered next encoded data slices and at most the set of encoded data slices for the corresponding data segment. For example, the processing module disperse storage error decodes any decode threshold number of encoded data slices of the set of encoded data slices to reproduce the data segment, where the reproduced data segment includes a reproduced set of encoded data slices. The method continues at step 404 where the processing module initiates outputting the other recovered next encoded data slice. For example, the processing module outputs a corresponding recovered encoded data slice of the reproduced set of encoded data slices, where the recovered encoded data slices associated with the next encoded data slice.

FIGS. 42A-B are schematic block diagrams of another embodiment of a dispersed storage network (DSN) illustrating an example of modifying allocation of storage resources. The DSN includes the network 24 of FIG. 1 and the distributed storage and task (DST) execution unit set 350 of FIG. 40A, where an additional DST execution unit 15 is commissioned at site 2. The DSN functions to modify allocation of storage resources.

FIG. 42A illustrates initial steps of an example of the modifying of the allocation of the storage resources. As a specific example, a resource allocation module (e.g., of any DST execution unit, of a DST processing unit, etc.) detects a newly commissioned DST execution unit (e.g., DST execution unit 15). The detecting includes at least one of receiving a message, interpreting system registry information, initiating a query, and receiving a query response. Having detected the newly commissioned DST execution unit, the resource allocations module identifies a corresponding DST execution unit for decommissioning (e.g., DST execution unit 7). The identifying includes at least one of receiving a message, interpreting the system registry information, initiating a query, receiving a query, identifying an association between the newly commissioned DST execution unit and the DST execution unit for decommissioning, and interpreting an error message.

Having identified the corresponding DST execution unit for decommissioning, the resource allocation module facilitates migrating a portion of encoded data slices stored in the DST execution unit for decommissioning to the newly commissioned DST execution unit. The facilitating includes determining a portion of encoded data slices for migration based on one or more of a DSN performance level, DST execution unit performance levels, a predetermination, a migration goal, and an expected access frequency for the encoded data slices. For example, the resource allocation module determines the portion to include encoded data slices of slice groups 7-1 and 7-2 stored on DST execution unit 7. The facilitating further includes at least one of retrieving the encoded data slices of the portion from the DST execution unit for decommissioning and storing the encoded data slices in the newly commissioned DST execution unit; issuing a migration request to the DST execution unit for decommissioning, and issuing another migration requests to the newly commissioned DST execution unit. For example, the resource allocation module, when implemented within the DST execution unit 15, retrieves the encoded data slices of slice groups 7-1 and 7-2 from DST execution unit 7 and stores slice groups 7-1 and 7-2 locally in DST execution unit 15.

Having facilitated the migration of the portion of encoded data slices to the newly commissioned DST execution unit, the resource allocation module facilitates migrating remaining portions of the encoded data slices to one or more other DST execution units as foster slices. The facilitating includes selecting the one or more other DST execution units based on one or more of DST execution unit storage capacity, DST execution unit performance, and DST execution unit availability. For example, the resource allocation module selects DST execution unit 8 for storage of foster encoded data slices for a slice group 7-3 and selects DST execution unit 12 for storage of foster encoded data slices for a slice group 7-4 when DST execution unit 8 have sufficient storage capacity and has superior DST execution unit slice transfer performance based on co-location with DST execution unit 7, and DST execution unit 12 has sufficient storage capacity for the foster encoded data slices of slice group 7-4.

The facilitating of the migration of the remaining portions of the encoded data slices further includes transferring of the remaining portions of the encoded data slices. The transferring includes at least one of the resource allocation module retrieving the remaining portions of the encoded data slices from the DST execution unit for decommissioning and storing the remaining portions of the encoded data slices in a corresponding selected other DST execution unit; issuing a migration request to the DST execution unit for decommissioning; and issuing another migration requests to the other DST execution unit. For example, the resource allocation module issues the migration request to the DST execution unit 8 instructing the DST execution unit 8 to retrieve the foster encoded data slice group 7-3 from the DST execution unit 7 for local storage within the DST execution unit 8. As another example, the resource allocation module issues the other migration request to the DST execution unit 7 to send, via the network 24, the foster encoded data slice group 7-4 to the DST execution unit 12 for local storage within the DST execution unit 12.

Having facilitated the migration of the remaining portions of the encoded data slices, when detecting successful migration of an encoded data slice, the resource allocation manager facilitates deletion of the encoded data slice from the DST execution unit for decommissioning. For example, the resource allocation module detects that foster encoded data slices are available to requesting entities when accessing sets of encoded data slices that includes the foster encoded data slices and deletes encoded data slices from storage at the DST execution unit 7, where the encoded data slices for deletion correspond to the foster encoded data slices.

FIG. 42B illustrates further steps of the example of the modifying of the allocation of the storage resources. As a specific example, for each foster encoded data slice, the resource allocation module determines whether to facilitate migration of the foster encoded data slice to the newly commissioned DST execution unit. The determining may be based on one or more of a network performance level, a performance level of the newly commissioned DST execution unit, a performance level of another DST execution unit associated with storage of the foster encoded data slice, interpreting a schedule, and interpreting a system loading level. For example, the resource allocation manager determines to facilitate the migration of all of the foster encoded data slices from DST execution units 8 and 12 to DST execution unit 15 when the system loading level is below a system loading threshold level.

When facilitating the migration of the foster encoded data slice, the resource allocation module facilitates the migration of the foster encoded data slice from a corresponding other DST execution unit to the newly commissioned DST execution unit as an encoded data slice associated with the newly commissioned DST execution unit. For example, the resource allocation manager issues a migration request to DST execution unit 15 instructing DST execution unit 15 to retrieve foster encoded data slice group 7-3 from DST execution unit 8 and to retrieve, via the network 24, the foster encoded data slice group 7-4 from DST execution unit 12.

When confirming successful migration of the foster encoded data slice, the resource allocation manager updates an association of the newly commissioned DST execution unit and identities of encoded data slices stored at the newly commissioned DST execution unit. For example, the resource allocation manager receives a confirmation message (e.g., a set of favorable write slice responses) from DST execution unit 15 indicating that foster encoded data slice groups 7-3 and 7-4 have been successfully stored in the DST execution unit 15 as encoded data slice groups 7-3 and 7-4. Having received the confirmation message, the resource allocation manager updates at least one of a dispersed storage network (DSN) directory and a dispersed hierarchical index to indicate the association of slice names of the migrated foster encoded data slices and the DST execution unit 15.

Having updated the association of the newly commissioned DST execution unit and the identities of the encoded data slices stored at the newly commissioned DST execution unit, the resource allocation manager facilitates deleting the foster encoded data slices. For example, the resource allocation manager issues delete slice requests to DST execution units 8 and 12 to delete the foster encoded data slice groups 7-3 and 7-4.

FIG. 42C is a flowchart illustrating an example of modifying allocation of storage resources. The method begins or continues at step 408 where a processing module (e.g., of a distributed storage and task (DST) execution unit, of a resource allocation module) detects a newly commissioned storage unit, where a set of storage units includes the newly commissioned storage unit. The method continues at step 410 where the processing module identifies a corresponding storage unit for decommissioning, where the set of storage units includes the storage unit for decommissioning.

The method continues at step 412 where the processing module facilitates migration of a portion of encoded data slices stored at the storage unit for decommissioning to the newly commissioned storage unit. The facilitating includes determining a size of the portion and facilitating a transfer of the portion of the encoded data slices. For example, the processing module determines to not send any encoded data slices to the newly commissioned storage unit when the newly commissioned storage unit is associated with a performance level that is less than a low performance threshold level. As another example, the processing module determines to send all of the encoded data slices to the newly commissioned storage unit when the performance level of the newly commissioned storage unit is greater than a high performance threshold level. As yet another example, the processing module determines to send half of the encoded data slices to the newly commissioned storage unit when the performance level of the newly commissioned storage unit is greater than the low performance threshold level and less than the high performance threshold level. Having selected the number of encoded data slices for the migration, the processing module facilitates a transfer of the selected number of encoded data slices. For example, the processing module identifies the selected encoded data slices (e.g., by slice name) and issues a migration request to the newly commissioned storage unit to retrieve the selected encoded data slices from the storage unit for decommissioning.

The method continues at step 414 where the processing module facilitates migration of remaining portions of the encoded data slices stored in the storage unit for decommissioning as foster encoded data slices to one or more other storage units of the set of storage units. The facilitating includes selecting the other storage units and facilitating a transfer of the remaining portions of the encoded data slices. When detecting successful migration of encoded data slice, the method continues at step 416 where the processing module facilitates deletion of the encoded data slice from the storage unit for decommissioning. For example, the processing module detects favorable write slice responses and issues a delete slice request to the storage unit for decommissioning.

For each foster encoded data slice, the method continues at step 418 where the processing module determines whether to facilitate migration of the foster encoded data slice to the newly commissioned storage unit. The determining may be based on one or more of interpreting a schedule, interpreting a system performance level, and interpreting a system loading level. When facilitating the migration, the method continues at step 420 where the processing module facilitates the migration of the foster encoded data slice from a corresponding other storage unit to the newly commissioned storage unit as an encoded data slice associated with the newly commissioned storage unit. For example, the processing module retrieves the foster encoded data slice from the corresponding other storage unit and issues a write slice request to the newly commissioned storage unit, where the write slice request includes the foster encoded data slice.

When confirming successful migration of the foster encoded data slice, the method continues at step 422 where the processing module updates an association of the newly commissioned storage unit and identities of encoded data slices migrated to the newly commissioned storage unit. The updating of the association includes at least one of updating a dispersed storage network directory, and updating a dispersed hierarchical index. The method continues at step 424 where the processing module facilitates deletion of the foster encoded data slice from the corresponding other storage unit. For example, the processing module issues a delete slice request to the corresponding other storage unit for deletion of the foster encoded data slice.

FIG. 43A is a schematic block diagram of another embodiment of a dispersed storage network (DSN) that includes the distributed storage and task (DST) execution unit set 350 of FIG. 40A, the network 24 of FIG. 1, and the DST client module 34 of FIG. 1. The DST client module 34 includes the outbound dispersed storage (DS) processing module 80 of FIG. 3 and the inbound DS processing module 82 of FIG. 3. The DSN functions to rebuild stored data.

In an example of operation of the rebuilding of the stored data, the DST client module 34 detects an unavailable DST execution unit of the DST execution unit set. The detecting includes at least one of interpreting an error message, initiating a status query, receiving an unfavorable status response, and not receiving a status response within a response timeframe. For example, the DST client module 34 interprets an error message from DST execution unit 7 indicating that DST execution unit 7 will be unavailable.

The inbound DS processing module 82 identifies stored encoded data slices for rebuilding, where the stored encoded data slices are associated with the unavailable DST execution unit. The identifying includes at least one of interpreting system registry information, issuing a list slice request to the DST execution unit set, and interpreting received list slice response from DST execution units of the DST execution unit set. For example, the inbound DS processing module 82 interprets the system registry information to identify encoded data slice groups 7-1, 7-2, 7-3, and 7-4 to be associated with the unavailable DST execution unit 7.

Having identified the stored encoded data slices for rebuilding, the inbound DS processing module 82 selects at least a decode threshold number of storage resources (e.g., storage slots, DST execution units) of the DST execution unit set, where the storage resources are associated with storage of sets of encoded data slices that includes the identified encoded data slices for rebuilding. The selecting may be based on one or more of a storage slot to DST execution unit mapping, the system registry information, initiating a query, and receiving a query response. For example, the processing module selects DST execution units 1-6, 9-11, and 13 as the decode threshold number of storage resources when the decode threshold is 10 and storage slot to DST execution and mapping indicates that DST execution units 1-7, 9-11, and 13 are associated with the storage of the sets of encoded data slices that includes the encoded slice groups 7-1 through 7-4.

For each identified encoded data slice for rebuilding, the inbound DS processing module 82 recovers at least a decode threshold number of encoded data slices of a set of encoded data slices associated with the identified encoded data slice for rebuilding. For example, the inbound DS processing module 82 issues a read threshold number of read slice requests 426 to the DST execution units associated with the at least a decode threshold number of storage resources and receives read slice responses 428 from at least some of the DST execution units. For instance, the inbound DS processing module 82 issues read slice requests 426 to DST execution unit 1 to recover encoded data slice group 1-1, to DST execution unit 2 to recover encoded data slice group 2-1, to DST execution unit 3 to recover encoded data slice group 3-1, to DST execution unit 4 to recover encoded data slice group 4-1, to DST execution unit 5 to recover encoded data slice group 5-1, to DST execution unit 6 to recover encoded data slice group 6-1, to DST execution unit 9 to recover encoded data slice group 9-1, to DST execution unit 10 to recover encoded data slice group 10-1, to DST execution unit 11 to recover encoded data slice group 11-1, and to DST execution unit 13 to recover encoded data slice group 13-1.

Having recovered the decode threshold number of encoded data slices for the set of encoded data slices associated with the identified encoded data slice for rebuilding, the inbound DS processing module 82 dispersed storage error decodes the received decode threshold number of encoded data slices to produce a recovered data segment 430. The outbound DS processing module 80 dispersed storage error encodes the recovered data segment 430 to produce a set of rebuilt encoded data slices that includes a rebuilt encoded data slice corresponding to the encoded data slice for rebuilding. For example, the outbound DS processing module 80 dispersed storage error encodes recovered data segments corresponding to a first group of sets of encoded data slices to produce rebuilt encoded data slices of group 7-1.

Having produced the rebuilt encoded data slice, the outbound DS processing module 80 selects another storage resource for storage of the rebuilt encoded data slice as a foster encoded data slice. The selecting of the other storage resource may be based on one or more of DST execution unit performance information, a system loading level, a predetermination, and a DST execution unit available capacity level. For example, the outbound DS processing module 80 selects DST execution unit 3 for storage of encoded data slice group 7-1 as foster encoded data slice group 7-1, selects DST execution unit 4 for storage of encoded data slice group 7-2 as foster encoded data slice group 7-2, DST execution unit 8 for storage of encoded data slice group 7-3 as foster encoded data slice group 7-3, and selects DST execution unit 12 for storage of encoded data slice group 7-4 as foster encoded data slice group 7-4.

Having selected the other storage resource, the outbound DS processing module 80 facilitates storage of the rebuilt encoded data slice at the other storage resource. For example, the outbound DS processing module 80 issues a first write slice request 432 to DST execution unit 3, where the first write slice request 432 includes foster encoded data slice group 7-1, issues a second write slice request 432 to DST execution unit 4, where the second write slice request 432 includes foster encoded data slice group 7-2, issues a third write slice request 432 to DST execution unit 8, where the third write slice request 432 includes foster encoded data slice group 7-3, and issues a fourth write slice request 432 to DST execution unit 12, where the fourth write slice request 432 includes foster encoded data slice group 7-4.

FIG. 43B is a flowchart illustrating an example of rebuilding stored data. The method begins or continues at step 434 where a processing module (e.g., of a distributed storage and task (DST) client module) detects an unavailable storage unit of a set of storage units. The detecting includes at least one of interpreting an error message and detecting a non-response scenario. The method continues at step 436 where the processing module identifies stored encoded data slices for rebuilding, where the identified stored encoded data slices are associated with the unavailable storage unit. The method continues at step 438 where the processing module selects at least a decode threshold number of storage resources associated with the set of storage units.

For each identified encoded data slice for rebuilding, the method continues at step 440 where the processing module recovers at least a decode threshold number of encoded data slices from the selected storage resources. The method continues at step 442 where the processing module decodes the recovered encoded data slices to produce a recovered data segment. The method continues at step 444 where the processing module re-encodes the recovered data segment to produce a foster encoded data slice corresponding to the identified encoded data slice for rebuilding. The method continues at step 446 where the processing module selects another storage resource for storage of the foster encoded data slice. For example, the processing module selects the other storage resource from a list of secondary storage slots, where the secondary storage slots are not associated with storage of the set of encoded data slices. The method continues at step 448 where the processing module facilitates storage of the foster encoded data slices by the other storage resource.

FIG. 44A is a schematic block diagram of another embodiment of a computing core 26 of FIG. 1 that includes the processing module 50 of FIG. 2 and the main memory 54 of FIG. 2. The main memory 54 includes a plurality of memories 88 of FIG. 3. The computing core 26 functions to reliably access data 450 in the main memory 54. The accessing of the data 450 includes writing the data 450 to the main memory 54 to produce stored data and reading the stored data from the main memory 54 to reproduce the data 450.

In an example of operation of the writing of the data 450, the processing module 50 receives a write data request. The write data request includes one or more of a portion of a data object 450, a data identifier (ID) 452, transmission integrity information, and metadata of the data. The transmission integrity information includes an integrity check value, where an integrity function is applied to the data prior to transmission to produce the integrity check value. The integrity function includes a deterministic function. The deterministic function includes at least one of a hash based message authentication code function, a cyclic redundancy code function, a hashing function, a mask generating function, and a sponge function. The metadata of the data includes at least one of the data ID, an integrity function ID associated with the transmission integrity information, a data size indicator, a data owner identifier, a creation time, a deletion time, and a data type.

Having received the write data request, the processing module 50 verifies integrity of the write data request. The verifying includes indicating that the write data request is verified when a comparison is favorable between a calculated integrity check value of the received data object and the received integrity check value of the transmission integrity information. When the integrity of the write data request has been favorably verified, the processing module 50 obtains filesystem information. Filesystem information includes one or more of filesystem directory information that associates data IDs and storage information. The storage information includes one or more of a memory device ID, a memory offset, a dispersed storage network (DSN) address, i-node information, a root DSN address of a DSN directory, and dispersed hierarchical indexing information (e.g., root DSN addresses for multiple dispersed hierarchical indexes).

The obtaining of the filesystem information includes retrieving a decode threshold number of encoded filesystem slices 456 from the plurality of memories 88, decoding the decode threshold number of encoded filesystem slices to reproduce the filesystem information, and verifies the reproduced filesystem information. The verifying of the reproduced filesystem information includes indicating that the reproduced filesystem information is verified when a retrieved integrity information of the stored filesystem information compares favorably to calculated integrity information of the reproduced filesystem information.

Having reproduced verified filesystem information, the processing module 50 dispersed storage error encodes a portion of the data object to produce one or more sets of encoded data slices 454. The processing module 50 writes the one or more sets of encoded data slices 454 to one or more memories 88. For example, the processing module 50 writes all of the one or more sets of encoded data slices to a first memory 88. As another example, the processing module writes each slice of a first set of encoded data slices 454 to a different memory 88.

Having stored the one or more sets of encoded data slices 454 in the memories 88, the processing module 50 generates integrity information 458 for the one or more sets of encoded data slices. For example, the processing module 50 performs an integrity function on each encoded data slice to produce a slice integrity value. Having produced slice integrity values, the processing module 50 aggregates the slice integrity values to produce the integrity information 458. Having produced the integrity information 458, the processing module 50 writes the integrity information 458 to the main memory 54. Alternatively, or in addition to, the processing module 50 may further perform encoding and store sets of metadata slices in the memories 88 for the metadata.

Having stored the integrity information 458, the processing module 50 updates the reproduced filesystem information to produce updated filesystem information. For example, the processing module 50 updates directory information to associate storage locations of the one or more sets of encoded data slices and the data ID. As another example, the processing module updates the directory information to associate storage locations of the metadata slices and the data ID.

Having produced the updated filesystem information, the processing module 50 dispersed storage error encodes the updated filesystem information to produce a set of encoded filesystem slices 456. The processing module 50 writes the set of encoded filesystem slices 456 to the one or more memories 88. Having stored the set of encoded filesystem slices 456, the processing module generates integrity information 458 for the set of encoded filesystem slices. The processing module 50 stores the integrity information 458 in the main memory 54.

In an example of operation of the reading of the data, the processing module 50 receives a read data request. The read data request includes one or more of the data identifier (ID) 452 and an offset for a portion of the data object for retrieval. Having received the read data request, the processing module 50 recovers integrity information 458 for the filesystem information from the main memory 54. The processing module 50 enters a loop to retrieve an (another) encoded filesystem slice 456 from a corresponding memory 88. When a decode threshold number of error-free encoded filesystem slices 456 have been retrieved, the processing module exits the loop. When exiting the loop, the processing module 50 dispersed storage error decodes the decode threshold number of error-free encoded filesystem slices 456 to reproduce the filesystem information.

Having reproduced the filesystem information, the processing module 50 extracts a data retrieval location from the filesystem information based on the data ID 452 and the offset for the portion of the data object for retrieval. Having extracted the data retrieval location, the processing module 50 recovers integrity information 458 for a plurality of sets of encoded data slices 454 associated with the data retrieval location and the portion of the data object for retrieval. For each set of encoded data slices 454 corresponding to the portion of the data object for retrieval, the processing module 50 enters another loop to retrieve another encoded data slice 454 from a corresponding memory 88.

When a decode threshold number of error-free encoded data slices 454 have been retrieved, the processing module 50 dispersed storage error decodes the decode threshold number of error-free encoded data slices 454 to reproduce a data segment. When each data segment of the portion of the data object for retrieval has been recovered, the processing module 50 exits the other loop. When exiting the loop, the processing module 50 issues a read data response to a requesting entity, where the read data response includes one or more of the portion of the data object 450 for retrieval and an integrity check value over the portion of the data object for retrieval.

FIG. 44B is a flowchart illustrating an example of storing data. The method begins or continues at step 460 where a processing module (e.g., of a computing core) receives a write data request that includes a portion of the data object. The method continues at step 462 where the processing module obtains filesystem information. For example, the processing module retrieves the encoded filesystem slices to produce a decode threshold number of encoded filesystem slices and decodes the decode threshold number of encoded filesystem slices to reproduce the filesystem information.

The method continues at step 464 where the processing module dispersed storage error encodes the portion of the data object to produce one or more sets of encoded data slices. The method continues at step 466 where the processing module stores the one or more sets of encoded data slices in one or more memories. For example, the processing module selects a number of memories based on one or more of a reliability goal, available memory storage capacity, and memory performance levels.

The method continues at step 468 where the processing module generates integrity information for each of the one or more sets of encoded data slices. The method continues at step 470 where the processing module stores the integrity information for each of the one or more sets of encoded data slices in the memory. The method continues at step 472 where the processing module updates the filesystem information. For example, the processing module modifies directory information to associate the data ID to storage locations of the one or more memories and the memory.

The method continues at step 474 where the processing module dispersed storage error encodes the updated file system information to produce a set of encoded filesystem slices. The method continues at step 476 where the processing module stores the set of encoded filesystem slices in the one or more memories. The method continues at step 478 where the processing module generates integrity information for each of the set of encoded filesystem slices to produce updated integrity information. The method continues at step 480 where the processing module stores integrity information for each of the set of encoded filesystem slices in the memory. For example, the processing module stores the integrity information in a predetermined location associated with the integrity information.

FIG. 44C is a flowchart illustrating an example of retrieving data. The method begins or continues at step 482 where a processing module (e.g., of a computing core) receives a read data request for a portion of the data object for retrieval. The method continues at step 484 where the processing module recovers integrity information for a set of encoded filesystem slices from a memory. For example, the processing module retrieves the integrity information from a predetermined storage location associated with the integrity information. The method continues at step 486 where the processing module retrieves encoded filesystem slices until a decode threshold number of error-free encoded filesystem slices have been retrieved. For example, the processing module verifies integrity by comparing a calculated integrity value for a retrieved encoded filesystem slice to a stored integrity value of the recovered integrity information.

The method continues at step 488 where the processing module dispersed storage error decodes the decode threshold number of error-free encoded filesystem slices to reproduce filesystem information. The method continues at step 490 where the processing module interprets the filesystem information to produce data retrieval information. For example, the processing module accesses one or more of a dispersed storage network directory and a dispersed hierarchical index of the filesystem information using the data ID of the read data request to extract storage location information (e.g., a memory identifier, a memory offset).

The method continues at step 492 where the processing module recovers integrity information for a plurality of sets of encoded data slices from the memory. For each set of encoded data slices, the method continues at step 494 where the processing module retrieves encoded data slices using the data retrieval information until a decode threshold number of error-free encoded data slices have been retrieved. For example, the processing module verifies integrity by comparing a calculated integrity value for a retrieved encoded data slice to a stored integrity value for the recovered integrity information.

The method continues at step 496 where the processing module dispersed storage error decodes the decode threshold number of error-free encoded data slices to reproduce a data segment. The method continues at step 498 where the processing module aggregates a plurality of reproduced data segments to produce the portion of the data object for retrieval. The method continues at step 500 where the processing module generates an integrity check value for the portion of the data object for retrieval. For example, the processing module performs a deterministic function over the portion of the data object for retrieval to produce a deterministic value. As another example, the processing module selects a portion of the integrity information for the plurality of sets of encoded data slices. The method continues at step 502 where the processing module issues a read data response to a requesting entity, where the read data response includes a portion of the data object for retrieval and the integrity check value.

FIG. 45A is a schematic block diagram of another embodiment of a dispersed storage network (DSN) that includes the user device 12 of FIG. 1, a set of proxy servers (PS) 1-5, the distributed storage and task (DST) processing unit 16 of FIG. 1, and the DST execution unit set 368 of FIG. 41A. The DSN may further include the network 24 of FIG. 1 to operably couple one or more of the user device 12, the DST processing unit 16, and the DST execution unit set. The DST execution unit set includes a set of DST execution units 1-n. The user device 12 includes the DST client module 34 of FIG. 1. The DST processing unit 16 includes the DST client module 34 of FIG. 1. Each DST client module 34 includes the outbound dispersed storage (DS) processing module 80 of FIG. 3 and the inbound DS processing module 82 of FIG. 3. Each proxy server may be implemented utilizing at least one of the computing core(s) of FIG. 2, another DST processing unit 16 of FIG. 1, a computing device, and another DST client module 34. The DSN functions to provide the user device 12 access to a service. The service includes at least one of a storage service, an application service, a management service, a security service, a content distribution service, etc. The DSN may further provide the storage service. The storage service includes storing data, retrieving stored data, deleting the stored data, listing the stored data etc.

In an example of operation of the accessing of the storage service, the DST client module 34 of the user device 12 generates an access request. The access request includes one or more of a service type (e.g., storage, computing), an access type (e.g., write, read, list, delete, etc.), a requesting entity identifier (ID), data for storage, data for retrieval, storage location information, and a data ID. Having generated the access request, the outbound DST processing module 80 of the user device 12 encodes the access request in accordance with request dispersal parameters to produce a set of encoded access request blocks.

The encoding includes utilizing one or more of a dispersed storage error encoding function, secret sharing encoding function (e.g., Shamir sharing), and an all or nothing transformation (AONT) function. The AONT function includes encrypting the access request with a random key to produce an encrypted access request, performing a deterministic function on encrypted access request to produce a digest, obfuscating the random key using the digest to produce an obfuscated key, and combining the obfuscated key with the encrypted access request to produce a confidential access request. As a specific example, the outbound DS processing module 80 performs the AONT function on the access request to produce the confidential access request and dispersed storage error encodes the confidential access request to produce the set of encoded access request blocks in accordance with the request dispersal parameters. As another specific example, the outbound DS processing module 80 performs the secret sharing encoding function on the confidential access request to produce the set of encoded access request blocks in accordance with the request dispersal parameters.

Having encoded the access request, the outbound DS processing module 80 of the user device 12 generates a unique request ID for the access request. The generating may be based on at least one of a random number and a pseudorandom number, where the pseudorandom number is based on the access request. Having generated the unique request ID, the outbound DS processing module 80 generates a set of request packages 1-5, where each request package includes one or more of the set of encoded access request blocks, the unique request ID, the requesting entity ID, the request dispersal parameters, and a service identifier (ID). For example, the outbound DS processing module 80 generates the set of request packages 1-5 to include an identifier for the DST processing unit 16 as the service ID, an identifier for the user device 12, the unique request ID, and the request dispersal parameters, when the request dispersal parameters indicates that and an information dispersal algorithm (IDA) width is 5.

Having generated the set of request packages 1-5, the outbound DS processing module 80 of the user device 12 sends, via the set of proxy servers 1-5, the set of request packages 1-5 to the DST processing unit 16. For example, the outbound DS processing module 80 sends request package 1 to proxy server 1, sends request package 2 to proxy server 2, sends request package 3 to proxy server 3, sends request package 4 to proxy server 4, and sends request package 5 to proxy server 5. Each proxy server forwards a corresponding received request package of the set of request packages to a DSN entity associated with the service ID. For example, proxy server 2 forwards the request package 2 to the DST processing unit 16. The forwarding may further include authenticating the requesting entity ID and sending a corresponding received request package to the DSN entity associated with the service ID when the requesting entity ID is favorably authenticated.

The inbound DS processing module 82 of the DST processing unit 16 receives at least some of the set of request packages that includes the unique request ID. When receiving a sufficient number of request packages of the set of request packages that includes a decode threshold number of encoded access request blocks and the unique request ID, the inbound DS processing module 82 decodes the decode threshold number of encoded access request blocks to reproduce the access request in accordance with the request dispersal parameters. As a specific example of the decoding, the inbound DS processing module 82 dispersed storage error decodes the decode threshold number of encoded access request blocks to produce the confidential access request and performs a reverse AONT function on the confidential access request to reproduce the access request. For instance, the inbound DS processing module 82 receives request packages 1, 3, and 4 that includes encoded access request blocks 1, 3, and 4; dispersed storage error decodes encoded access request blocks 1, 3, and 4 to reproduce the confidential access request in accordance with received request dispersal parameters (e.g., decode threshold is 3); extracts the obfuscated key from the confidential access request; performs the deterministic function on the encrypted access request to reproduce the digest; de-obfuscates the obfuscated key using the reproduced digest to reproduce the random key; and decrypts the encrypted access request using the reproduced random key to reproduce the access request.

Having reproduced the access request, the inbound DS processing module 82 facilitates processing of the access request to generate an access response. When the reproduced access request includes a write request 512, the inbound DS processing module 82 sends the write request 512 to the outbound DS processing module 80 of the DST processing unit 16, the outbound DS processing module 80 issues one or more write access requests 514 to the DST execution unit set, the outbound DS processing module 80 receives one or more write access responses 516 from the DST execution units of the DST execution unit set, and generates the access response based on the received write access responses (e.g., favorable storage, an error message). When the reproduced access request includes a read request, the inbound DS processing module 82 issues one or more read access requests 506 to the DST execution unit set, receives one or more read access responses 508 from the DST execution units, generates a read response 510 based on the one or more received read access responses 508 (e.g., to include recovered data, a status message), sends the read response 510 to the outbound DS processing module 80 of the DST processing unit 16, and the outbound DS processing module 80 generates the access response based on the read response (e.g., to include the read response).

Having generated the access response, the outbound DS processing module 80 of the DST processing unit 16 encodes the access response in accordance with response dispersal parameters to produce a set of encoded access response blocks. The outbound DS processing module 80 issues, via the set of proxy servers 1-5, a set of response packages 1-5 to the user device 12. Each response package includes one or more of the set of encoded access response blocks, the unique request ID, the requesting entity ID, the response dispersal parameters, and the service identifier (ID). Each proxy server forwards a corresponding received response package to the user device 12. For example, proxy server 3 forwards response package 3 to the user device 12.

The inbound DS processing module 82 of the user device 12 receives at least some of the set of response packages 1-5 that includes the unique request ID. When receiving a sufficient number of response packages of the set of response packages that includes a decode threshold number of encoded access response blocks and the unique request ID, the inbound DS processing module 82 decodes the decode threshold number of encoded access response blocks to reproduce the access response in accordance with the request dispersal parameters. As a specific example of the decoding, the inbound DS processing module 82 dispersed storage error decodes the decode threshold number of encoded access response blocks to produce a confidential access response and performs the reverse AONT function on the confidential access response to reproduce the access response. For instance, the inbound DS processing module 82 of the user device 12 receives response packages 2, 3, and 4 that includes encoded access response blocks 2, 3, and 5; dispersed storage error decodes encoded access response blocks 2, 3, and 5 to reproduce the confidential access response in accordance with received response dispersal parameters (e.g., decode threshold is 3); extracts another obfuscated key from the confidential access response; performs another deterministic function on an encrypted access response to reproduce another digest; de-obfuscates the other obfuscated key using the reproduced other digest to reproduce another random key; and decrypts the encrypted access response using the reproduced other random key to reproduce the access response.

FIG. 45B is a flowchart illustrating an example of accessing a dispersed storage network (DSN). The method begins or continues at step 518 where a requesting entity (e.g., a user device) generates an access request. The method continues at step 520 where the requesting entity generates a request identifier (ID) for the access request. For example, the requesting entity generates the request ID based on a random number. The method continues at step 522 where the requesting entity encodes the access request in accordance with request dispersal parameters to produce a set of encoded access request blocks. The encoding may utilize one or more of applying an all or nothing (AONT) transformation function, utilizing a dispersed storage error coding function, and utilizing a sharing function. The method continues at step 524 where the requesting entity issues a set of request packages to a set of proxy servers.

The method continues at step 526 where each proxy server forwards a corresponding request package to a service processing module. For example, the proxy server identifies the service processing module based on the request package (e.g., using a mapping of a requesting entity ID to an identity of the service processing module, using a service identifier of the request package). The method continues at step 528 where the service processing module decodes a decode threshold number of received encoded access request blocks of received request packages associated with the request ID to reproduce the access request in accordance with the request dispersal parameters. Alternatively, the service processing module decodes the decode threshold number of received encoded access request blocks utilizing predetermined dispersal parameters.

The method continues at step 530 where the service processing module executes the access request to produce an access response. For example, the service processing module produces a read response as the access response when the access request includes a read request. As another example, the service processing module produces a write response as the access response when the access request includes a write request.

The method continues at step 532 where the service processing module encodes the access response in accordance with response dispersal parameters to produce a set of encoded access response blocks. Alternatively, the service processing module encodes the access response using other predetermined dispersal parameters (e.g., stored dispersal parameters, the request dispersal parameters). The method continues at step 534 where the service processing module issues a set of response packages to the set of proxy servers. The method continues at step 536 where each proxy server forwards a corresponding response package to the requesting entity. For example, each proxy server identifies the requesting entity based on the requesting entity ID of the response package. The method continues at step 538 where the requesting entity decodes a decode threshold number of received encoded access response blocks associated with the request ID to reproduce the access response in accordance with the response dispersal parameters.

FIGS. 46A and 46B are a schematic block diagram of another embodiment of a dispersed storage network (DSN) that includes the user device 12 of FIG. 1, a plurality of distributed storage and task (DST) processing units 1-N, and the DST execution unit set 368 of FIG. 41A. The DST execution unit set 368 includes a set of DST execution (EX) units 1-n. Each DST execution unit may be implemented utilizing the DST execution unit 36 of FIG. 1. Hereafter, each DST execution unit may be interchangeably referred to as a storage unit and the DST execution unit set 368 may be interchangeably referred to as a set of storage units. Each DST processing units 1-N may be implemented with the DST processing unit 16 of FIG. 1. The DSN may further include the network 24 of FIG. 1 to operably couple one or more of the user device 12, the DST processing units 1-N, and the DST execution unit set 368.

The DST execution unit set 368 includes a set of DST execution units 1-n. The user device 12 includes the DST client module 34 of FIG. 1. The DST processing units 1-N includes the DST client module 34 of FIG. 1. Each DST client module 34 includes the outbound dispersed storage (DS) processing module 80 of FIG. 3. Hereafter, each outbound DS processing module 80 may be interchangeably referred to as a DS processing module. Alternatively, a single DST processing unit includes the plurality of outbound DS processing module's 80. Further alternatively, the user device 12 includes the plurality of outbound DS processing modules 80. The DSN functions to store data as a plurality of sets of encoded data slices using a high reliability approach.

FIG. 46A illustrates steps of an example of operation of the storing of the data (e.g., a data object 542) where the DST client module 34 of the user device 12 issues a set of store data requests 540 as a set of redundant dispersed storage error encoding write requests to the plurality of DST processing units. The issuing includes generating each store data request 540 and sending each store data request 540 to the plurality of DST processing units 1-N. The DST client module 34 generates each store data request 540 to include one or more of the data object 542, a data object identifier (ID) 544, and encoding parameters 546. The encoding parameters 546 includes one or more of an encryption seed, a non-deterministic function seed value, a dispersed storage error encoding function, a secret sharing function, an all or nothing transformation (AONT), an integrity check function, a compression function, and an encryption function. The DST client module 34 may further generate each store data request 540 to include a redundancy dispersed storage error encoding flag (e.g., an indicator of temporary redundant storage of the data object 542).

Having generated a set of redundant dispersed storage error encoding write requests, the DST client module 34 of the user device 12 sends the set of store data requests 540 to the plurality of DST processing units 1-N. For example, the DST client module 34 of the user device 12 sends a first store data request 540 (e.g., a first write request) of the set of redundant dispersed storage error encoding write requests regarding the data object to the outbound DS processing module 80 of the DST processing unit 1 (e.g., a first dispersed storage (DS) processing module), where the first write request includes the data object 542, the data object identifier 544, and the encoding parameters 546. As another example, the DST client module 34 of the user device 12 sends a second store data request 540 (e.g., a second write request) of the set of redundant dispersed storage error encoding write requests to the outbound DS processing module 80 of the DST processing unit 2 (e.g., a second DS processing module), where the second write request includes the data object 542, the data object identifier 544, and the encoding parameters 546. The first and second write requests further includes the redundancy dispersed storage error encoding flag when the DST client module 34 of the user device 12 generates the first and second write requests to include the redundancy dispersed storage error encoding flag.

Alternatively, the DST client module 34 of the user device 12 sends the first write request of the set of redundant dispersed storage error encoding write requests regarding the data object via an internal bus structure of the user device 12 to a processing module of the user device 12 functioning as the first DS processing module. Further alternatively, the DST client module 34 of the user device 12 sends the second write request of the set of redundant dispersed storage error encoding write requests to the second DS processing module (e.g., the outbound DS processing module 80 of the DST processing unit 2) via a network connection (e.g., via the network 24 of FIG. 1).

Each DST processing unit receives a corresponding store data request 540 and encodes the data object in accordance with the encoding parameters to produce a corresponding plurality of sets of encoded data slices. As a specific example, the outbound DS processing module 80 of the DST processing unit 1 (e.g., the first DS processing module) a dispersed storage error encodes the data object 542 in accordance with the encoding parameters 544 to produce a first plurality of sets of encoded data slices. As another specific example of the encoding, the outbound DS processing module 80 of the DST processing unit 1 processes the data object 542 using the encoding parameters 544 to produce first stage encoded data and performs a dispersed storage error encoding function on the first stage encoded data to produce the first plurality of sets of encoded data slices.

The processing of the data object 542 using the encoding parameters 544 includes performing a non-deterministic function utilizing the non-deterministic function seed value of the encoding parameters 544. Examples of the non-deterministic function includes a compression function, an encryption function, and an all or nothing transformation (AONT) function. As a specific example of performing the non-deterministic function, the outbound DS processing module 80 encrypts the data object 542 using the encryption function in accordance with the received seed value to produce a deterministic encrypted data object. Having produced the deterministic encrypted data object, the outbound DS processing module 80 dispersed storage error encodes the deterministic encrypted data object to produce the first plurality of sets of encoded data slices. As another example, the outbound DS processing module 80 applies the AONT function to the data object 542 in accordance with the received seed value to produce a deterministic confidential data object and dispersed storage error encodes the deterministic confidential data object to produce the first plurality of sets of encoded data slices.

The outbound DS processing module 80 of the DST processing unit 2 (e.g., the second DS processing module) dispersed storage error encodes the data object 542 in accordance with the encoding parameters to produce a second plurality of sets of encoded data slices, where, when the first and second DS processing modules each dispersed storage error encodes the data object 542 in accordance with the encoding parameters 546 with negligible error, the first plurality of sets of encoded data slices substantially match the second plurality of sets of encoded data slices.

Having generated the plurality of sets of encoded data slices, each DST processing unit issues one or more sets of write slice requests to the DST execution units 1-n, where the one or more sets of write slice requests includes a corresponding plurality of sets of encoded data slices. The issuing includes generating the one or more sets of write slice requests and sending (e.g., via the network 24 of FIG. 1) the one or more sets of write slice requests to the DST execution units 1-n. As a specific example, the first DS processing module (e.g., the outbound DS processing module 80 of the DST processing unit 1) generates a first plurality of sets of storage requests (e.g., write slice requests 1) regarding the first plurality of sets of encoded data slices (e.g., pillar 1 slices (SLC) 1-1-1, 1-1-2, through 1-1-S; pillar 2 slices 1-2-1, 1-2-2, through 1-2-S; through pillar n slices 1-n-1, 1-n-2, through 1-n-S), where at least some of the first plurality of sets of storage requests include the redundancy dispersed storage error encoding flag. As another specific example, the second DS processing module (e.g., the outbound DS processing module 80 of the DST processing unit 2) generates a second plurality of sets of storage requests (e.g., write slice requests 2) regarding the second plurality of sets of encoded data slices, where at least some of the second plurality of sets of storage requests include the redundancy dispersed storage error encoding flag.

The DST execution unit set 368 temporarily stores each received plurality of sets of encoded data slices. As a specific example, each DST execution unit stores N encoded data slices from the N DST processing units for each data segment 1-S (e.g., a segment for each set of encoded data slices). For instance, the set of storage units (e.g., the DST execution units 1-n) temporarily stores the first plurality of sets of encoded data slices (e.g., pillar 1 slices 1-1-1, 1-1-2, through 1-1-S; pillar 2 slices 1-2-1, 1-2-2, through 1-2-S; through pillar n slices 1-n-1, 1-n-2, through 1-n-S), and the second plurality of sets of encoded data slices (e.g., pillar 1 slices (SLC) 2-1-1, 2-1-2, through 2-1-S; pillar 2 slices 2-2-1, 2-2-2, through 2-2-S; through pillar n slices 2-n-1, 2-n-2, through 2-n-S).

Each DST execution unit sends N write responses to the N DST processing units with regards to a level of successful temporary storage of the S encoded data slices (e.g., of a common pillar) received from a corresponding DST processing unit. The level includes at least one of successful storage and unfavorable storage including at least one of no slice received, a corrupted slice was received, an unauthorized write slice request was received, and a write conflict exists. As a specific example, the set of storage units sends first write responses (e.g., write slice responses 1) to the first DS processing module (the outbound DS processing module 80 of the DST processing unit 1) indicating a level of successful temporary storage of the first plurality of encoded data slices. As another specific example, the set of storage units sends second write responses (e.g., write slice responses 2) to the second DS processing module indicating a level of successful temporary storage of the second plurality of encoded data slices. For instance, DST execution unit 1 indicates that slice 1-1-2 is associated with unfavorable storage, DST execution unit 2 indicates that slice 1-2-S is associated with unfavorable storage, DST execution unit 3 indicates that slice N-3-1 is associated with unfavorable storage, and DST execution unit n indicates that slice 1-n-1 is associated with unfavorable storage. As another instance, each DST execution unit indicates that each encoded data slice of the second plurality of encoded data slices has been successfully temporarily stored.

FIG. 46B illustrates further steps of the example of operation of the storing of the data where the N DST processing units send commit requests to the set of storage units based on the level of successful temporary storage indicated by the received write responses. As a specific example, when the level of successful temporary storage of the first plurality of encoded data slices is above a threshold (e.g., for each set, a write threshold number of encoded data slices have been successfully stored), the first DS processing module sends first commit requests to the set of storage units regarding the first plurality of sets of encoded data slices. For instance, the outbound DS processing module 80 of the DST processing unit 1 sends a set of commit write requests 1 to the DST execution units 1-n when the level of successful temporary storage indicates that a write threshold number of encoded data slices for each set of encoded data slices of the first plurality of sets of encoded data slices has been successfully stored.

As another specific example of the sending of the commit request, when the level of successful temporary storage of the second plurality of encoded data slices is above the threshold, the second DS processing module sends second commit requests to the set of storage units regarding the second plurality of sets of encoded data slices. For instance, the outbound DS processing module 80 of the DST processing unit 2 sends a set of commit write requests 2 to the DST execution units 1-n when the level of successful temporary storage indicates that a write threshold number of encoded data slices for each set of encoded data slices of the second plurality of sets of encoded data slices has been successfully stored.

The set of storage units interprets the redundancy dispersed storage error encoding flag associated with at least one of the write slice requests and the commit write requests, to associate each of the plurality of sets of encoded data slices and to trigger execution of the verification process. For example, each storage unit associates the first and second plurality of sets of encoded data slices and triggers execution of the verification process.

The verification process includes each DST execution unit processing unit verifying that a sufficient number of encoded data slices, of one or more data segments for a common pillar meet a verification criteria. The verification criteria includes, for each of the one or more data segments, at least one of all N encoded data slices are substantially the same, a majority of the N encoded data slices are substantially the same, and at least X % of the N encoded data slices are substantially the same. For example, the DST execution unit 1 indicates that the sufficient number of encoded data slices of the first data segment meet the verification criteria of all encoded data slices are substantially the same from the N DST processing units. As another example, the DST execution unit 1 indicates that the sufficient number of encoded data slices of the second data segment meet the verification criteria when the majority of encoded data slices are substantially the same from the N DST processing units and when encoded data slice 1-1-2 is associated with the unfavorable storage. Each DST execution unit may further indicate a verification status for each data segment and for all data segments (e.g., as one verification status indicator).

Having executed the verification process and when the verification criteria has been met for a sufficient number of data segments of the S data segments (e.g., all segments, a majority of segments, X % of the data segments), each DST processing unit selects an encoded data slice for each slice position of the plurality of sets of encoded data slices (e.g., a corresponding common pillar of each data segment) from the corresponding data slice position of each plurality of sets of encoded data slices (e.g., each data segment). For example, the selecting includes, for each data segment, identifying at least one encoded data slice associated with favorable storage of the N encoded data slices. As a specific example, the set of storage units processes the first and second commit requests to select an encoded data slice for each data slice position of the plurality of sets of encoded data slices from the corresponding data slice position of the first and second plurality of sets of encoded data slices. For instance, for the first data segment, the DST execution unit 1 selects encoded data slice 1-1-1 of the first plurality of sets of encoded data slices, DST execution unit 2 selects encoded data slice 1-2-1 of the first plurality of sets of encoded data slices, DST execution unit 3 selects encoded data slice 1-3-1 of the first plurality of sets of encoded data slices, etc., through DST execution unit n selects encoded data slice 2-n-1 of the second plurality of sets of encoded data slices.

Having selected the encoded data slices, the set of storage units permanently stores the selected encoded data slices of the first or the second plurality of sets of encoded data slices based on successful execution of the storage verification process to produce the plurality of sets of encoded data slices. As a specific example, DST execution unit 1 selects encoded data slice 2-1-2 of the data segment 2 for permanent storage and moves the encoded data slice 2-1-2 from a memory device utilized for the temporary storage (e.g., solid-state memory) to another memory device utilized for the permanent storage (e.g., a magnetic disk drive).

Having permanently stored the selected encoded data slices (e.g., subsequent to executing the verification process and when the verification criteria has been met for the sufficient number of data segments of the S data segments), each DST execution unit issues a favorable commit response (e.g., indicating that the verification criteria has been met) to each of the DST processing units 1-n. For example, each DST execution units 1-n issue a commit write response 1 to DST processing unit 1 (e.g., such that the DST processing unit 1 receives n commit write responses 1), a commit write response 2 to DST processing unit 2 (e.g., such that the DST processing unit 2 receives n commit write responses 2), a commit write response 3 to DST processing unit 3 (e.g., such that the DST processing unit 3 receives n commit write responses 3), etc., through a commit write response N to DST processing unit N. Each outbound DS processing module 80 of the DST processing units 1-N issues a corresponding store data response to the user device 12 based on corresponding received commit write responses from the DST execution units 1-n. For example, the outbound DS processing module 80 of the DST processing unit 2 issues a store data response 2 indicating successful storage based on received commit write responses 2 from each of the DST execution units 1-n indicating a favorable commit response. The user device 12 indicates a favorable storage of the data object 542 when a write threshold number of DST execution units indicate that the verification criteria has been met.

Alternatively, when the verification criteria has not been met for the sufficient number of data segments of the S data segments, a corresponding DST execution unit issues an unfavorable commit response (e.g., indicating that the verification criteria has not been met) to each of the DST processing units 1-n. Each outbound DS processing module 80 of the DST processing units 1-N issues an alternative corresponding store data response to the user device 12 indicating that the corresponding DST execution unit issued the unfavorable commit response. The user device 12 indicates unfavorable storage of the data object 542 when less than the write threshold number of DST execution units indicate that the verification criteria has been met.

In another example of operation of the storing of the data, the user device 12 sends a third write request 540 of the set of redundant dispersed storage error encoding write requests to a third DS processing module (e.g., DST processing unit 3), where the third write request 540 includes the data object 542, the data object identifier 544, and the encoding parameters 546. The third DS processing module dispersed storage error encodes the data object 542 in accordance with the encoding parameters 546 to produce a third plurality of sets of encoded data slices, where, when the first, second, and third DS processing modules each dispersed storage error encodes the data object 542 in accordance with the encoding parameters 546 with negligible error, the first, second, and third plurality of sets of encoded data slices substantially match each other. The set of storage units temporarily stores the first, second, third plurality of sets of encoded data slices. The set of storage units permanently stores encoded data slices of the first, the second, or the third plurality of sets of encoded data slices based on successful execution of the storage verification process to produce the plurality of sets of encoded data slices.

FIG. 46C is a flowchart illustrating another example of storing data. In particular, a method is presented for use in conjunction with one or more functions and features described in conjunction with FIGS. 1-39, 46A-B, and also FIG. 46C. The method begins at step 550 where a computing device of a dispersed storage network (DSN) sends a first write request of a set of redundant dispersed storage error encoding write requests regarding a data object to a first dispersed storage (DS) processing module. The first write request includes one or more of the data object, a data object identifier, encoding parameters; generating, and a redundancy dispersed storage error encoding flag. As a specific example, the computing device sends the first write request of the set of redundant dispersed storage error encoding write requests regarding the data object via an internal bus structure of the computing device to a processing module of the computing device functioning as the first DS processing module.

The method continues at step 552 where the computing device sends a second write request of the set of redundant dispersed storage error encoding write requests to a second DS processing module. The second write request includes one or more of the data object, the data object identifier, the encoding parameters, and the redundancy dispersed storage error encoding flag. As a specific example, the computing device sends the second write request of the set of redundant dispersed storage error encoding write requests to the second DS processing module via a network connection.

The method continues at step 554 where the first DS processing module dispersed storage error encodes the data object in accordance with the encoding parameters to produce a first plurality of sets of encoded data slices. The dispersed storage error encoding by the first DS processing module includes using the encoding parameters to produce first stage encoded data (e.g., encrypted data using an encryption seed of the encoding parameters) and performing a dispersed storage error encoding function on the first stage encoded data to produce the first plurality of sets of encoded data slices.

The method continues at step 556 where the second DS processing module dispersed storage error encodes the data object in accordance with the encoding parameters to produce a second plurality of sets of encoded data slices. When the first and second DS processing modules each dispersed storage error encodes the data object in accordance with the encoding parameters with negligible error, the first plurality of sets of encoded data slices substantially match the second plurality of sets of encoded data slices.

The method continues at step 558 where the first DS processing module generates a first plurality of sets of storage requests regarding the first plurality of sets of encoded data slices. At least some of the first plurality of sets of storage requests include the redundancy dispersed storage error encoding flag. The generating includes sending the first plurality of sets of storage requests to a set of storage units of the DSN. The method continues at step 560 where the second DS processing module generates a second plurality of sets of storage requests regarding the second plurality of sets of encoded data slices. At least some of the second plurality of sets of storage requests include the redundancy dispersed storage error encoding flag. The generating includes sending the second plurality of sets of storage requests to the set of storage units of the DSN.

The method continues at step 562 where the set of storage units temporarily stores the first and second plurality of sets of encoded data slices. The method continues at step 564 where the set of storage units interprets the redundancy dispersed storage error encoding flag to associate the first and second plurality of sets of encoded data slices and to trigger execution of a storage verification process.

The storage verification process includes a series of steps. A first step includes the set of storage units sending first write responses to the first DS processing module indicating a level of successful temporary storage of the first plurality of encoded data slices. A second step includes the set of storage units sending second write responses to the second DS processing module indicating a level of successful temporary storage of the second plurality of encoded data slices. When the level of successful temporary storage of the first plurality of encoded data slices is above a threshold (e.g., for each set, a write threshold number of slices is stored), a third step includes the first DS processing module sending first commit requests to the set of storage units regarding the first plurality of sets of encoded data slices. When the level of successful temporary storage of the second plurality of encoded data slices is above the threshold, a fourth step includes the second DS processing module sending second commit requests to the set of storage units regarding the second plurality of sets of encoded data slices. A fifth step includes the set of storage units processing the first and second commit requests to select an encoded data slice for each data slice position of the plurality of sets of encoded data slices from the corresponding data slice position of the first and second plurality of sets of encoded data slices.

The method continues at step 566 where the set of storage units permanently stores encoded data slices of the first or the second plurality of sets of encoded data slices based on successful execution of the storage verification process to produce a plurality of sets of encoded data slices. For example, each storage unit moves the selected encoded data slices of the plurality of sets of encoded data slices from a memory designated for temporary storage to another memory designated for permanent storage and deletes all other temporarily stored encoded data slices.

Alternatively, or in addition to, the computing device sends a third write request of the set of redundant dispersed storage error encoding write requests to a third DS processing module. The third write request includes one or more of the data object, the data object identifier, the encoding parameters, and the redundancy dispersed storage error encoding flag. The third DS processing module dispersed storage error encodes the data object in accordance with the encoding parameters to produce a third plurality of sets of encoded data slices. When the first, second, and third DS processing modules each dispersed storage error encodes the data object in accordance with the encoding parameters with negligible error, the first, second, and third plurality of sets of encoded data slices substantially match each other. The set of storage units temporarily stores the first, second, third plurality of sets of encoded data slices. The set of storage units permanently stores encoded data slices of the first, the second, or the third plurality of sets of encoded data slices based on successful execution of the storage verification process to produce the plurality of sets of encoded data slices.

The method described above in conjunction with the processing module can alternatively be performed by other modules of the dispersed storage network or by other devices. In addition, at least one memory section (e.g., a computer readable storage medium) that stores operational instructions can, when executed by one or more processing modules of one or more computing devices of the dispersed storage network (DSN), cause the one or more computing devices to perform any or all of the method steps described above.

FIGS. 47A-B are schematic block diagrams of an embodiment of a dispersed storage network (DSN) illustrating an example of migrating data. The DSN includes a plurality of distributed storage and task (DST) execution unit sets 1-3, the network 24 of FIG. 1, and the DST client module 34 of FIG. 1. Alternatively, the DSN may include any number of two or more DST execution unit sets. Each DST execution unit set includes a set of DST execution units 1-n. Each DST execution unit may be implemented utilizing the DST execution unit 36 of FIG. 1. The DST client module 34 includes the outbound dispersed storage (DS) processing module 80 of FIG. 3 and the inbound DS processing module 82 of FIG. 3.

Each DST execution unit set may include DST execution units implemented with technology in accordance with attributes of the DST execution unit set. The attributes provide varying levels of storage capacity, access rate capability, and storage reliability. For example, the DST execution unit set 1 may be implemented with a first technology to provide below average storage capacity, above average access rate capability, and average storage reliability; the DST execution unit set 2 may be implemented with a second technology to provide below storage capacity, average access rate capability, and average storage reliability; and the DST execution unit set 3 may be implemented with a third technology to provide above average storage capacity, average access rate capability, and above average storage reliability. The DSN functions to migrate stored data between the multiple DST execution unit sets 1-3.

FIG. 47A illustrates initial steps of an example of operation of the migrating of the stored data. As a specific example, the outbound DS processing module 80 receives a store data request 570 that includes one or more of a data object, a data identifier (ID), a requesting entity ID, and data information. The data information includes one or more of a data size, a data type, a data owner ID, an estimated access frequency, an estimated time of storage, and a storage reliability goal. Having received the store data request 570, the outbound DS processing module 80 selects a DST execution unit set of the plurality of DST execution unit sets based on one or more of the data information and the attributes of each of the plurality of DST execution unit sets. For example, the outbound DS processing module 80 selects the DST execution unit set 2 when the estimated time of storage is unknown and the data size is less than a high data size threshold level.

Having selected the DST execution unit set, the outbound DS processing module 80 dispersed storage error encodes the data object to produce a plurality of sets of encoded data slices. For example, the outbound DS processing module 80 partitions the data object into a plurality of data segments; dispersed storage error encodes a first data segment to produce a first set of encoded data slices 1-1, 1-2, through 1-n; dispersed storage error encodes a second data segment to produce a second set of encoded data slices 2-1, 2-2, through 2-n; etc. Having produced the plurality of sets of encoded data slices, the outbound DS processing module 80 issues, via the network 24, one or more sets of write slice requests 572 that includes one or more sets of write slice requests 1-n to the set of DST execution units 1-n of the DST execution unit set 2. The one or more sets of write slice requests 572 includes the plurality of sets of encoded data slices and a corresponding plurality of sets of slice names. The set of DST execution units 1-n of the DST execution unit set 2 stores the plurality of sets of encoded data slices in local memory of each of the DST execution units 1-n. For example, DST execution unit 1 stores received encoded data slices 1-1, 2-1, 3-1, etc.

Having facilitated the storage of the plurality of sets of encoded data slices, the outbound DS processing module 80 updates one or more of a DSN directory and a dispersed hierarchical index to associate the data ID to one or more of an identifier of the selected DST execution unit set and the corresponding plurality of sets of slice names (e.g., by a source name that is common to all of the slice names). The outbound DS processing module 80 generates metadata to include one or more of the data information, the identity of the selected DST execution unit set, the source name, the corresponding plurality of sets of slice names, a migration policy, the requesting entity ID, and a storage timestamp. The migration policy includes one or more preconditions to trigger migration of stored data. The preconditions includes at least one of a time frame has elapsed since storage of the data, an attribute of the DST execution unit set has changed, a storage requirement has changed, and the data size has changed.

The outbound DS processing module 80 may obtain the migration policy by one or more of interpreting system registry information, interpreting the data access request, accessing a migration policy list, interpreting other portions of the metadata, initiating a query, interpreting historical DSN performance information, and interpreting a query response. Having generated the metadata, the outbound DS processing module 80 dispersed storage error encodes the metadata to produce a set of encoded metadata slices. For example, the outbound DS processing module 80 dispersed storage error encodes the metadata to produce encoded metadata slices M-1, M-2, through M-n.

Having produced the set of encoded metadata slices, the outbound DS processing module 80 facilitate storage of the set of encoded metadata slices in a DST execution unit set associated with storage of metadata. For example, the outbound DS processing module 80 selects the DST execution unit 1 based on interpreting a metadata storage location list, generates a set of write slice requests 1-n that includes the set of encoded metadata slices M-1, M-2, through M-n, and sends, via the network 24, the set of write slice requests 1-n to the set of DST execution units 1-n of the DST execution unit set 1. The set of DST execution units 1-n of the DST execution unit set 1 locally stores the set of encoded metadata slices M-1, M-2, through M-n.

FIG. 47B illustrates further steps of the example of operation of the migrating of the stored data. As a specific example, the inbound DS processing module 82 determines whether to migrate the data object from the selected DST execution unit set to another DST execution unit set. For example, the inbound DS processing module 82 issues, via the network 24, read slice requests to the set of DST execution units 1-n of the DST execution unit set 1 associated with the storage of the metadata slices, receives, via the network 24, read slice responses 574 that includes encoded metadata slices, dispersed storage error decodes a decode threshold number of received encoded metadata slices to reproduce the metadata, and interprets the metadata to determine whether to migrate the data object. In an instance of interpreting the reproduced metadata, the inbound DS processing module 82 indicates to migrate the data object when the data migration policy indicates to migrate the data object after one week of storage and an elapsed time frame since storage is greater than or equal to one week.

When determining to migrate, the inbound DS processing module 82 selects the other DST execution unit set based on one or more of the reproduced metadata and updated attributes of the plurality of DST execution unit sets. For example, the inbound DS processing module 82 selects the DST execution unit set 3 when an updated storage requirement requires above-average storage reliability provided by DST execution unit 3.

Having selected the other DST execution unit set, the inbound DS processing module 82 facilitates recovery of the data object from the selected DST execution unit set. For example, the inbound DS processing module 82 issues, via the network 24, a set of read slice requests 1-n to the set of DST execution units 1-n of the DST execution unit set 1; and receives, via the network 24, read slice responses 1-n that includes the plurality of sets of encoded data slices as recovered data 576. The inbound DS processing module 82 may further dispersed storage error decode each of the plurality of sets of encoded data slices to reproduce the data object as the recovered data 576.

Having produced the recovered data 576, the outbound DS processing module 80 facilitates storage of the recovered data 576 in the selected other DST execution unit set. For example, the outbound DS processing module 80 issues, via the network 24, write slice requests 572 that includes write slice requests 1-n to the set of DST execution units 1-n of the DST execution unit set 3, where the write slice requests 572 includes the plurality of sets of encoded data slices. As another example, the outbound DS processing module 80 dispersed storage error encodes the recovered data 576 using alternate dispersal parameters (e.g., a different width, different encoding matrix, and a different decode threshold number) to produce an alternate plurality of sets of encoded data slices; issues, via the network 24, the write slice requests 572 that includes the write slice requests 1-n to the set of DST execution units 1-n of the DST execution unit set 3, where the write slice requests 572 includes the alternate plurality of sets of encoded data slices. The set of DST execution units 1-n locally stores at least one of the plurality of sets of encoded data slices and the alternate plurality of sets of encoded data slices.

Having facilitated storage of the recovered data 576, the outbound DS processing module 80 facilitates deletion of the data from the selected DST execution unit set. For example, the outbound DS processing module 80 issues a set of delete slice requests to the DST execution units 1-n of the DST execution unit set 2 to delete the plurality of sets of encoded data slices.

Having facilitated deletion of the data from the selected DST execution unit set, the outbound DS processing module 80 updates one or more of the DSN directory and the dispersed hierarchical index to associate the data ID to one or more of an identifier of the selected other DST execution unit set and the corresponding plurality of sets of slice names (e.g., by a current source name that is common to all of the slice names). The outbound DS processing module 80 generates updated metadata to include one or more of the data information, the identity of the selected other DST execution unit set, a current source name, the corresponding plurality of sets of slice names, the migration policy, the requesting entity ID, and an updated storage timestamp (e.g., of the migration).

Having generated the updated metadata, the outbound DS processing module 80 dispersed storage error encodes the updated metadata to produce a set of updated encoded metadata slices. For example, the outbound DS processing module 80 dispersed storage error encodes the updated metadata to produce updated encoded metadata slices M-1, M-2, through M-n.

Having produced the set of encoded metadata slices, the outbound DS processing module 80 facilitates storage of the set of updated encoded metadata slices in the DST execution unit set associated with storage of metadata. For example, the outbound DS processing module 80 selects the DST execution unit 1 based on interpreting the metadata storage location list, generates another set of write slice requests 1-n that includes the set of updated encoded metadata slices M-1, M-2, through M-n, and sends, via the network 24, the other set of write slice requests 1-n to the set of DST execution units 1-n of the DST execution unit set 1. The set of DST execution units 1-n of the DST execution unit set 1 locally stores the set of updated encoded metadata slices M-1, M-2, through M-n.

FIG. 47C is a flowchart illustrating an example of migrating data. The method begins or continues at step 578 where a processing module (e.g., of a distributed storage and task (DST) processing module) receives a store data request. The method continues at step 580 where the processing module selects a set of storage units. The selecting may be based on one or more of data information of the store data request and attributes of a plurality of sets of storage units, where the plurality of sets of storage units includes the selected set of storage units. The method continues at step 582 where the processing module facilitates storage of data of the store data request in the selected set of storage units. The method continues at step 584 where the processing module associates the data with the selected set of storage units. For example, the processing module updates a dispersed hierarchical index to associate a data ID of the data with a storage location of the data (e.g., a virtual address associated with the set of storage units).

The method continues at step 586 where the processing module generates metadata with regards to the storage of the data. The method continues at step 588 of the processing module facilitate storage of the metadata in a metadata set of storage units. For example, the processing module disperse storage error encodes the metadata to produce a set of encoded metadata slices, generates a set of write slice requests that includes the set of encoded metadata slices, and sends the set of encoded metadata slices to a set of storage units associated with storage of metadata.

The method continues at step 590 where the processing module determines whether to migrate the data. For example, the processing module recovers the metadata from the metadata set of storage units and interprets the metadata based on a migration policy to determine whether to migrate the data. When migrating the data, the method continues at step 592 where the processing module selects another set of storage units. The selecting may be based on one or more of the metadata and updated attributes of the plurality of sets of storage units. For example, the processing module selects a set of storage units associated with higher than average long-term storage reliability levels when an updated storage duration goal indicates a long-term storage requirement with above average storage reliability.

The method continues at step 594 where the processing module recovers the data. The recovering includes at least one of retrieving substantially all of the plurality of sets of encoded data slices; and retrieving at least a decode threshold number of encoded data slices of each set of encoded data slices, dispersed storage error decoding the at least a decode threshold number of encoded data slices for each set of encoded data slices to reproduce a plurality of data segments as recovered data.

The method continues at step 596 where the processing module facilitates storage of the data in the selected other set of storage units. For example, the processing module issues a set of write slice requests to the selected other set of storage units, where the set of write slice requests includes the plurality of sets of encoded data slices. As another example, the processing module, for each recovered data segment, dispersed storage encodes the recovered data segment to produce a set of reproduced encoded data slices of a plurality of sets of reproduced encoded data slices; and issues another set of write slice requests to the selected other set of storage units, where the other set of write slice requests includes the plurality of sets of reproduced encoded data slices.

When storage of the data in the selected other set of storage units has been confirmed, the method continues at step 598 where the processing module deletes the data from the selected set of storage units. For example, the processing module receives favorable write slice responses from the selected other set of storage units and issues a set of delete slice requests to the selected set of storage units, where the set of delete slice requests includes a plurality of sets of slice names corresponding to the plurality of sets of encoded data slices.

The method continues at step 600 where the processing module disassociates the data with the selected set of storage units and associates the data with the selected other set of storage units. For example, the processing module updates a dispersed storage network directory to associate the data ID with storage locations of the data within the selected other set of storage units.

The method continues at step 602 where the processing module generates updated metadata with regards to the migration of the data. For example, the processing module updates the metadata to include the storage locations of the data within the selected other set of storage units, includes an updated migration policy, and includes an updated storage timestamp associated with the migration. The method continues at step 604 where the processing module facilitates storage of the updated metadata in the metadata set of storage units. For example, the processing module disperse storage error encodes the updated metadata to produce a set of updated encoded metadata slices and issues a set of write slice requests to the metadata set of storage units, where the set of write slice requests includes the set of updated encoded metadata slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:
sending, by a computing device, a first write request of a set of redundant dispersed storage error encoding write requests regarding a data object to a first dispersed storage (DS) processing module, wherein the first write request includes the data object, a data object identifier, and encoding parameters;
sending, by the computing device, a second write request of the set of redundant dispersed storage error encoding write requests to a second DS processing module, wherein the second write request includes the data object, the data object identifier, and the encoding parameters;
dispersed storage error encoding, by the first DS processing module, the data object in accordance with the encoding parameters to produce a first plurality of sets of encoded data slices;
dispersed storage error encoding, by the second DS processing module, the data object in accordance with the encoding parameters to produce a second plurality of sets of encoded data slices, wherein, when the first and second DS processing modules each dispersed storage error encodes the data object in accordance with the encoding parameters with negligible error, the first plurality of sets of encoded data slices substantially match the second plurality of sets of encoded data slices;
temporarily storing, by a set of storage units, the first and second plurality of sets of encoded data slices; and
permanently storing, by the set of storage units, encoded data slices of the first or the second plurality of sets of encoded data slices based on successful execution of a storage verification process to produce a plurality of sets of encoded data slices.

2. The method of claim 1, wherein the encoding parameters comprises one or more of:
an encryption seed;
a non-deterministic function seed value;
a dispersed storage error encoding function;
a secret sharing function;
an all or nothing transformation (AONT);
an integrity check function;
a compression function; and
an encryption function.

3. The method of claim 1 further comprises:
generating, by the computing device, the first and second write requests to include a redundancy dispersed storage error encoding flag;
generating, by the first DS processing module, a first plurality of sets of storage requests regarding the first plurality of sets of encoded data slices, wherein at least some of the first plurality of sets of storage requests include the redundancy dispersed storage error encoding flag;
generating, by the second DS processing module, a second plurality of sets of storage requests regarding the second plurality of sets of encoded data slices, wherein at least some of the second plurality of sets of storage requests include the redundancy dispersed storage error encoding flag; and
interpreting, by the set of storage units, the redundancy dispersed storage error encoding flag to associate the first and second plurality of sets of encoded data slices and to trigger execution of the storage verification process.

4. The method of claim 1 further comprises:
sending, by the computing device, the first write request of the set of redundant dispersed storage error encoding write requests regarding the data object via an internal bus structure of the computing device to a processing module of the computing device functioning as the first DS processing module; and
sending, by the computing device, the second write request of the set of redundant dispersed storage error encoding write requests to the second DS processing module via a network connection.

5. The method of claim 1, wherein the dispersed storage error encoding by the first DS processing module comprises:
using the encoding parameters to produce first stage encoded data; and
performing a dispersed storage error encoding function on the first stage encoded data to produce the first plurality of sets of encoded data slices.

6. The method of claim 1, wherein the storage verification process comprises:
sending, by the set of storage units, first write responses to the first DS processing module indicating a level of successful temporary storage of the first plurality of encoded data slices;
sending, by the set of storage units, second write responses to the second DS processing module indicating a level of successful temporary storage of the second plurality of encoded data slices;
when the level of successful temporary storage of the first plurality of encoded data slices is above a threshold, sending, by the first DS processing module, first commit requests to the set of storage units regarding the first plurality of sets of encoded data slices;
when the level of successful temporary storage of the second plurality of encoded data slices is above the threshold, sending, by the second DS processing module, second commit requests to the set of storage units regarding the second plurality of sets of encoded data slices; and
processing, by the set of storage units, the first and second commit requests to select an encoded data slice for each data slice position of the plurality of sets of encoded data slices from the corresponding data slice position of the first and second plurality of sets of encoded data slices.

7. The method of claim 1 further comprises:
sending, by the computing device, a third write request of the set of redundant dispersed storage error encoding write requests to a third DS processing module, wherein the third write request includes the data object, the data object identifier, and the encoding parameters;
dispersed storage error encoding, by the third DS processing module, the data object in accordance with the encoding parameters to produce a third plurality of sets of encoded data slices, wherein, when the first, second, and third DS processing modules each dispersed storage error encodes the data object in accordance with the encoding parameters with negligible error, the first, second, and third plurality of sets of encoded data slices substantially match each other;
temporarily storing, by the set of storage units, the first, second, third plurality of sets of encoded data slices; and
permanently storing, by the set of storage units, encoded data slices of the first, the second, or the third plurality of sets of encoded data slices based on successful execution of the storage verification process to produce the plurality of sets of encoded data slices.

8. A computer readable memory comprises:
at least one memory section that stores operational instructions that, when executed by one or more processing modules of one or more computing devices of a dispersed storage network (DSN), causes the one or more computing devices to:
send a first write request of a set of redundant dispersed storage error encoding write requests regarding a data object to a first dispersed storage (DS) processing module, wherein the first write request includes the data object, a data object identifier, and encoding parameters;
send a second write request of the set of redundant dispersed storage error encoding write requests to a second DS processing module, wherein the second write request includes the data object, the data object identifier, and the encoding parameters;
dispersed storage error encode the data object in accordance with the encoding parameters to produce a first plurality of sets of encoded data slices;
dispersed storage error encode the data object in accordance with the encoding parameters to produce a second plurality of sets of encoded data slices, wherein, when the first and second DS processing modules each dispersed storage error encodes the data object in accordance with the encoding parameters with negligible error, the first plurality of sets of encoded data slices substantially match the second plurality of sets of encoded data slices;
temporarily store the first and second plurality of sets of encoded data slices in a set of storage units; and
permanently store encoded data slices of the first or the second plurality of sets of encoded data slices in the set of storage units, where the storing is based on successful execution of a storage verification process to produce a plurality of sets of encoded data slices.

9. The computer readable memory of claim 8, wherein the encoding parameters comprises one or more of:
an encryption seed;
a non-deterministic function seed value;
a dispersed storage error encoding function;
a secret sharing function;
an all or nothing transformation (AONT);
an integrity check function;
a compression function; and
an encryption function.

10. The computer readable memory of claim 8 further comprises:
the at least one memory section stores further operational instructions that, when executed by the one or more processing modules, causes the one or more computing devices of the DSN to:
generate the first and second write requests to include a redundancy dispersed storage error encoding flag;
generate a first plurality of sets of storage requests regarding the first plurality of sets of encoded data slices, wherein at least some of the first plurality of sets of storage requests include the redundancy dispersed storage error encoding flag;
generate a second plurality of sets of storage requests regarding the second plurality of sets of encoded data slices, wherein at least some of the second plurality of sets of storage requests include the redundancy dispersed storage error encoding flag; and
interpret the redundancy dispersed storage error encoding flag to associate the first and second plurality of sets of encoded data slices and to trigger execution of the storage verification process.

11. The computer readable memory of claim 8 further comprises:
the at least one memory section stores further operational instructions that, when executed by the one or more processing modules, causes the one or more computing devices of the DSN to:
send the first write request of the set of redundant dispersed storage error encoding write requests regarding the data object via an internal bus structure of a first computing device of the plurality of computing devices to a processing module of the first computing device functioning as the first DS processing module; and send the second write request of the set of redundant dispersed storage error encoding write requests to the second DS processing module via a network connection.

12. The computer readable memory of claim 8, wherein the one or more processing modules functions to execute the operational instructions stored by the at least one memory section to cause the one or more computing devices of the DSN to dispersed storage error encode the data object by:

using the encoding parameters to produce first stage encoded data; and performing a dispersed storage error encoding function on the first stage encoded data to produce the first plurality of sets of encoded data slices.

13. The computer readable memory of claim 8, wherein the one or more processing modules functions to execute the operational instructions stored by the at least one memory section to cause the one or more computing devices of the DSN to execute the storage verification process by:

sending first write responses to the first DS processing module indicating a level of successful temporary storage of the first plurality of encoded data slices;

sending second write responses to the second DS processing module indicating a level of successful temporary storage of the second plurality of encoded data slices;

when the level of successful temporary storage of the first plurality of encoded data slices is above a threshold, sending first commit requests to the set of storage units regarding the first plurality of sets of encoded data slices;

when the level of successful temporary storage of the second plurality of encoded data slices is above the threshold, sending second commit requests to the set of storage units regarding the second plurality of sets of encoded data slices; and processing the first and second commit requests to select an encoded data slice for each data slice position of the plurality of sets of encoded data slices from the corresponding data slice position of the first and second plurality of sets of encoded data slices.

14. The computer readable memory of claim 8 further comprises:

the at least one memory section stores further operational instructions that, when executed by the one or more processing modules, causes the one or more computing devices of the DSN to:

send a third write request of the set of redundant dispersed storage error encoding write requests to a third DS processing module, wherein the third write request includes the data object, the data object identifier, and the encoding parameters;

dispersed storage error encode the data object in accordance with the encoding parameters to produce a third plurality of sets of encoded data slices, wherein, when the first, second, and third DS processing modules each dispersed storage error encodes the data object in accordance with the encoding parameters with negligible error, the first, second, and third plurality of sets of encoded data slices substantially match each other;

temporarily store the first, second, third plurality of sets of encoded data slices in the set of storage units; and permanently store encoded data slices of the first, the second, or the third plurality of sets of encoded data slices in the set of storage units, where the storing is based on successful execution of the storage verification process to produce the plurality of sets of encoded data slices.

\* \* \* \* \*